United States Patent [19]
Martin et al.

[11] 3,848,193
[45] Nov. 12, 1974

[54] NATIONWIDE SYSTEM FOR SELECTIVELY DISTRIBUTING INFORMATION

[75] Inventors: Robert B. Martin, Arlington, Va.; Carl T. Jones, Temple Hills, Md.

[73] Assignee: Gautney & Jones Communications, Inc., Falls Church, Va.

[22] Filed: Dec. 15, 1972

[21] Appl. No.: 315,649

[52] U.S. Cl. ...................... 325/53, 325/64, 325/308
[51] Int. Cl. .......................... H04h 1/00, H04h 1/08
[58] Field of Search .................... 325/31, 51, 53–55, 325/64, 154, 158, 183, 308, 464; 179/2.5 B, 2 E

[56] References Cited

UNITED STATES PATENTS

| | | | |
|---|---|---|---|
| 1,635,153 | 7/1927 | Clement | 325/54 |
| 3,130,396 | 4/1964 | Hughes et al. | 325/466 |
| 3,521,168 | 7/1970 | Kaiser et al. | 325/53 |
| 3,603,951 | 9/1971 | Bracken | 325/64 |
| 3,701,024 | 10/1972 | Knowles et al. | 325/51 |

*Primary Examiner*—Benedict V. Safourek
*Assistant Examiner*—Jin F. Ng
*Attorney, Agent, or Firm*—Rose & Edell

[57] ABSTRACT

A national warning system utilizes three geographically spaced national warning centers (one primary, two alternates) for controlling and commanding 10 geographically spaced distribution centers which are responsible for transmitting radio signals throughout ten respective regions of the country. Depending upon the command sent from the active warning center, one or more distribution centers are programmed to transmit an appropriate demuting code and message. The demuting code activates one or more groups of receivers; the message may be voice, teletype, siren actuation, etc. Command transmission from the active warning center to the distribution center can be via radio link or wireline depending on the system operating mode and the transmission path selected by the warning center operator. An overall monitoring subsystem permits automatic confirmation of reception of commands and allows the operating status of all transmitters to be known at the warning center.

19 Claims, 32 Drawing Figures

FIG.7

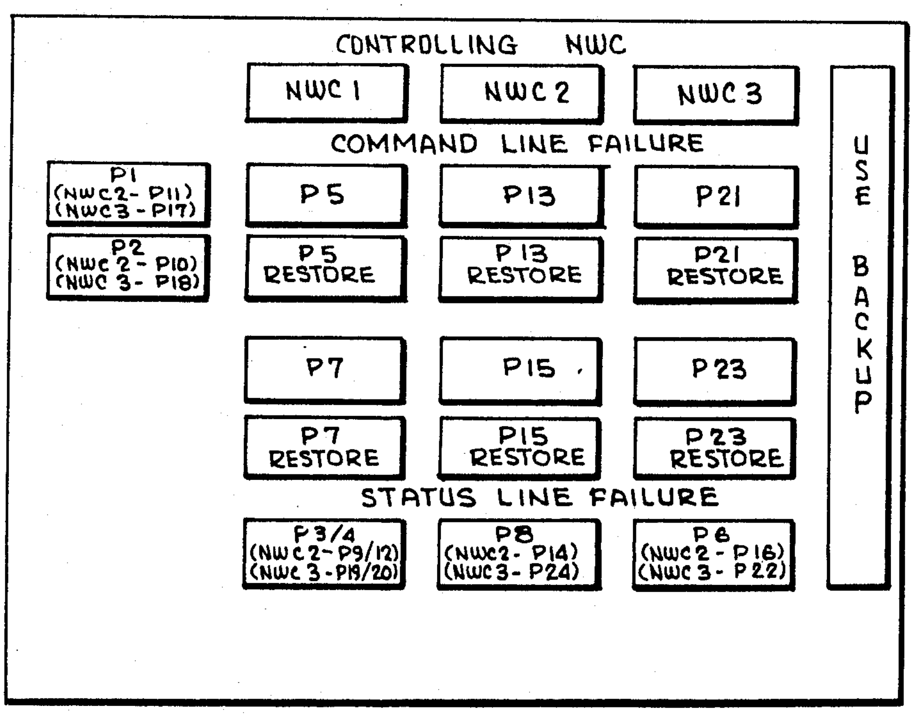

FIG.9

NWC LOGIC UNIT I OUTPUT, ENABLE FUNCTIONS & STATUS DISPLAY

| TABLE 1 OUTPUT ENABLE TERM # | ACTION AT EACH NWC WIRELINE STATUS DISPLAY PANEL | | | | | | | | | | | |
|---|---|---|---|---|---|---|---|---|---|---|---|---|
| | LINE FAILURES, RESTORATION, USE BACKUP ENABLED | | | CONTROLLING NWC ENABLED | | | COMMAND TONES ENABLED | | | STATUS TONES ENABLED | | |
| | NWC 1 | NWC 2 | NWC 3 | NWC 1 | NWC 2 | NWC 3 | NWC 1 | NWC 2 | NWC 3 | NWC 1 | NWC 2 | NWC 3 |
| 1 | | | | NWC 1 | NWC 2 | NWC 3 | | | | | | |
| 2 | | | | | | | | | | | | |
| 3 | | | | NWC 2 | NWC 1 | NWC 1 | T6 | T4 | T5 | T1 | T2 | T3 |
| 4 | | | | NWC 3 | NWC 3 | NWC 2 | | | T5 | T1 | T2 | T3 |
| 5 | P13 | P7 | P5 | NWC 1 | NWC 2 | NWC 3 | T1 | T2 | T3 | T6 | T4 | T5 |
| 6 | P13 | P7 | P5 | NWC 3 | NWC 3 | NWC 2 | | | T5 | T6 | T4 | T5 |
| 7 | P23 | P21 | P15 | NWC 2 | NWC 1 | NWC 1 | | T4 | T5 | T7 | T8 | T9 |
| 8 | P23 | P21 | P15 | NWC 1 | NWC 1 | NWC 3 | T1 | T2 | T3 | T7 | T8 | T9 |
| 9 | | | | NWC 1 | NWC 2 | NWC 3 | | T2 | T3 | T1 | T2 | T3 |
| 10 | P13/P23 | P7/P21 | P5/P15 | NWC 1 | NWC 2 | NWC 3 | T1 | T2 | T3 | T1, T2, T7 | T2, T4, T8 | T3, T5, T9 |
| 11 | P7 | P13 | P13 | | | | T6 | T4 | | T1 | T2 | |
| 12 | P21 | P23 | P23 | | | | | | T5 | | | T3 |
| 13 | P7/P21 | P13/P23 | P13/P23 | | | | T6 | T4 | T5 | T1 | T2 | T3 |
| 14 | P5 RESTORE | P15 RESTORE | P15 RESTORE | | | | | | | | | |
| 15 | P23 RESTORE | P21 RESTORE | P21 RESTORE | | | | | | | | | |
| 16 | P8 | P14 | P24 | | | | | | | | | |
| 17 | P5 | P5 | P7 | | | | T6 | | | T1 | | |
| 18 | P15 | P15 | P21 | | | | | T4 | T5 | | T2 | T3 |
| 19 | P5/P15 | P5/P15 | P7/P21 | | | | T6 | T4 | T5 | T1 | T2 | T3 |
| 20 | P7 RESTORE | P7 RESTORE | P5 RESTORE | | | | | | | | | |
| 21 | P13 RESTORE | P13 RESTORE | P23 RESTORE | | | | | | | | | |
| 22 | P6 | P16 | P22 | | | | | | | | | |
| 23 | P3/P4 | P9/P21 | P19/P20 | | | | | | | | | |
| 24 | | | | | | | T1 | T2 | | T6 | T4 | |
| 25 | USE BACKUP | USE BACKUP | USE BACKUP | | | | T1 | | | T6 | | |
| 26 | " | " | " | | | | | | | | | |
| 27 | " | " | " | | | | | | | | | |
| 28 | " | " | " | | | | | | | | | |
| 29 | " | " | " | | | | | | | | | |
| 30 | " | " | " | | | | | | | | | |
| 31 | P2 | P10 | P18 | | | | | | | | | |
| 32 | P1 | P11 | P17 | | | | | | | | | |
| 33 | | | | | | | | | T3 | | | T3 |
| 34 | | | | | | | | T2 | T3 | | T4 | T3 |
| 35 | USE BACKUP | USE BACKUP | USE BACKUP | | | | | | | | | |

NATIONWIDE SYSTEM FOR SELECTIVELY DISTRIBUTING INFORMATION

BACKGROUND OF THE INVENTION

The present invention relates generally to communications system and more particularly to a national warning system for informing all or selected segments of the population of emergency situations.

All civilian warnings can be divided into four categories: attack warning; crisis warning; natural disaster warning; and localized disaster warning. An attack warning is a civil defense warning that an actual enemy attack has been detected, or is taking place, and thermonuclear effects may be expected. Crisis warning could occur upon the threat of nuclear attack following a developing crucial international situation. Both attack warning and crisis warning are national in scope in that federal control is required to initiate their dissemination. Natural disaster warning includes events caused by the uncontrolled forces of nature that are sufficiently severe to result in deaths of people and destruction of property. Natural disaster warning may be forecasts or action warnings for the public to take protection actions. Localized disaster warning might be related to industrial hazards, civil disorders, limited attack effects, and so on.

The federal government has the authority and responsibility to assure that adequate measures are provided for attack and crisis warnings to the civilian population. Undoubtedly, crisis warning would originate only from the President, high level executive or military authority. Natural disaster warning is also a responsibility of the federal government, for example, the Weather Bureau and the Coast and Geodetic Survey. Local disaster warnings are responsibilities of a multitude of diverse local authorities, including civil defense, police and fire services. Although the federal government's responsibilities are limited to attack, natural disaster and crisis warnings, obviously, portions of an entire national system could be used for warning selected geographic areas.

Since the early 1950's warning has been considered to be a joint federal, state, and local responsibility. If the need ever exists, the federal government would initiate an attack warning and disseminate it over a nationwide warning system to over 1200 strategically located warning points within seconds. States are responsible to further disseminate the warning over existing state communications systems to all cities and places within their boundaries. Cities and countries alert and warn the general public via local warning systems.

Although much has been accomplished to improve the federal, state, and local warning cabilities, the weakest link is the local means to alert and warn citizens. During the 1940's and early 1950's, expected available warning time was expressed in hours but the advent of the intercontinental missile changed this to minutes. Today the time of warning from its initiation to its ultimate destination can be critical if the entire warning process is not considered as a single process and accomplished in a minimum of time.

In the early 1950's the federal government recognized the need for a mass media warning system and began to study three existing systems that might provide the capability. They are: the electric power system; the telephone system; and the radio system.

Due to various restrictions of CONELRAD that were then in effect and statements by the telephone industry that total warning over their system would involve excessive cost, the fedral government began to concentrate its efforts on various ways of using the nation's electric power system for warning. While some developments showed promise, all had one or more serious drawbacks which could not be reasonably overcome.

A fundamental limitation of CONELRAD was that the conditions under which it would be activated did not necessarily correspond to those for a Civil Defense attack warning. It was likely that CONELRAD might not be evoked much before an attack was detected. Thus, with CONELRAD as a military operational requirement, its declaration could not be counted on as being anything more than possibly coincidental with a Civil Defense warning.

Several "wired-radio" techniques were proposed and demonstrated during the 1950's. Two principal approaches used with some success were powerline coupling and limited radiation. With "powerline coupling" the Radio Frequency signal is fed onto an electric power distribution system and the resulting signal becomes available throughout that portion of the system. Such programming is expensive for a widespread community because of losses along the distribution lines, particularly at transformation points. Moreover, the cost of many transmitters would be appreciable.

"Limited radiation" is a well-known technique of running a long radiating conductor along or near the ground such as has been done along some highways. Here again, because of its expense, it was not found to be applicable for public warning.

In comparison with alerting by sirens and other audio signal devices, it is clear that the expense of a radio warning system concentrates largely at the receiving end. Although there are more than 160 million radio receivers, AM, FM, and television, in use in the United States these are in use only a few hours a day. Without special alarm receivers, or alarm modifications to existing sets, warning by radio would only approach the required coverage during the prime evening hours of approximately 7 to 10 P.M. local time. Therefore, a public warning by radio must be dependent on widespread distribution of an inexpensive radio alarm receiver.

In 1957, radio receivers were built to the design necessary to accomplish activation by CONELRAD. The estimated production cost was 35 dollars, with a somewhat lower price achievable through quantity production or by tightening the tolerances of the CONELRAD breaks and tone. At this point, radio warning became eclipsed economically by powerline warning. Radio receivers were roughtly 5 times as expensive; their tubes would require at least yearly maintenance, and there were the limitations imposed by CONELRAD operations.

In 1962, all these limitations were dramatically changed. CONELRAD was abandoned by the military; the solid state revolution in electronics had brought increased reliability to radio circuits, and the costs of transistors had become so low that simple radio receivers cost less than 5 dollars. Since the signal selectors and alarm activators for a radio receiver are fundamentally the same as for powerline receivers, the costs of the receivers were comparable. Furthermore, the radio device had the distinct advantage of providing voice to confirm and clarify the alert.

The federal government therefore, began an investigation to bring the state of knowledge on radio warning up to a point where its feasibility could be compared with powerline alerting. This study showed that radio warning is feasible, and would cost about $1.5 billion to cover the entire population, or somewhat less than ten dollars per person including the cost of the receiver. As noted earlier, the principal costs are in the millions of receivers required. From further investigation it became apparent that good receiver design at reasonable cost could be an achievable goal provided that certain refinements are accomplished. Therefore, it became appropriate to examine the full complex of radio warning from the point or points at which the warning is to be introduced into the system through the distribution portion of the system, and into the portion which would go to the public for its reception.

Studies were made of many existing resources that might satisfy requirements for a radio warning system. These included the very low frequency and low frequency radio stations of the National Bureau of Standards, the LORAN C facilities of the U. S. Coast Guard, the various radio services regulated by the FCC, military communications system, and special purpose LF transmitters.

Investigation of military systems failed to identify any possible system beyond the LORAN C that would meet civil defense requirements and not conflict with military requirements. After several years of study, the use of LORAN C was discontinued because of high equipment costs, poor performance, and other factors. Radio services regulated by the FCC were eliminated except for the commercial broadcast band because of cost and performance especially under a nuclear environment. The possible use of the National Bureau of Standard's LF/VLF radio facilities appeared to be the most satisfactory base upon which to build a radio alert and warning system.

It is from this background that the system of the present invention evolved. Thus, the objects of the present invention include those listed in the following paragraphs:

It is an object of the present invention to provide a national warning system by which the public and various governmental agencies can be reliably and timely warned from a central location of an emergency such as enemy attack, dangerous weather conditions, etc. Such a system should utilize radio receivers to disseminate voice messages as well as actuate teletype machines. Moreover, different types of warning or alerting devices should be selectively actuable by the system.

The system should also be capable of being activated any time of day, any day of the year, and provide adequate signal strength to activate public radio receivers located anywhere within the country. Moreover, the system should be capable of operating automatically from the time of activation through the delivery of the alert signal and/or warning message to the public.

The operational status of components at each level of the system should automatically be made available at the central initiation point. An indication of successful operation or failure of the system at any and all levels above the receiver should be provided to the operator at the central initiation point at the time of system activation.

The receiver component of the system should normally remain in a muted condition; that is, the audio portion of the receiver should not operate until it is necessary to transmit a signal or message through the receiver to the recipient.

The public receiver component of the system should operate under the positive control of the system operator; that is, the unmuting and remuting of the receiver should be controlled by signals from the alert and warning transmitter. Whenever the signal stops, the receiver should return to the muted condition. The equipment used to generate the alerting sound should be located at the transmitter of the radio station that distributes the signal to other radio stations or that delivers the signal to the public, but not in the home receiver itself. The system should be capable of transmitting messages to the public with or without the accompanying alerting sound.

The system should be capable of transmitting either live or pretaped messages to the public. The response time of the system should be such as to insure that an alert and warning can be provided to target areas within a time period approaching one minute as a maximum and to nontarget areas within a time period approaching three minutes. The reliability of the system should be such that the expected number of people put at risk by failures in the system does not exceed 0.1 percent of the entire population.

Redundant equipment should be installed in the system above the public receiver level as necessary to assure reliability. Where such redundancy exists, automatic switchover to standby equipment should be provided in the event of a failure in the active equipment.

SUMMARY OF THE INVENTION

An information distribution system according to the present invention is arranged to provide warning and alert information to selective entities throughout the United States. The system is activated from one of three geographically spaced national warning centers (one primary, two alternate) which have independent access to two high-powered 61.15 kHz control transmitting stations (one primary, the other alternate). Connection between the warning centers and control transmitters is via wireline. A distribution subsystem includes ten geographically spaced distribution transmitters deployed such that the warning center has the capability of transmitting to the distribution transmitter stations via the active control transmitter.

A redundant wireline path between the warning centers and the distribution stations enables real-time messages to be transmitted directly from the warning center. The active 61.15 kHz control station activates all distribution stations which failed to receive the activation command instituted by the warning officers via the wireline network. The distribution stations are programmed to automatically transmit (at nominally 200 kHz) all information and instructions which are required to completely effect distribution. The warning center has the capability of activating the system to transmit both voice and teletype instructions on an "ad-lib" basis to cover an immediate situation.

In order to provide the required information distribution capability, switching connections, and redundancy for reliability, a redundant wireline loop between the three warning centers is incorporated into the system. Each of the warning centers is tied to the other two such that the resulting circuits form a complete loop with different routings for the various segments. In this manner, a failure in any single leg of the tie loop does not inhibit the operation of the system from any of the warning centers. A line-fault signal is circulated through the legs of this loop and displayed at each of the centers for the purpose of readily determining whether the circuits are in working condition at every instant.

The two 61.15 kHz, high-powered control transmitter stations are employed to give full signal coverage from each transmitter to the entire continental United States. The function of these stations is to transmit teletype information to those warning points which are equipped to receive signals from this primary source, to furnish switching information to the distribution stations, and to provide highly reliable switching signals for activation of the siren systems.

The distribution stations comprise a dedicated network of low frequency radio facilities of sufficient number and spacing to provide coverage of the entire continental United States. These facilities provide all alert and warning information to the various government and institutional warning points rather than depending on automatic activation and rebroadcast of the information by commercial broadcasting stations. Warning of the general public is provided automatically through the distribution subsystem facilities or, alternately, through manual rebroadcast by commercial radio and television stations. The distribution stations also transmit control signals for activation of other warning devices such as sirens or bell and light warning systems.

A monitoring subsystem automatically provides system status information to the operator at the active warning center. System monitoring falls into two general categories: first, monitoring to confirm that a command has been transmitted; and second, that the transmitter facility is ready for operation should the system, usually in standby, be required to transmit a message. In addition, the monitoring subsystem provides the system operating personnel with an indication if a transmitter is operated through unauthorized means, or if any of a number of faults such as line failure or serious anomalies such as fire occur in an unmanned facility.

BRIEF DESCRIPTION OF DRAWINGS

The above and still further objects, features and advantages of the present invention will become apparent upon consideration of the following detailed description of specific embodiments thereof, especially when taken in conjunction with the accompanying drawings, wherein:

FIG. 7 is a plan view of a wireline status display panel located at each warning center;

FIG. 9 is a table which indicates the various functions effected by logic unit I of FIG. 6;

DESCRIPTION OF PREFERRED EMBODIMENTS
SYSTEM PHILOSOPHY

Figure 1:
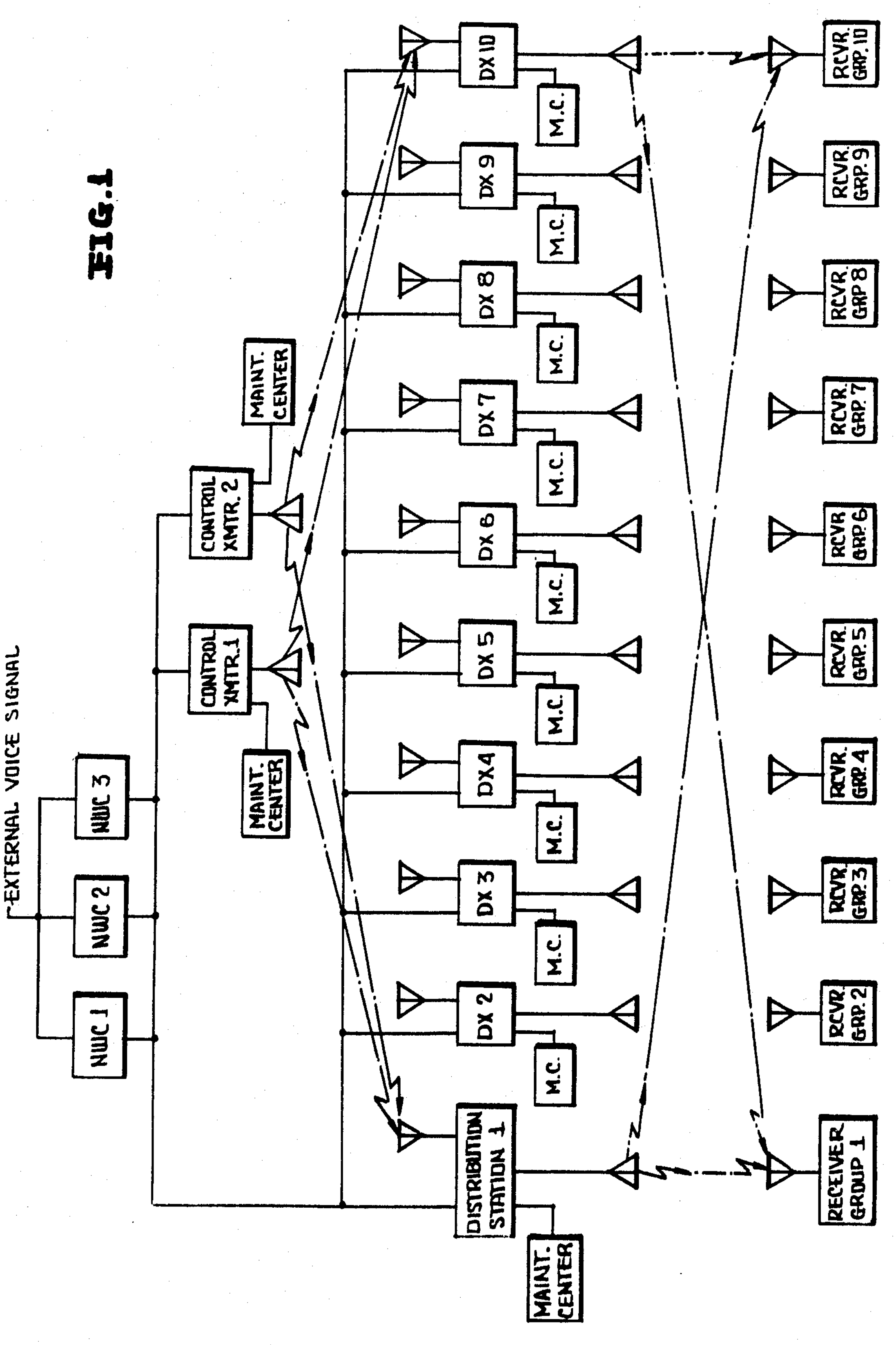
FIG. 1 is a block diagram showing interconnections between the major components of the information distribution system of the present invention.
Figure 2:
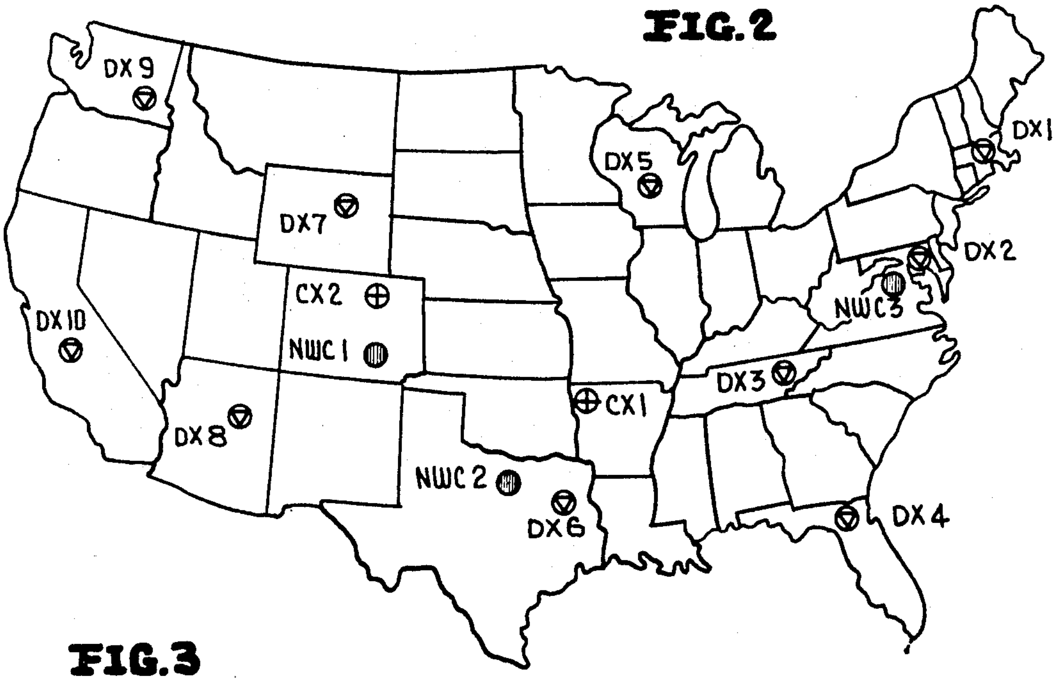
FIG. 2 is a map of the United States showing the location of the major components of the system of FIG. 1.

Referring specifically to FIG. 1 of the accompanying drawings, three national warning centers NWC1, NWC2 and NWC3 are geographically spaced at respective locations in the continental United States. NWC1 is the normally active center from which system control originates; NWC2 and NWC3 are redundant alternates. A wireline network interconnects all three national warning centers to permit control of the system to be shifted from NWC1 to either NWC2 or NWC3 manually, if control is relinquished at NWC1, or automatically in the event NWC1 becomes inoperative. By way of example, the locations of the three national warning centers is as follows: NWC1 is in Colorado Springs, Colorado; NWC2 is in Denton, Texas; and NWC3 is in the vicinity of Washington, D.C., as illustrated in FIG. 2.

The three national warning centers are also connected, by wireline, to each of ten distribution stations DX1, DX2, - - - DX10 which are located in respective regions of the United States. For example, the 10 distribution station locations may be those indicated in Table I and illustrated in FIG. 2.

TABLE I

| Transmitter | Location |
| --- | --- |
| DX1 | Natick, Massachusetts |
| DX2 | Edgewood, Maryland |
| DX3 | Morristown, Tennessee |
| DX4 | Starke, Florida |
| DX5 | Mazomanie, Wisconsin |
| DX6 | Carthage, Texas |
| DX7 | Alcova, Wyoming |
| DX8 | Winslow, Arizona |
| DX9 | Wallula, Washington |
| DX10 | Selma, California |

Each distribution station includes a transmitter for broadcasting radio signals (at nominally 200 KHz) to cover the entire region in which that station is located. The distribution station transmitting frequencies may differ slightly in adjacent regions to prevent interference and confusion. Commands initiated at the active national warning center are sent via the wireline to all of the distribution stations to effect broadcast of appropriate pre-programmed messages from selected distribution stations. The command from the warning center also designates a demuting code to be transmitted from the distribution station so that only selected receivers in the regions receive the broadcast message.

The national warning centers are also connected by wireline to each of two control stations CX1 (normally active) and CX2 (redundant alternate). As illustrated in FIG. 2 by way of example, CX1 may be located in Colorado, CX2 in Arkansas. Each control station includes a high power radio transmitter capable of transmitting the warning center command to the ten distribution stations. For this purpose the distribution center includes a receiver tuned to the control transmitter frequency (nominally 60 KHz). Thus, command transmission between the active warning center and the 10 distribution stations may be by wireline or radio link, depending upon the selection made by the warning center operator and upon the system operating mode.

Ten regional maintenance centers M1, M2, . . . M10 are associated with respective distribution stations DX1, DX2, . . . DX10. In addition regional maintenance centers M11 and M12 are associated with control stations CX1 and CX2, respectively. The regional maintenance centers are located within approximately twenty miles of their respective distribution or control stations and are basically maintenance monitoring facilities. Parameters for each station can be measured from and displayed at its regional maintenance center. In addition, certain critical parameters for all stations are monitored at the active national warning center.

Operation of the system is controlled and initiated from the active national warning center by the closure of a switch or similar actuation. A designated command is then sent to the distribution stations via the wireline and the control transmitter radio link. The command is in the form of one or more plural character words, each character including a plurality of bits which are transmitted serially. The commands designate the system mode, the distribution stations required to take action, the receivers which are to be demuted to receive a message to be transmitted, and the medium to be used for command transmission (radio or wireline).

In addition to transmitting commands, each national warning center is capable of transmitting voice and teletype messages, recorded or live, via the wireline network to the distribution stations for relay broadcast to designated receiver groups. The warning centers also include monitoring equipment and recorders for keeping track of the operability status of the control and distribution stations.

The system has two primary operating modes, Modes I and II. In Mode I, designated an alert or warning mode, the system operates automatically, in response to warning center commands, to: activate sirens; and/or deliver pre-recorded standard voice messages; and/or deliver pre-recorded standard teletype messages. The pre-recorded standard messages are stored at each distribution station for possible utilization in this mode.

In Mode II, designated an information dissemination mode, real-time voice and/or teletype messages are distributed to selected recipients under the control of the active warning center. The term "real-time" in this instance indicates that the message is sent to all distribution stations simultaneously for simultaneous retransmission in various designated regions of the country. This is in distinction to the Mode I transmission of the standard messages recorded at the distribution stations, which messages are transmitted from each distribution station as soon as the transmitter comes up to full power. Thus, in Mode I, the same recorded message may be transmitted at somewhat different times in different regions; in Mode II the warning center operator must wait until all affected distribution transmitters are at full power before sending the message to be transmitted.

The system described in broad terms above in relation to FIGS. 1 and 2 is described in greater detail in subsequent paragraphs.

Figure 3:
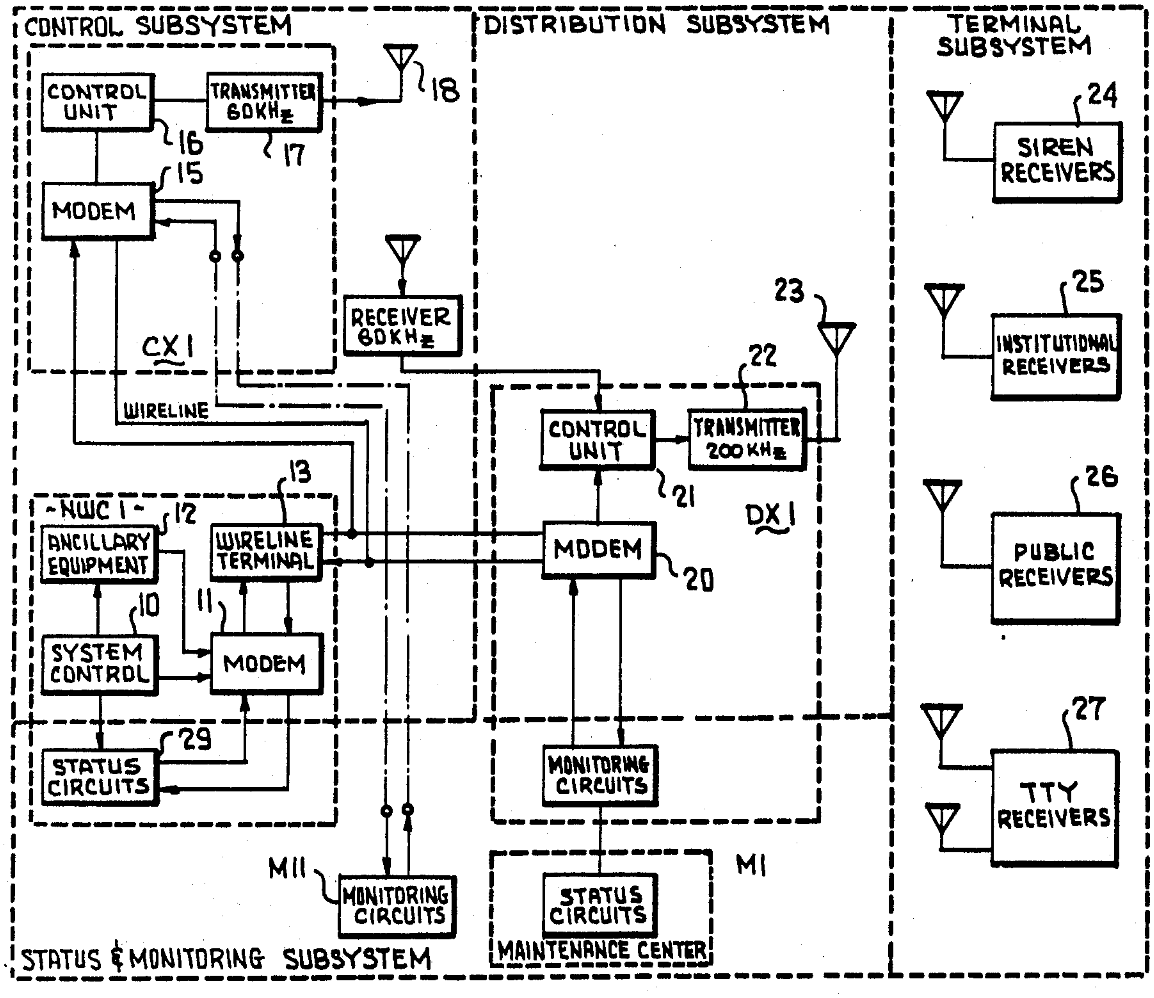
FIG. 3 is a block diagram showing the functional subsystems of the system of FIG. 1.

Referring to FIG. 3 of the accompanying drawings, the major functional subsystems of the system are illustrated in respective blocks enclosed in heavy dashed lines; physically separate portions of the system, which may include components encompassed by more than one functional subsystem, are enclosed within thin dashed lines. For simplification purposes, only one national warning center (NWC1), one control station (CX1) and one distribution station (DX1) are illustrated in FIG. 3. The equipment illustrated for each of NWC1, CX1 and DX1 in FIG. 3 is also present in NWC2-3, CX2 and DX2-10.

The functional subsystems are as follows: the wireline subsystem, which includes both leased wirelines and a redundant AUTOVON circuit and which interconnects the national warning centers with one another and to the control stations and distribution stations; the control subsystem, which includes portions of the national warning centers and control stations and which functions to initiate and distribute the commands required to operate the system; the distribution subsystem, which includes a portion of the distribution stations and which functions to distribute the designated messages to specified recipients; the terminal subsystem, which includes various types of receivers and operative devices which respond to the messages transmitted from the distribution stations; and the status and monitoring subsystem, which includes part of the warning centers, the control stations and the distribution stations, and which functions to maintain and monitor parameters at the various system transmitters. The components in the various functional subsystems are described briefly, in relation to FIG. 3, and a greater detail subsequently.

Figure 5:
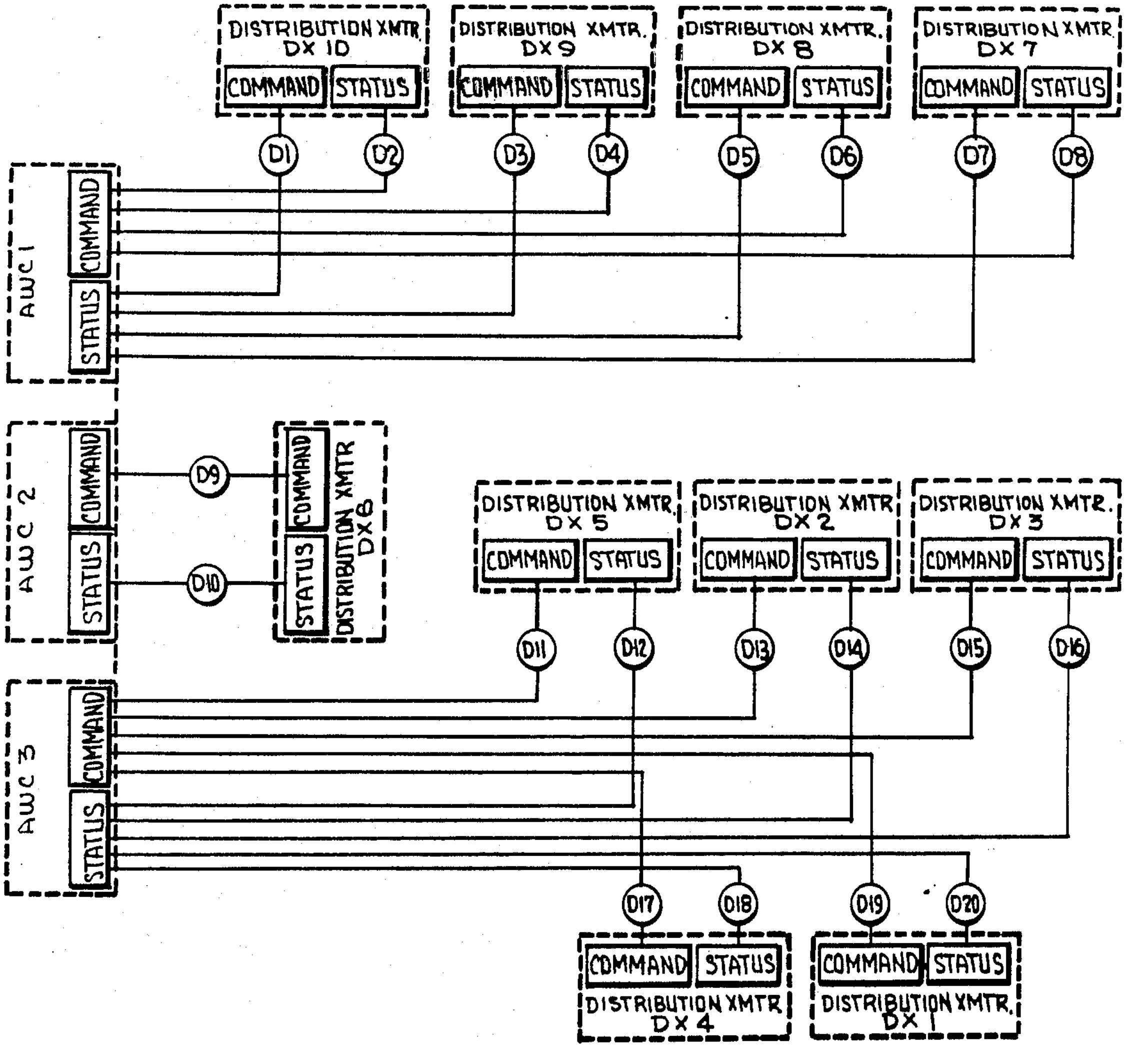
FIG. 5 is a schematic diagram of the portion of the wireline subsystem interconnecting the warning centers with the distribution centers of the system of FIG. 1.
Figure 6:
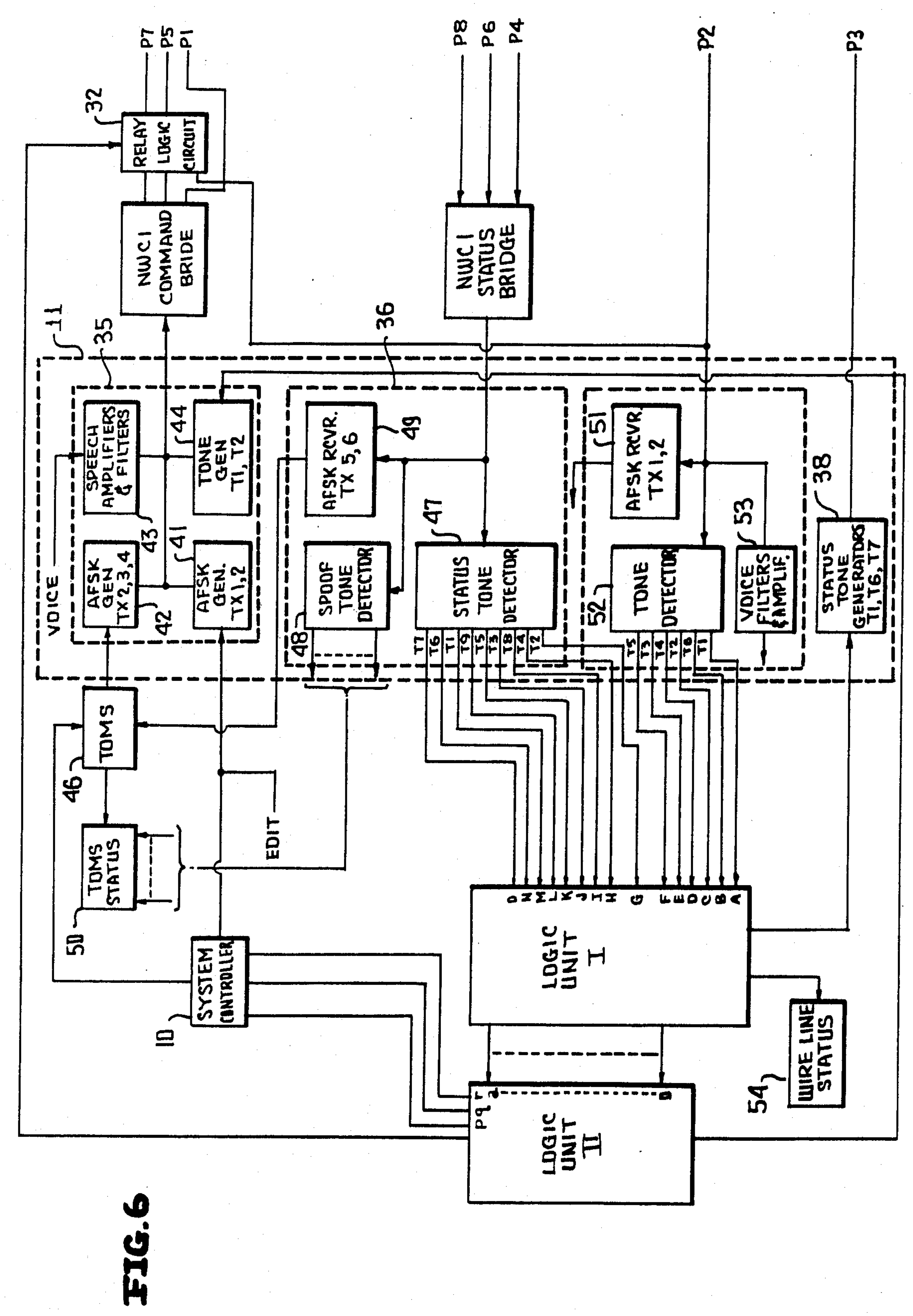
FIG. 6 is a functional block diagram illustrating the modem at the warning centers and the interconnections thereto.

The portion of the control subsystem residing in the national warning center includes the system controller 10, a modem 11, ancillary equipment 12 and a wireline terminal 13. The system controller 10 which is described in greater detail in relation to FIGS. 10 and 11, includes the switches, indicators, and logic circuitry which permit an operator to oversee and control overall system operation. Modem 11, which is described in greater detail in relation to FIG. 6, is a speech and data terminal for the national warning center and permits simultaneous or individual transmission of voice, data, test and supervisory signals to the other warning centers, the control stations, and the distribution stations via the wireline subsystem. In addition the modem permits simultaneous or individual reception at the warning center of supervisory and test signals originating at other warning centers and at the control and distribution centers. The ancillary equipment 12, which is described in greater detail in relation to FIG. 10, includes peripheral equipment, (such as recorders, teletypewriters, etc.) utilized as input or output devices in conjunction with other system components, for the generation of command signals, monitoring system activation, and interfacing with off-site (i.e., — away from the NWC) wireline input signals, such as original voice broadcast material. The wireline terminal 13 which is described in greater detail in relation to FIGS. 4, 5 and 8, encompasses part of the wireline subsystem and includes switching circuitry to permit restoration of command lines between warning centers if one or more lines fail, and to permit manual and automatic switching of system control to NWC2 and NWC3.

Figure 12:
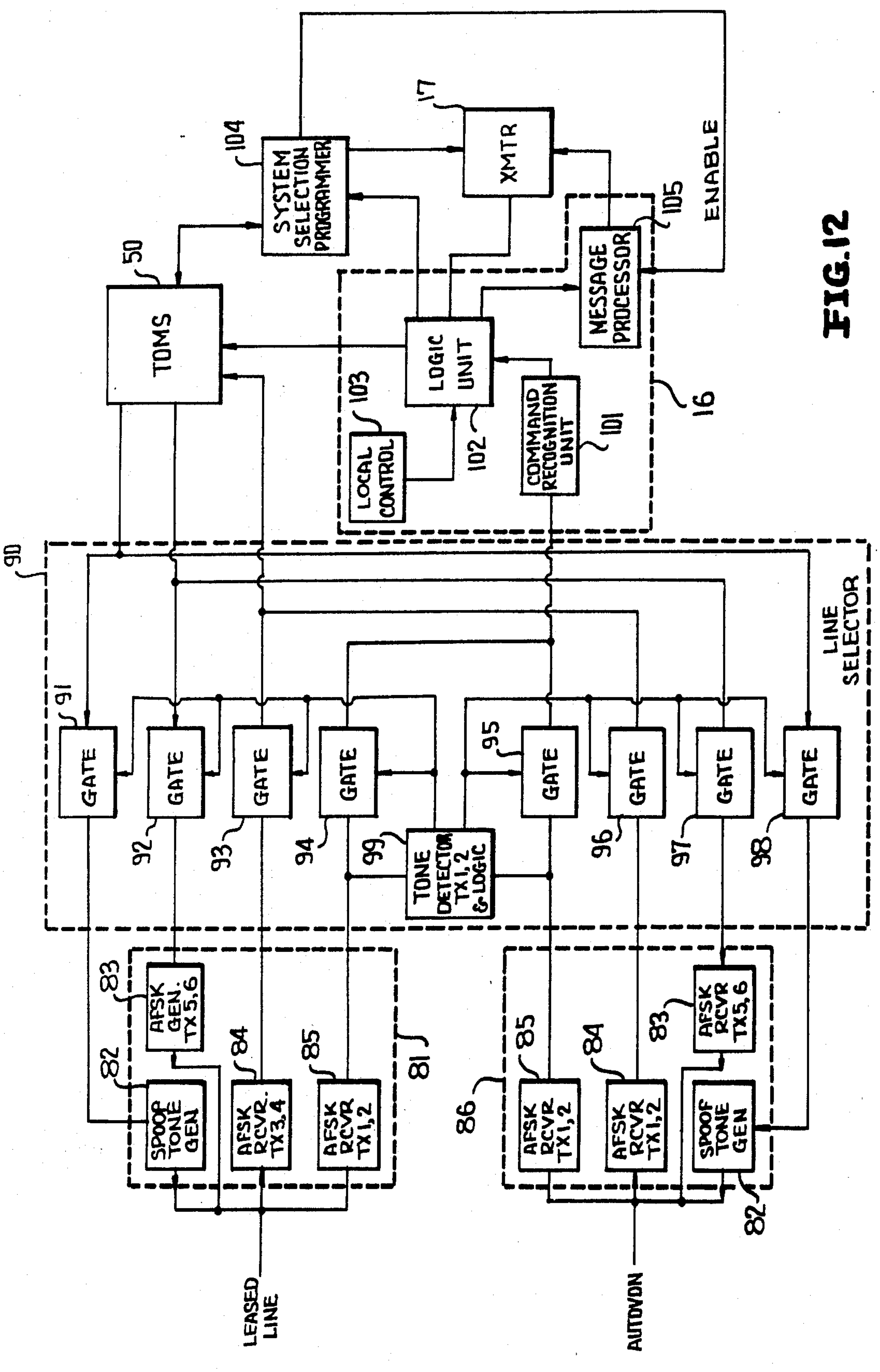
FIG. 12 is a functional block diagram of the control components located at each control transmitter station.

The portion of the control subsystem at control station CX1 is described in greater detail in relation to FIG. 12 and includes a modem 15, a control unit 16, a transmitter 17 and transmitting antenna 18. Modem 15 combines data and signalling functions for the control station on common wireline network. It permits transmission of control transmitter status to the warning center and reception of test and distribution commands from the warning center. Control unit 16 accepts commands received from the warning center and initiates the required response at the control station. This response involves selection of the proper command information source, decoding command information, and operating the control station equipment as required by the decoded command. Transmitter 17 includes a high power (nominally 300 KW average) radio transmitter and associated switching and fault sensing equipment. It is capable of fully automatic unattended operation. The transmitting frequency is nominally 60 KHz. The output signal from transmitter 17 is applied to antenna 18 from which the signal is radiated at sufficient power to reach substantially all of the continental United States.

Figure 15:
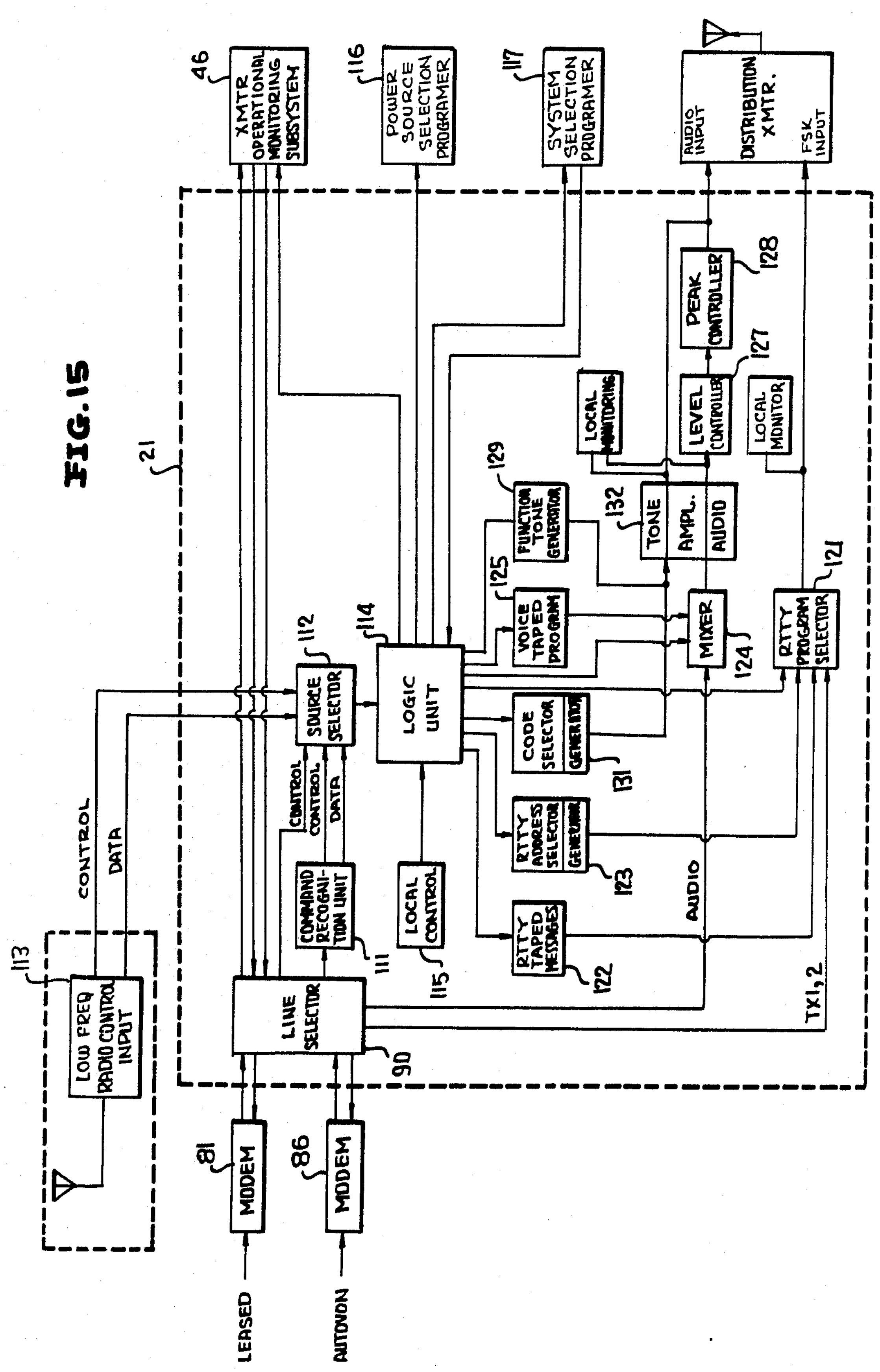
FIG. 15 is a functional block diagram of each distribution transmitter station.

The distribution subsystem, which is described in greater detail in relation to FIG. 15, is located at the distribution stations and includes, at each station, a modem 20, a control unit 21, transmitter 22 and antenna 23. Modem 20 provides the necessary interface functions between the wireline network and the control and monitoring circuitry at the distribution station. The signals to be interfaced include voice, data and supervisory signals. Control unit 21 includes components necessary for selecting the command information source, decoding command information, and initiating responses at the distribution station to commands from the warning center. Included in the control unit functions are the generation of demuting codes to permit selective receiver addressing and the activation of prerecorded voice and teleprinter messages. Transmitter 22 includes two transmitters (one redundant) and associated fault sensing and switching circuits. The transmitters are capable of delivering a nominal 50 KW of average power, at nominally 200 KHz, to radiating antenna 23.

The terminal subsystem includes a multiplicity of receivers which respond in different ways to the signal transmitted from the regional distribution station. These receivers are of four basic types. Siren receivers 24 are installed where necessary for civil defense purposes and are actuable, upon receiving the proper demuting code, to turn on a siren. Institutional receivers 25 are installed at various government facilities and are normally muted; upon receiving the proper demuting code these receivers provide an audio output signal until the demuting code is no longer received. Public receivers 26 may be separate units or may be included in home radios and television sets; these receivers are also selectively demutable and are capable of reception of AM voice broadcast and frequency-shift keyed (FSK) data. TTY receivers 27, when demuted, are capable of operating teleprinters in accordance with FSK data transmitted from the regional distribution station.

The status and monitoring subsystem is described in greater detail in relation to FIGS. 18, 19, 20 and 21 and includes the maintenance centers M1 through M12 as well as status circuits 29 at the warning centers. The status and monitoring subsystem performs the following: monitoring of transmitter parameters at the control and distribution stations; telemetering the monitored parameters to the regional maintenance centers; manual and periodic automatic testing of system transmitters under the control of the national warning center; and display of transmitter status at the warning centers.

WIRELINE SUBSYSTEM

The wireline subsystem includes a network of dedicated leased line pairs, backed up by redundant conferencing in the national AUTOVON network. For purposes of the present description, only the leased wireline network is described unless otherwise specified.

Figure 4:
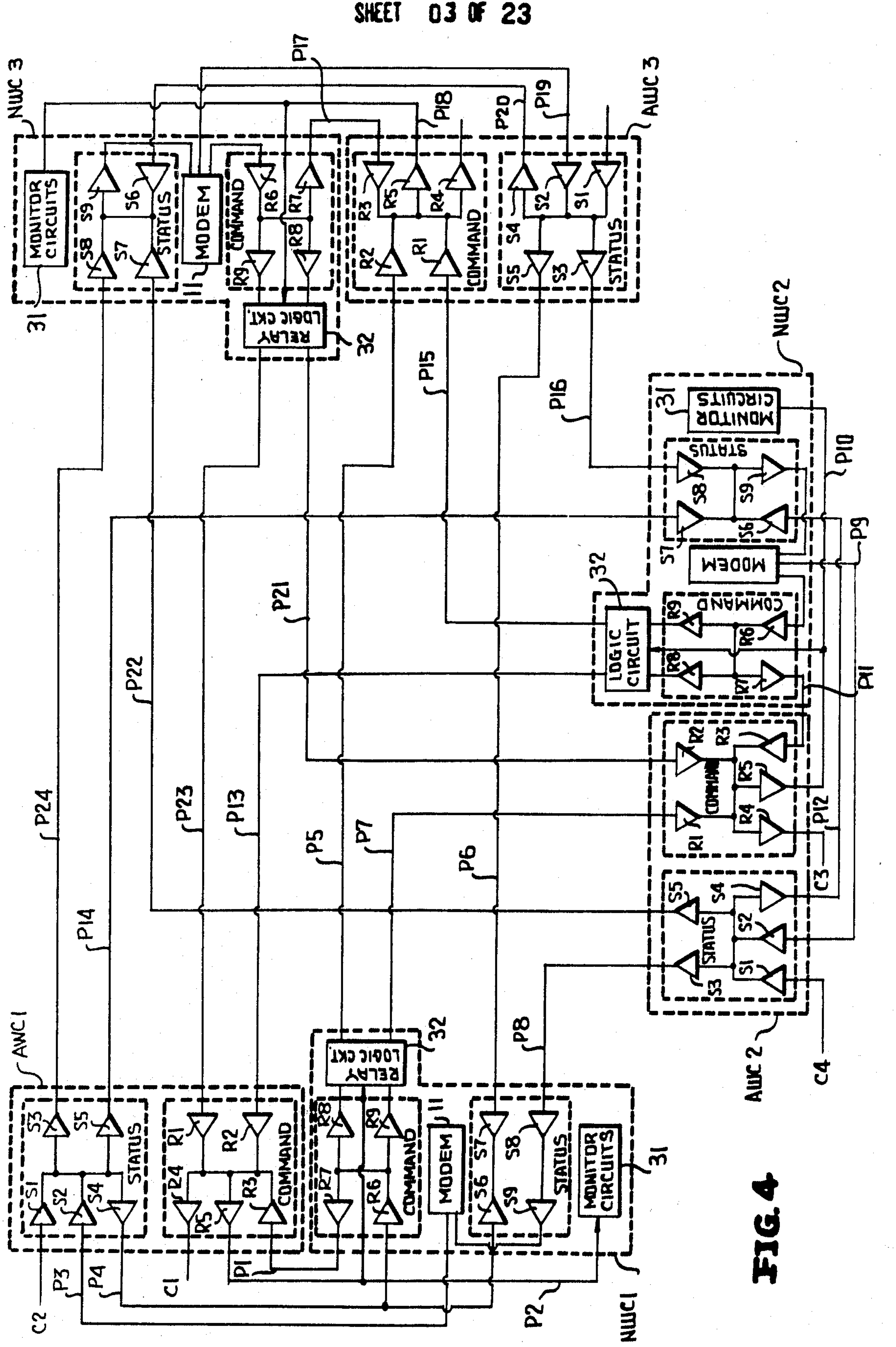
FIG. 4 is a schematic diagram of a portion of the wireline subsystem interconnecting the national warning centers of the system of FIG. 1.

The portion of the wireline subsystem which interconnects the warning centers is illustrated in FIG. 4 to which detailed reference is now made. The national warning center wireline terminal, designated by reference numeral 13 in FIG. 3, includes four signal distribution bridge networks at each national warning center. Two bridges, a status bridge and a command bridge, are located at an alternate wire center (AWC), there being an alternate wire center associated with each national warning center. Specifically, AWC1, AWC2 and AWC3 are located within approximately twenty miles of NWC1, NWC2 and NWC3, respectively, and each AWC includes a status and command bridge. Likewise, each NWC includes a status bridge and a command bridge as part of the wireline terminal.

The signal distribution bridges may each comprise a plurality of isolation amplifiers, as illustrated, or may be other types of well-known distribution bridge circuits. In the amplifier bridges shown in FIG. 4, each input wireline feeds its own isolation amplifier and each wireline output is provided by a respective isolation amplifier. The input amplifiers at each bridge have their output terminals tied together and connected to the input terminals of each output amplifier.

The portion of the AWC1 status bridge illustrated in FIG. 4 includes two input amplifiers S1 and S2 and three output amplifiers S3, S4 and S5. The illustrated portion of the command bridge of AWC1 includes three input amplifiers R1, R2 and R3, and two output amplifiers R4 and R5. The illustrated portion of the command bridge at NWC1 includes one input amplifier R6 and three output amplifiers R7, R8 and R9. The output signals from amplifiers R8 and R9 pass through relay logic circuit 32 before being passed to the other warning centers. Circuit 32 is described in detail subsequently. The illustrated portion of the status bridge at NWC1 includes three input amplifiers S6, S7 and S8, and one output amplifier S9. The status and command bridges at AWC2, NWC2, AWC3 and NWC3 include amplifiers which are similar to those at AWC1 and NWC1 and which are designated by the same reference numerals as those at AWC1 and NWC1.

The individual wirelines P1–P24 illustrated in FIG. 4 each represent a wire pair. The wire pairs are connected to various bridge amplifiers and serve as a transmission network between warning centers for audio frequency signals. Each audio tone frequency represents a specific status or control function and is generated at the modem 11 of an NWC. Tones received at an NWC modem 11 are processed for that NWC by logic circuitry which is described in relation to FIG. 6.

One function of the wireline subsystem is to permit system control to be transferred from one NWC to another. To this end, nine status-indicating audio tones of different frequency are selectively transmitted from the various NWC's, three tones being assigned to each NWC. The tone assignment is as follows: tones T1, T6 and T7 originate at NWC1; tones T2, T4 and T8 originate at NWC2; and tones T3, T5 and T9 originate at NWC3. Tones generated at modem 11 at NWC1 are passed to amplifier S2 of the status bridge at AWC1 via wireline P3. The tones are then distributed by status bridge amplifier S3 and S5 of AWC1. Specifically, amplifier S3 of AWC1 feeds status bridge amplifier S8 of the NWC3 status bridge via wireline P24; amplifier S5 of AWC1 feeds status bridge amplifier S7 of the NWC2 status bridge via wireline P14.

Status tones generated at modem 11 of NWC2 are passed to AWC2 status bridge amplifier S2 via line P9 and are distributed by AWC2 status bridge amplifiers S3 and S5. AWC2 amplifier S3 feeds NWC1 status bridge amplifier S8 via line P8; AWC2 amplifier S5 feeds NWC1 status bridge amplifier S7 via line P22.

Status tones generated at modem 11 of NWC3 are passed to AWC3 status bridge amplifier S2 via line P19 and are distributed by AWC3 status bridge amplifiers S3 and S5. AWC3 amplifier S3 feeds NWC2 status bridge amplifier S8 via line P16; AWC amplifier S5 feeds NWC1 status bridge amplifier S7 via line P6.

The status bridge amplifier S4 at each AWC also passes the tone generated at its associated NWC to the status bridge for that NWC. Specifically, amplifier S4 at each AWC feeds amplifier S6 at the associated NWC status bridge via lines P4, P12, and P20 at NWC1, NWC2 and NWC3, respectively. Amplifier S9 at each NWC status bridge passes all received status tones to modem 11 at that NWC. The modem feeds logic circuitry, described subsequently, which interprets system control status from the received status tones. If tones prescribed for normal control status are not received at any NWC, the logic circuitry at that NWC changes the tone it generates and makes an appropriate correction in the control signal distribution network. This correction may be a change in control from NWC1 to NWC2, if NWC1 is out of commission, or to NWC3, if both NWC1 and NWC2 are out of commission. If the received-tone logic indicates that a wireline is out of commission but that all NWC's are still operational, control is not changed but the routing of signals is changed to by-pass the wireline fault.

One function of the AWC status bridge may thus be summarized as distributing status tones generated at the local NWC. A function of the NWC status bridge is to receive all system status tones and feed the received tones to the modem for logic interpretation and processing. The NWC status bridge, as described below, also receives AFSK (audio frequency shift keyed) logic signals representing the operating status of the distribution transmitters.

The portion of the NWC command bridge illustrated in FIG. 1 is responsible for distributing command signals, also in the form of audio tones, throughout the system. As is described in detail subsequently in relation to modem 11, the command signals are a composite of AFSK binary words, steady state tones, and speech. Whatever the nature of the signal to be distributed by the NWC command bridge, it is received at amplifier R6 of that bridge from modem 11. At NWC1 the signal is then fed: by R7 to AWC1 amplifier R3 via P1; by R8 to AWC3 amplifier R2 via P5; and by R9 to AWC2 amplifier R1 via P7. At NWC2 the command bridge signal is distributed: by R7 to AWC2 amplifier R3 via P11; by R8 to AWC1 amplifier R2 via P13; and by R9 to AWC3 amplifier R1 via P15. At NWC3 the command bridge signal is distributed: by R7 to AWC3 amplifier R3 via P17; by R8 to AWC2 amplifier R2 via P21; and by R9 to AWC1 amplifier R1 via P23.

As indicated in the preceding paragraph, a function of the AWC command bridge is to receive signals originating at the three NWC command bridges. The received signals, which may be AFSK command words, status tones or voice signals, are then applied to monitor circuitry 31 (actually part of modem 11) by amplifier R5 and are processed by logic circuitry to be described. In this manner, system control is determined by appropriate command signals and all NWC's are kept up to date as to the nature of command signals being transmitted by the active NWC.

Two additional functions to be mentioned in relation to FIG. 4 concern interconnections between the NWC's and the control transmitters CX1 and CX2. Specifically, the AWC1 command bridge sends command signals to transmitter CX1 via a wireline pair designated C1. Return information signals from CX1 are delivered to AWC1 status bridge amplifier S1 via wireline pair C2. Since the AWC1 command bridge receives all command signals, regardless of which NWC is active, transmitter CX1 may be controlled or tested from any active NWC. Likewise, return information from CX1 is distributed for monitoring purposes by the AWC1 status bridge to all NWC modems. A similar arrangement is provided for interconnecting the NWC's with control transmitter CX2, wherein command signals are sent to CX2 from AWC2 amplifier R4 via line C3; return information from CX2 is received by AWC2 amplifier S1 via line C4.

In addition to the functions described in relation to FIG. 4, the wireline subsystem is responsible for distributing commands to the distribution transmitters and receiving test information therefrom. The interconnections for effecting these functions are illustrated in FIG. 5 wherein additional output lines are illustrated for each of the AWC command bridges and additional input lines are illustrated for each of the AWC status bridges. These bridges are the same as those illustrated at the AWC's in FIG. 4, it being understood that each additional line utilizes another amplifier in the bridge. The wirelines D1-D20 illustrated in FIG. 5 represent respective wireline pairs.

The command bridge at AWC1 distributes system commands to DX10, DX9, DX8 and DX7 via respective lines D1, D3, D5 and D7. Likewise the AWC1 status bridge receives status information from DX10, DX9, DX8 and DX7 via respective lines D2, D4, D6 and D8. In a like manner, AWC2 is directly interconnected with DX6, and AWC3 is directly interconnected with DX1, DX2, DX3, DX4 and DX5. Since all AWC command bridges receive system commands from the active NWC, all distribution transmitters are controlled by the active NWC even though all are not directly connected to the active NWC. Likewise, status information from each distribution transmitter is available not only at the modem 11 of the NWC to which that transmitter is directly connected, but also at the modems of the two other NWC's by virtue of the interconnections illustrated in FIG. 4.

CONTROL SUBSYSTEM

The control subsystem is responsible for generating the proper command, control and test signals to be distributed throughout the system. As illustrated in FIG. 3, the control subsystem includes components located at the national warning centers and the control transmitter. The national warning center components will be described first, with NWC1 components being illustrated to represent like components at the other warning center. Where significant differences exist between warning centers, these are described in detail.

Referring specifically to FIG. 6 of the accompanying drawings, the modem 11 of NWC1 is illustrated within heavy dashed lines and includes a command origination modem section 35, a status receiving detection section 36, a monitor receiving-detector section 31 and a status tone generator section 38.

Command origination modem section 35 includes two AFSK (audio frequency shift keyed) generators 41, 42, a speech amplifier and filter section 43 and a tone generator section 44. AFSK generator 41 continuously generates either of two audio command tones TX-1 or TX-2 depending upon level of the binary signal applied to generator 41 from the system controller 10. In this manner a binary word comprising a series of bits in AFSK format can be generated for transmission from NWC1. AFSK generator 42 is similar to AFSK generator 41 but generates command frequencies TX-3 and TX-4 to represent respective binary levels. Generator 42 is controlled by binary signals from the Transmitter Operation Monitoring Subsystem (TOMS)46 which, as is described subsequently, is utilized to evaluate the overall system condition. AFSK tones TX-3 and TX-4 are utilized throughout the entire system (at all NWC's) for status interrogation signals; AFSK tones TX-1 and TX-2 are utilized throughout the system for operational command signals.

The output signals from AFSK generators 41 and 42 are components of a frequency multiplexed composite signal applied to the NWC1 command bridge for distribution throughout the system. Also part of the composite signal is a voice signal, filtered and amplified by circuit 43, which may be either a "live" or taped message intended for broadcast by the distribution transmitters. Still other components of the composite signal applied to the NWC1 command bridge are the output signals from the status tone generators 44. At NWC1, these tones are T1 and T6 which are selectively actuable by logic unit II in accordance with logic conditions described below. Tones T1 and T6 are two of the status tone originating at NWC1. Unit 44 at NWC2 includes generators for tones T2 and T4; at NWC3 unit 44 includes generators for tones T3 and T5. The composite output signal from command origination modem section 35 is applied to amplifier R6 (FIG. 4) of the NWC1 command bridge, from which the signal is distributed throughout the system.

The composite frequency multiplexed output signal from amplifier R9 (FIG. 4) of the NWC1 status bridge is applied to the status receiving detection circuit 36 which includes a status tone detector 47, a spoof tone detector 48 and AFSK receiver 49. AFSK receiver 49 is arranged to receive command tones TX-5 and TX-6. These AFSK tones originate at the various transmitters and are arranged as binary words, in AFSK format, which indicate the present condition of certain transmitter parameters. Receiver 49 converts the AFSK bits into bits represented by different signal levels which are applied to the TOMS unit 46 to permit monitoring of transmitter parameters. The TOMS unit operation is described in greater detail in relation to FIG. 18.

The spoof tone detector 48 is capable of detecting any of 12 spoof tones SR1–12, individually or in combination. Spoof tones, as described in detail hereinbelow, originate at the respective transmitters to indicate an unauthorized attempt to operate a transmitter. A detected spoof tone initiates a corresponding signal which is applied to the TOMS status circuit 50 to provide an indication of the presence of the tone.

Status tone detector 47 detects the presence of status tones T1–T9 in the composite output signal from the NWC1 status bridge. Each detected status tone produces a logic level on a respective detector output line. These lines are connected to logic unit I. Specifically, binary one logic levels representing detected tones T2, T4, T8, T3, T5, T9, T1, T6 and T7 are applied to terminals G through O, respectively, of logic unit I.

The composite signals received by the AWC1 command bridge (FIG. 4) are fed by amplifier R5 of that bridge to the monitor receiving-detector section 31 of modem 11. The connection at NWC1 is via wireline pair P2, as shown in FIG. 6; at NWC2 this connection is via P10, and at NWC3 the connection is via P18. Circuits at modem section 31 which receive the composite signal from the AWC command bridge include an AFSK receiver 51, a status tone detector 52, and voice filters and amplifiers 53. AFSK receiver 51 is arranged to receive AFSK command tones TX-1 and TX-2 which originate at the various NWC's and represent commands issued from the active NWC. The command words represented by TX-1 and TX-2 are decoded and applied to indicators and monitoring circuits.

Voice filters and amplifier 53 demodulate the speech signals present in the composite signal from the AWC bridge amplifier. These speech signals originate at the active NWC under certain conditions, and are recorded by appropriate equipment located at the receiving NWC and to be described subsequently.

Status tone detector 52 detects status tones T1–T6 appearing in the composite signal applied to modem section 37. Binary one logic levels representing the detection of T1–T6 are applied to input terminals A-F, respectively, of logic unit I.

The connections between logic unit I and status tone detectors 47 and 52 vary at each NWC. Table II lists input terminals A through F of logic unit I versus status tones applied to these terminals from detector 52 at each NWC. Table III lists input terminals G through O of logic unit I versus status tones applied to these terminals from detector 47 at each NWC.

TABLE II

| Status Tone Outputs, Detector 52 | | | Logic Unit I Input Terminals |
|---|---|---|---|
| N1WC | N2WC | N3WC | |
| T1 | T2 | T3 | A |
| T6 | T4 | T5 | B |
| T2 | T1 | T1 | C |
| T4 | T6 | T6 | D |
| T3 | T3 | T2 | E |
| T5 | T5 | T4 | F |

TABLE III

| Status Tone Outputs, Detector 49 | | | Logic Unit I Input Terminals |
|---|---|---|---|
| N1WC | N2WC | N3WC | |
| T2 | T1 | T1 | G |
| T4 | T6 | T6 | H |
| T8 | T7 | T7 | I |
| T3 | T3 | T2 | J |
| T5 | T5 | T4 | K |
| T9 | T9 | T8 | L |
| T1 | T2 | T3 | M |
| T6 | T4 | T5 | N |
| T7 | T8 | T9 | O |

Logic unit I has 35 output terminals, each of which provides a binary one logic signal upon the occurrence of different logic conditions at input terminals A through O. The logic circuitry for implementing these binary one signals is conventional in nature and need not be illustrated nor described in detail. As a shorthand notation, however, Table IV is provided and lists all 35 output terminals versus the input conditions required to provide binary one signals at those terminals.

TABLE IV

LOGIC UNIT I

| INPUT FUNCTION | OUTPUT ENABLE |
|---|---|
| $A \cdot \overline{B}$ | 1 |
| $\overline{A} \cdot \overline{B}$ | 2 |
| $C \cdot \overline{D} \cdot \overline{E} \cdot F$ | 3 |
| $\overline{C} \cdot D \cdot E \cdot \overline{F}$ | 4 |
| $\overline{C} \cdot \overline{D} \cdot \overline{E} \cdot F$ | 5 |
| $\overline{C} \cdot \overline{D} \cdot E \cdot \overline{F}$ | 6 |
| $C \cdot \overline{D} \cdot \overline{E} \cdot \overline{F}$ | 7 |
| $\overline{C} \cdot D \cdot \overline{E} \cdot \overline{F}$ | 8 |
| $\overline{C} \cdot D \cdot \overline{E} \cdot F$ | 9 |
| $\overline{C} \cdot \overline{D} \cdot \overline{E} \cdot \overline{F}$ | 10 |
| $\overline{G} \cdot \overline{H} \cdot \overline{I}$ | 11 |
| $\overline{G} \cdot \overline{H} \cdot I$ | 12 |
| $G \cdot H \cdot I$ | 13 |
| $\overline{G} \cdot H \cdot I$ | 14 |
| $G \cdot \overline{H} \cdot I$ | 15 |
| $\overline{G} \cdot \overline{H} \cdot \overline{I}$ | 16 |
| $\overline{J} \cdot K \cdot \overline{L}$ | 17 |
| $\overline{J} \cdot \overline{K} \cdot L$ | 18 |
| $J \cdot K \cdot L$ | 19 |
| $\overline{J} \cdot K \cdot L$ | 20 |
| $J \cdot \overline{K} \cdot L$ | 21 |
| $\overline{J} \cdot K \cdot \overline{L}$ | 22 |
| $\overline{M} \cdot \overline{N} \cdot \overline{O}$ | 23 |
| $(4 + 6) \cdot 12$ | 24 |
| $(3 + 7) \cdot 18$ | 25 |
| $(12 + 7 + 8) \cdot 19$ | 26 |
| $(18 + 6 + 5) \cdot 13$ | 27 |
| $(17 + 11 + 13 + 19) \cdot 10$ | 28 |
| $(11 + 13) \cdot (18 + 19) \cdot (7 + 8 + 10)$ | 29 |
| $(17 + 19) \cdot (12 + 13) \cdot (5 + 6 + 10)$ | 30 |
| $2 \cdot 10$ | 31 |
| $\overline{2} \cdot 10$ | 32 |
| $(4 + 6) \cdot 11$ | 33 |
| $(3 + 7) \cdot 17$ | 34 |
| $2 + 11 + 13 + 17 + 19$ | 35 |

Thus, output terminal 1 for logic unit I provides a binary one signal for conditions $A \cdot \overline{B}$; that is, when binary one appears at input terminal A and a binary zero appears at input terminal B. It is noted the logic conditions for binary one at output terminals 24 through 35 are written in terms of logic conditions at other output terminals in logic unit I. Thus, a binary one appears at output terminal 32 for the condition $\overline{2} \cdot 10$; that is a binary zero appears at output terminal 2 and a binary one appears at output terminal 10. Output signals from logic unit I control system operation in a manner described in detail subsequently.

Logic unit II includes input terminals *a* through *p* and receives input signals from logic unit I and from the system controller 10. These signals originating at the system controller are three in number and are applied to input terminals *p*, *q* and *r* of logic unit II. The signal applied to terminal *p* is connected to a SYSTEM CONTROL switch located at the panel of system controller 10 (reference FIG. 11). Actuation of that switch, when the local NWC is in control of the system, removes a binary one logic level from terminal *p*. The signals applied to terminal *q* and *r* become binary one when respective wireline restoration switches are actuated at the system controller panel. Wireline restoration operation and philosophy is described in detail below. The signals applied to input terminals *a* through *d* of logic unit II come from logic unit I and are different at each NWC. In table V, each of input terminals *a* through *o* for logic unit II are listed to the right versus the output terminals from logic unit I to which they are connected at each of the NWC's.

TABLE V

| LOGIC UNIT II | | | |
|---|---|---|---|
| Logic Unit I Output Terminal No. | | | Logic Unit II Input Terminal |
| NWC1 | NWC2 | NWC3 | |
| 11 | 3 | 3 | *a* |
| 13 | 7 | 4 | *b* |
| 17 | 11 | 6 | *c* |
| 19 | 13 | 7 | *d* |
| | 18 | 12 | *e* |
| | 19 | 13 | *f* |
| | | 18 | *g* |
| | | 19 | *h* |
| | | | *i* |
| 5 | 5 | 5 | *j* |
| 8 | 8 | 8 | *k* |
| 10 | 9 | 9 | *l* |
| 24 | 10 | 10' | *m* |
| 25 | 24 | 33 | *n* |
| | 34 | 34 | *o* |

Logic unit II includes four output terminals at which binary signals appear in accordance with input signal logic conditions. In table VI there is provided in the left hand column a list of ten input logic conditions, written in terms of binary signals appearing at the input terminals of logic unit II. The right hand column of table VI indicates which output terminals provide binary one signals in response to the corresponding logic conditions in the left hand column.

TABLE VI

| LOGIC UNIT II | |
|---|---|
| INPUT FUNCTION | OUTPUT ENABLE |
| $a + b + c + d + e + f + g + h + i$ | "X"(Intermediate step) |
| $j + k + l + m + n + o$ | "Y"(Intermediate step) |
| $\overline{X} \cdot \overline{Y} \cdot p$ | 01 |
| $\overline{X} \cdot Y \cdot \overline{p}$ | 02 |
| $X \cdot \overline{Y} \cdot \overline{p}$ | 01 |
| $\overline{X} \cdot \overline{Y} \cdot \overline{p}$ | 02 |
| $X \cdot \overline{Y} \cdot p$ | 01 |
| $\overline{X} \cdot Y \cdot p$ | 02 |
| $q$ | 03 |
| $r$ | 04 |

Note in Table VI that output signals X and Y do not appear at output terminals but rather are intermediately derived signals utilized to describe certain logic conditions in a short-hand manner. The binary signals at output terminals 01 and 02 drive tone generator 44; the signals at output terminals 03 and 04 operate relays in relay circuit 32. A binary one signal at output terminal 01 of logic unit II activates status tone T6 at tone generator 44 of NWC1; T4 and T5 are activated by this signal at NWC2 and NWC3, respectively. A binary one signal at output terminal 02 activates tone T1 at NWC1, T2 and NWC2, and T3 at NWC3.

The wireline status unit 54 receives logic signals from logic unit I and provides indications of the wireline subsystem status. Referring specifically to FIG. 7, the wireline status indicator panel includes a plurality of lamps to indicate various wireline status functions. A CONTROLLING NWC section of three lamps is provided wherein each represents a different NWC. Whichever NWC is in control of the system has its indicator lamp lit. A COMMAND LINE FAILURE section includes 14 lamps, six to indicate the failure of wirelines P5, P7, P13, P15, P21 and P23, respectively, two to indicate the failure of lines P1 and P2 (P11 and P10 at NWC2; P17 and P18 and NWC3), and six to indicate the restoration of the functions performed by failed lines P5, P7, P13, P15, P21 and P23. A STATUS LINE FAILURE section includes three indicator lamps which are lit in response to the following wireline failures: at NWC1 there is a lamp to indicate that either P3 or P4 has failed in addition to lamps to indicate the failure of P8 and P6; at NWC2 the counterpart lamps represent failure of P9 or P12, and P14 and P16; at NWC3 the lamps are for P19 or P20, and P24 and P22. In addition there is a USE BACKUP lamp to indicate that the wireline functions cannot be restored and conferencing in the AUTOVON back up system should be initiated. This may be done by actuating a switch at the system controller.

Restoration of the functions of failed wirelines is based on the premise that only the command functions need be restored in the event of failure. The command signals are distributed from NWC1 on P5 and P7, from NWC2 on P13 and P15, and from NWC3 on P21 and P23. Further, since all command signals, no matter where they originate, must appear at all AWC command bridges by virtue of the circuit of FIG. 4, it is possible to re-route received command signals from an NWC not involved in the line failure to an NWC whose normal command signal reception line has failed. In this regard, the system philosophy adhered to in the logic circuitry described herein is to permit only a passive NWC (i.e., — one not in control of the system) to effect restoration of a failed line interconnecting the other two NWC's. For example, assume NWC1 is in control of the system and that line P23 between NWC3 and NWC1 fails. The command signals normally transmitted to NWC1 via P23 are no longer directly transmitted; however these same signals are transmitted via P21 to the AWC2 command bridge. Failure of P23 also changes the status tones generated at the various NWC's, thereby changing conditions at logic circuits I and II at the NWC's. The new logic conditions cause lamp P23 in the COMMAND LINE FAILURE section of each wireline status panel 54 to light. Since NWC2 is the only passive NWC not involved in the line failure, restoration of the functions of P23 can be effected only at NWC2. The operator at NWC2, upon noticing the P23 failure indicator, can actuate the P23 restoration switch at the panel in the system controller 10. This applies a binary one signal at input terminal q of logic unit II at NWC2 and, in a manner described below in reference to FIG. 8, removes line P13 from amplifier R8, connecting it instead to line P10. Under these conditions P13 carries all system command signals as they are received at the AWC2 command bridge rather than carrying only those command signals originating at NWC2. The function of failed line P23 is thus restored and system operation can ensue in a normal manner.

The foregoing philosophy permits lines P15 and P21 (between NWC2 and NWC3) to be restored from NWC1, lines P7 and P13 to be restored from NWC3, and lines P5 and P23 to be restored from NWC2.

Figure 8:
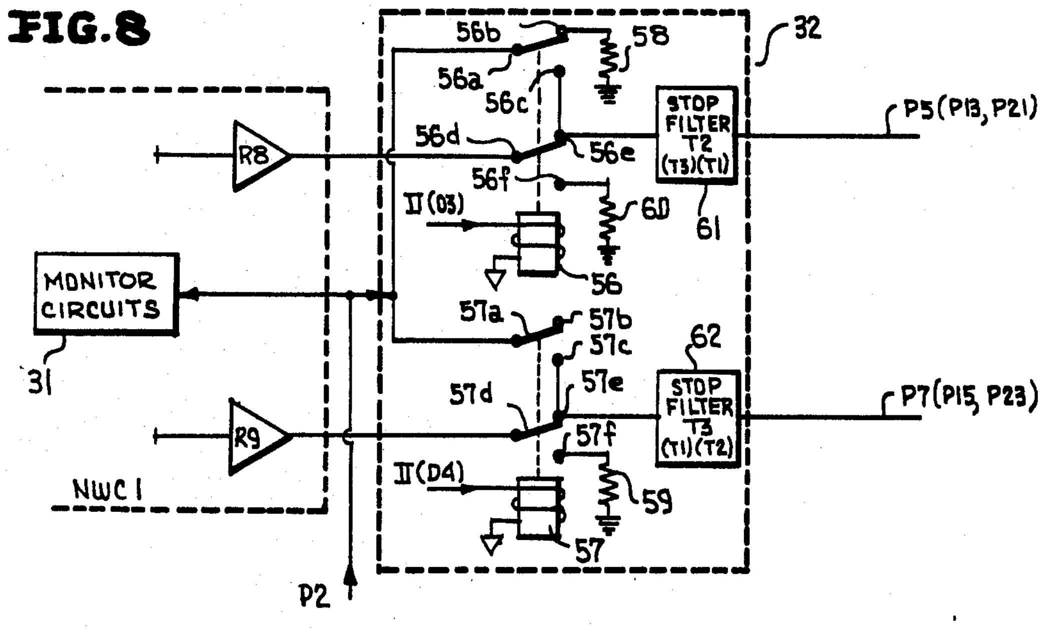
FIG. 8 is a schematic diagram of the relay logic circuit utilized in FIG. 4.

Referring specifically to FIG. 8, output signals from logic unit II output terminals 03 and 04 are connected in relay logic circuit 32 to operate relays 56 and 57, respectively. Each of relays 56 and 57 are illustrated as controlling a pair of double-throw contact arms; this representation is diagrammatic only in that the individual lines which are switched by circuit 32 actually represent wire pairs. Relay 56 controls relay arms 56*a* and 56*d* which normally make connection with contacts 56*b* and 56*e*, respectively. When relay 56 is energized, arms 56*a* and 56*d* contact normally open contacts 56*c* and 56*f*, respectively. Likewise, relay 57 includes arms 57*a* and 57*d*, normally closed contacts 57*b* and 57*e*, and normally open contacts 57*c* and 57*f*. Contacts 56*b*, 56*f* and 57*f* are connected to termination resistors 58, 60 and 59, respectively, indicating that line pairs which become connected to these resistors are terminated in an appropriate line-matching impedance. Contacts 56*c* and 56*e* are connected together, as are contacts 57*c* and 57*e*. Contact 56*e* is also connected to the input terminal of notch filter 61 which, at NWC1, is designed to pass all system tones except status tone T2. (At NWC2, filter 61 rejects T3; at NWC3, filter 61 rejects T1). The output line from filter 61 at NWC1 is P5 (P13 at NWC2; P21 at NWC3). Contact 57*e* feeds the input circuit of notch filter 62 which, at NWC1, is designed to reject status tone T3 (at NWC2 and NWC3 filter 62 rejects T1 and T2, respectively). The output side of filter 62 is connected to wireline P7 at NWC1, P15 at NWC2 and P23 at NWC3.

Contact arms 56d and 57d are connected to the output terminals of amplifiers R8 and R9, respectively, at the NWC command bridge. Contact arms 56a and 57a are connected to wireline P2 which, as described above, carries a composite signal from amplifier R5 in the AWC command bridge to the monitor circuit section of modem 11. As described above, the signals appearing on line P2 are those generated at all of the NWC command bridges.

In operation, when relays 56 and 57 are not actuated, the output signal from amplifier R8 is passed by contact arm 56*d*, normally closed contact 56*e*, and tone filter 61 to line P5 (or P13 at NWC2, P21 at NWC3). Similarly the output signal from amplifier R9 is passed by contact arm 57*d*, normally closed contact 57*e*, and filter 62 to line P7 (or P15 at NWC2, P23 at NWC3). Line P2 feeds only the monitor circuit 31 and is terminated in matching impedance 58 via contact arm 56*a* and normally closed contact 56*b*.

Relay 56 at NWC1 is energized when the operator at NWC1 actuates the restore P15 switch at system controller 10. This switch applies a binary one signal to logic unit II at NWC1 which in turn provides a binary one signal at output terminal 03 to energize relay 56. Contact arm 56*d* is removed from line P5 and applies the output signal from amplifier R8 to termination resistor 60. Contact arm 56a applies the composite signal on P2 to contact 56C, and in turn to contact 56*e*, to connect P2 to P5 through filter 61. Line P5 now routes the system command signals to the AWC3 command bridge to replace the function of failed line P15. In a similar manner, relay 57 may be energized by the NWC1 operator to replace the functions of a failed P21 line via line P7.

Notch filters 61 and 62 are employed to prevent a "lost" command tone from being re-routed around a failed line to obscure the failure condition. For example, if P15 fails, the tone activated at NWC2 is not received directly at the AWC3 command bridge. If this tone were re-routed to the AWC3 command bridge via NWC1, NWC3 would interpret this as a normal condition wherein P15 has not failed. The most important tones in this regard are T1, T2 and T3 which signify which NWC is in control of the system. Consequently a notch filter is placed in line P5 to remove T2. Similar rejection filters are placed in the other re-routing lines as indicated in parenthesis in FIG. 8.

Referring to FIG. 9, a table is provided to indicate the action occurring at each NWC in response to binary one output signals appearing at the various output terminals of logic unit I at that NWC. The first column lists all output terminals of logic unit I. The second column indicates which lamps are energized at the wireline status display panel of FIG. 7 at NWC1 when logic unit I at NWC1 provides the corresponding binary one logic signal. The third and fourth columns similarly indicate lamp energization at NWC2 and NWC3 in response to the logic unit I signals at those locations.

The fifth, sixth, and seventh columns in FIG. 9 indicate which lamp is lit in the CONTROLLING NWC section of the panel in FIG. 7 at NWC1, NWC2 and NWC3, respectively, in response to logic unit I output signals. The eighth, ninth and tenth columns indicate which tones are activated at tone generator 44 at NWC1, NWC2 and NWC3, respectively, in response to binary one output signals from logic unit I at those warning centers. The last three columns indicate which tones are activated at status tone generator 38 at NWC1, NWC2 and NWC3, respectively, in response to logic unit I output signals at those warning centers.

Since tables II, III, IV, V and VI and FIG. 9 completely define the operation of logic units I and II and the functions which respond to these logic units, a further detailed description of the logic units and their functions is not necessary. To simplify understanding, however, the following general description of the overall control philosophy is provided.

Under normal operating conditions, with NWC1 in control of the system and no line failures existing, T1 is generated at NWC1, T4 is generated at NWC2 and T5 is generated at NWC3. Whenever T1 is received at NWC2 and NWC3 it energizes a relay circuit at the system controller at those locations to inhibit NWC2 and NWC3 from taking control of the system. If the operator at NWC1 desires to relinquish control, he deactuates the SYSTEM CONTROL switch at the NWC1 system controller. This provides a binary one signal at the p input terminal of logic unit II at NWC1, which combines with logic signals from logic unit I to provide a binary one at output terminal 01. This operates at tone generator 44 to deactivate T1 and activate T6. At this point the system is in limbo, not under the control of any NWC, and this fact is so indicated at all NWC's at both the system control panel and the wireline status panel of FIG. 9. Either NWC2 or NWC3 can assume system control if the operator actuates the system control switch at system controller 10. If NWC2 takes control, T2 replaces T4 as the tone activated at tone generator 44. T2 causes indications at each NWC that NWC2 is in control. Upon receiving T2, NWC3 responds by activating T9 instead of T5. Thus, with NWC2 having assumed control, NWC1 activates T6, NWC2 activates T2, and NWC3 activates T9.

If NWC3 assumes system control during a limbo state, T3 replaces T5 as the tone activated at NWC3. The presence of T3 indicates to each NWC that NWC3 is in control. Upon reception of T3, NWC2 causes T8 to be activated in place of T4.

At any time, if the operator at NWC1 decides to restore control to NWC1, he actuates the SYSTEM CONTROL switch. This restores T1 as the activated tone at NWC1 in place of T6. Reception of T1 at NWC2 and NWC3 inhibits those NWC's from taking or keeping control. NWC1 is therefore the primary warning center, placed at the top of the NWC hierarchy so that it can always unsurp control from NWC2 and NWC3. NWC2 can unsurp control from NWC3 but not from NWC1. NWC3 cannot unsurp control from either NWC2 or NWC3, but rather can only take control during a limbo state.

Under normal conditions, with tones T1, T4 and T5 activated at NWC1, NWC2 and NWC3, respectively, the continued activation of these tones depends upon their continued reception at each NWC. Thus, if NWC2 receives no tone from NWC1, it responds by de-activating T4 and replacing it with T8. Likewise, if NWC3 does not receive a tone from NWC1, it responds by de-activating T5 and replacing it with T9. This is the essence of the line fault logic. For example, assume line P5 breaks so that T1 is not received at NWC3. From this fact alone, the logic circuits at NWC3 cannot determine whether NWC1 has become disabled or P5 has a fault. However, since NWC3 still receives T4 from NWC2, then NWC2 must still be receiving T1 from NWC1 even though NWC3 is not. The logic circuits at NWC3 therefore deduce that NWC1 is still operational and that P5 has failed. T9 is thus activated at NWC3 to replace T5. NWC1 receives T9 from NWC3, along with T4 from NWC2 and T1 from its own modem, and determines that P5, between NWC1 and NWC3 has failed. But NWC1 cannot do anything about restoring the function of failed P5 because it has no additional line to NWC3. However NWC2 can restore the functions of P5 and does so via logic circuit 32 as described in relation to FIG. 8. Specifically, all system command signals received at the AWC2 command bridge are applied to line P15 by actuating relay logic circuit 32 to connect P10 to P15. The notch filter in line P15 rejects T1 so that NWC3 does not erroneously determine that P5 has been repaired. However, all other tones which would have been transmitted to NWC3 on P5 are re-routed via P15.

The following paragraphs summarize tone activation philosophy as implemented by the logic units:

If NWC1 restores signalling for P15, T6 is transmitted on both NWC1 command bridge lines, but T2 is superimposed on P5 to NWC3. This is not an actual transmission; but is the relay of tone 2 from NWC2 to NWC3. If NWC1 restores signalling for P23, T6 is transmitted on both NWC1 command bridge lines, but T3 is superimposed on the transmission on line P7 to NWC2.

NWC2 has the capability of transmitting T2, T4 and T8. The conditions under which each tone is transmitted and on which lines are as follows:

T2 is transmitted on the NWC2 command bridge lines (P13 to NWC1, and P15 to NWC3) whenever NWC2 is in control; i.e., to signify that NWC2 is in control. NWC2 can assume control under conditions of NWC1 failure or upon receipt of T6 at the AWC2 command bridge. T2 is transmitted on the NWC2 status bridge lines (P8 to NWC1, and P22 to NWC3) when NWC2 detects no line faults on the AWC2 command bridge lines, P7 from NWC1 and P21 from NWC3, and detects no NWC failures at NWC1 and NWC3. T4 is transmitted on the NWC2 command bridge lines whenever NWC2 is not in control. T4 always is transmitted on the NWC2 command bridge lines upon receipt of T1 at the AWC2 command bridge. T4 is also transmitted on the NWC2 command bridge lines to signify that NWC2 releases control either to NWC1 or to NWC3. NWC2 is precluded from releasing control to NWC3 if either of the following conditions exists:

NWC1 transmits T6 on its command bridge lines, and there is a line fault on P5 from NWC1 to NWC3, and NWC2 has not restored command signalling from NWC1 to NWC3; or NWC1 transmits T6 on its command bridge lines, and there is a line fault on P15 from NWC2 to NWC3, and NWC1 has not restored command signalling from NWC2 to NWC3.

T4 is transmitted on the AWC2 bridge lines when neither T1 nor T6 is received at the AWC2 command bridge. Failure to receive these tones may be due either to a line fault on P7 or to NWC1 failure.

T2 and T4 are transmitted simultaneously on AWC2 status bridge lines when neither T3 nor T5 is received at the AWC2 command bridge. Failure to receive these tones may be due either to a line fault on P21 or to NWC3 failure.

T2 and T8 are transmitted simultaneously on the AWC2 status bridge lines when NWC2 performs a restore function for either of command lines, P5 and P23, between NWC1 and NWC3; i.e., whenever NWC2 restores command signalling that has been lost between NWC1 and NWC3.

If NWC2 restores signalling for P5, T4 is transmitted on both NWC2 command bridge lines, but T1 is superimposed on the transmission on line P15 to NWC3. This is not an actual transmission, but the relay of T1 from NWC1 to NWC3. If NWC2 restores signalling for P23, T4 is transmitted on both NWC2 command bridge lines, but T3 is superimposed on the transmission on line P13 to NWC1.

NWC3 has the capability of transmitting T3, T5 and T9. The conditions under which each tone is transmitted and on which lines are as follows: T3 is transmitted on the NWC3 command bridge line (P23 to NWC1, and P21 to NWC2) whenever NWC3 is in control; i.e., to signify that NWC3 is in control. T3 is always transmitted on the NWC3 command bridge lines upon receipt of T6 and either T2 or T4 at the AWC3 command bridge. NWC3 assumes control when T6 and T4 are received at the AWC3 command bridge. NWC3 is precluded from assuming control if there is a line fault on P5 from NWC1 and command signalling from NWC1 is not restored. NWC3 is also precluded from assuming control if there is a line fault on P15 from NWC2 and command signalling from NWC2 is not restored. T3 is transmitted on the AWC3 status bridge lines (P6 to NWC1, and P15 to NWC2) when NWC3 detects no line faults on P5 from NWC1 and P15 from NWC2, and detects no NWC failures at NWC1 and NWC2.

T5 is transmitted on the NWC3 command bridge lines whenever NWC3 is not in control; i.e., to signify that NWC3 is not in control. T5 is always transmitted on the NWC3 command bridge lines upon receipt of T1 at the AWC3 command bridge. T5 is transmitted on the AWC3 status bridge lines when neither T1 nor T6 is received at the AWC3 command bridge. Failure to receive these tones may be due either to a line fault on P5 or to NWC1 failure.

T3 and T5 are transmitted simultaneously on the AWC3 status bridge lines when neither T2 nor T4 is received at the AWC3 command bridge. Failure to receive these tones may be due either to a line fault on P15 or to NWC2 failure.

T3 and T9 are transmitted simultaneously on the AWC3 status bridge lines when NWC3 performs a restore function for either of the command lines, P7 and P13, between NWC1 and NWC2, i.e., whenever NWC3 restores command signalling that has been lost between NWC1 and NWC2.

If NWC3 restores signalling for line P7, T5 is transmitted on both NWC3 command bridge lines, but T1 is superimposed on the transmission on line P21 to NWC2. This is an actual transmission, but is the relay of T1 from NWC1 to NWC2. If NWC3 restores signalling for line P13, T3 is transmitted on both NWC3 command origination lines, but T2 is superimposed on the transmission on P23 to NWC1.

Figure 10:
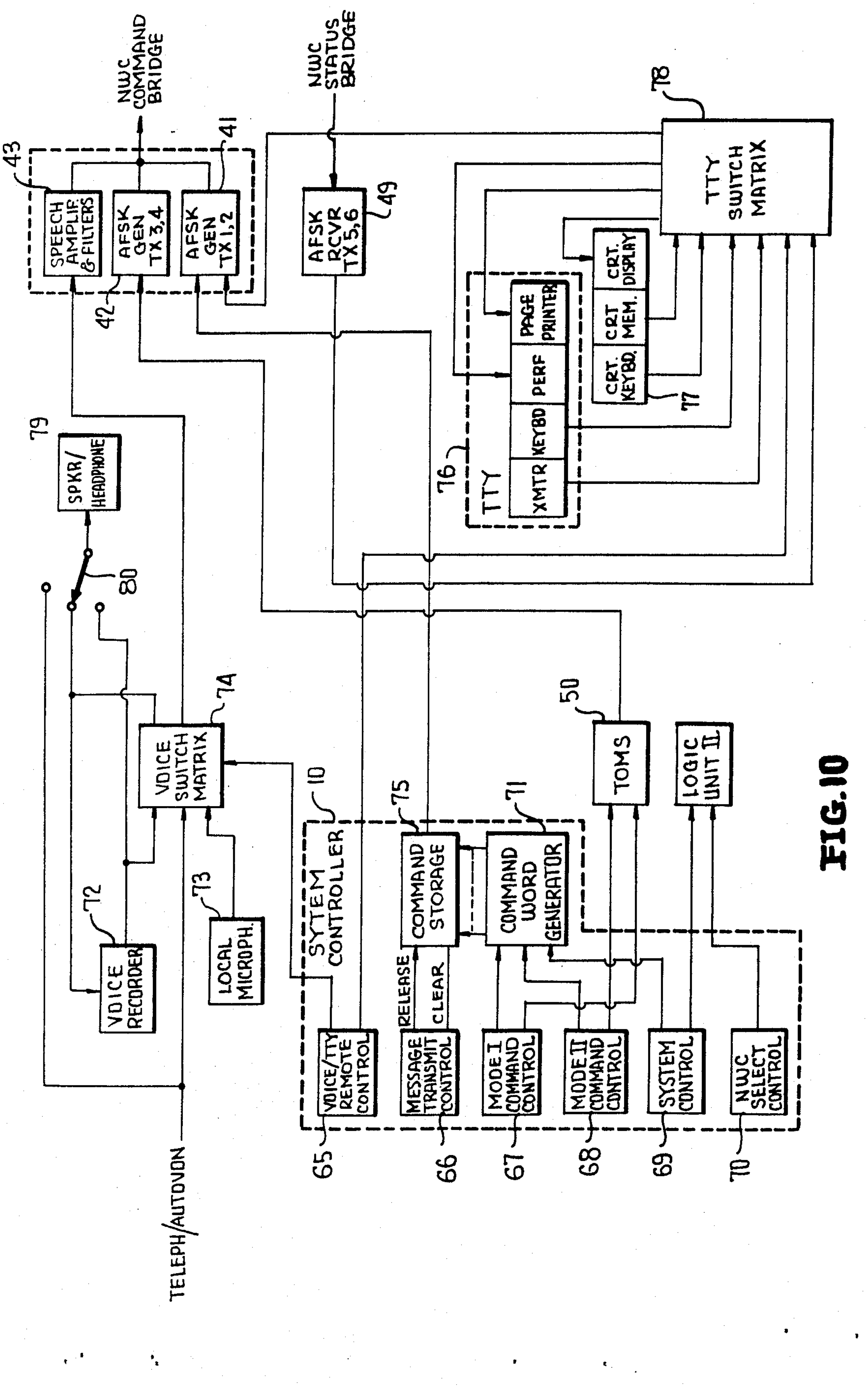
FIG. 10 is a functional block diagram of the system controller and ancillary equipment at each warning center.

Referring specifically to FIG. 10 of the accompanying drawings, there is illustrated a functional block diagram indicating the relationship between system controller 10, ancillary equipment located at the national warning centers, and the NWC command bridge. More particularly, system controller 10 is the equipment utilized by the operator at the warning center to control the overall system. The various controls and indicators are described in detail subsequently in relation to FIG. 11; however for purposes of FIG. 10 the various controls and circuits are arranged in functional groups. These groups include a voice/TTY remote control group 65, a message transmit control group 66, a MODE I command control group 67, a MODE II command control group 68, a system control group 69, and an NWC select control group 70. In addition, internal circuitry at the system controller includes a command word generator 71 and a command storage unit 75.

Also illustrated in FIG. 10 is the TOMS (transmitter operation monitoring subsystem) unit 46 described in general terms in relation to FIG. 6 and described in greater detail subsequently, and logic unit II, described in detail in relation to FIG. 6. Also shown in FIG. 10 is a portion of the command origination modem circuit 35, the AFSK receiver circuit 49, and various ancillary equipment located at each warning center.

Included among the ancillary equipment at the warning center is a voice recorder 72, a local microphone 73 and a voice switching matrix 74. In addition teletypewriter equipment 76, a cathode ray tube (CRT) editor and message display unit 77 and a TTY switching matrix 78 are provided.

Voice recorder 72 is preferably a magnetic tape recorder utilized to record voice messages for subsequent play back and broadcast. A suitable recorder, for example, would be the Ampex model AG-500, or equivalent. The voice recorder 72 receives its input audio signal from voice switching matrix circuit 74 which, under the control of the voice/TTY remote control group 65 of controller 10, applies audio from either the local microphone unit 73 or from a switched telephone/AUTOVON to voice recorder 72. The telephone/AUTOVON line permits a voice or other signal from a remote location to be recorded at or distributed from the national warning center. Voice switching matrix 74, again under the control of the voice/TTY remote control group 65, provides an output signal to the command origination modem 35. The signal is applied to speech amplifier and filter circuit 43 which applies the signal to the NWC command bridge for distribution to the various distribution transmitters. The possible sources for audio signals to be distributed in this manner are local microphone 73, the telephone/AUTOVON line, and voice recorder 72. A local loud speaker and head phone unit 79 may be selectively connected by means of switch 80 to any of the telephone/AUTOVON line, the input line to voice recorder 72, or the output line from voice recorder 72.

The voice/TTY remote control group 65 of controller 10 also controls operation of the TTY switch matrix 78. Matrix 78 is responsible for switching the various TTY signals applied thereto to various output lines under the control of the operator at the system controller. Input signals to matrix 78 are received from the memory and keyboard of CRT unit 77, from the transmitter and keyboard of TTY unit 76, and from AFSK receiver 49. The output signals from matrix 78 are applied to the CRT display, the TTY page printer, the TTY preferator, and AFSK generator 41. The output line to AFSK generator 41 is a binary signal which causes generator 41 to provide command tone TX-1 or TX-2 depending upon the level of the binary signal applied from matrix 78. The source of this signal may be the TTY equipment or the CRT editor.

Matrices 74 and 78 are conventional circuits of the matrix type utilized to provide the desired switching in response to control by an operator from system controller 10. The details of such circuits are well known and need not be described herein; the functional characteristics of these circuits will become obvious from a description of the control panel for the system controller in relation to FIG. 11.

Still referring to FIG. 10, the CRT editor and display device 77 is compatible with the TTY equipment 76. The editor and display device accepts input signals, via matrix 78, from either local or remote teleprinter keyboards, a paper tape reader, or AFSK receiver 49. Outputs from the editor display device 77 are applied via matrix 78 to either command origination modem 35, the local page printer in TTY equipment 76, the paper tape punch or perferator in TTY equipment 76, or to various combinations of these devices. Upon display of a message at the CRT editor display, the message may be reviewed, edited, corrected, and released for transmission. CRT editor display devices of this kind are well known and need not be described in detail. The device permits the operator at the national warning center to edit TTY messages prior to releasing them for transmission.

The command word generator 71 at system controller 10 responds to various input control signals from the MODE I command control group 67, the MODE II command control group 68 and the system control group 69 to provide one or more command words which are stored in the command storage unit 75. These command words constitute all or a part of a command message which is to be distributed through the system. The stored command word or words at unit 75 may be released for transmission under the control of the message transmit control group 66 at the system controller. Upon receiving a release signal, the command storage unit 75 applies its stored command to AFSK generator 41, which in turn converts the command to AFSK format and distributes the command via the NWC command bridge. The format of the command as generated at command word generator 71 may take any desired form. For example, a command word may comprise a fixed number of plural bit characters, and may be arranged serially by character and serially by bit. Of course this format is not to be construed as limiting. Further, command messages may include one or more words. Importantly, the binary signal levels representing the bits in each character are converted to AFSK format at generator 41 for transmission over the wireline network. Command word generator 71 itself is simply a group of logic circuits arranged to respond to the various commands issued from the system controller groups 66, 67 and 68 to provide desired predetermined command word groupings. Such circuits are well known and easily designed for any purpose and therefore are not described in detail herein.

Certain control signals from the MODE I command control group 67 and MODE II command control group 68 are applied to the TOMS unit 46. The operation of the TOMS subsystem is described in greater detail subsequently; however, for present purposes it is to be understood that the initiation of certain controls from the system control panel effect TOMS operation to some degree. The output signal from the TOMS unit 46 is a series of binary signals which control AFSK generator 42. The latter converts the binary levels to AFSK format and distributes the signal to the system wireline via the NWC command bridge.

It is to be noted that system command signals are generated by AFSK generator 41 which utilizes command tones TX-1 and TX-2 as its discrete binary frequencies. TOMS signals on the other hand are generated at AFSK generator 42 which utilizes tones TX-3 and TX-4 as its discrete binary frequencies. Tones TX-5 and TX-6 originate at the various transmitting stations and represent, in binary AFSK form, data pertaining to the operability of the various transmitters in the system.

Still referring to FIG. 10, the system control group 69 and NWC select group 70 of system controller 10 provide signals, under operator initiation, to logic unit II. These signals are those described in relation to FIG. 6 and are applied to input terminals *p, q, r* at logic unit II.

Figure 11:
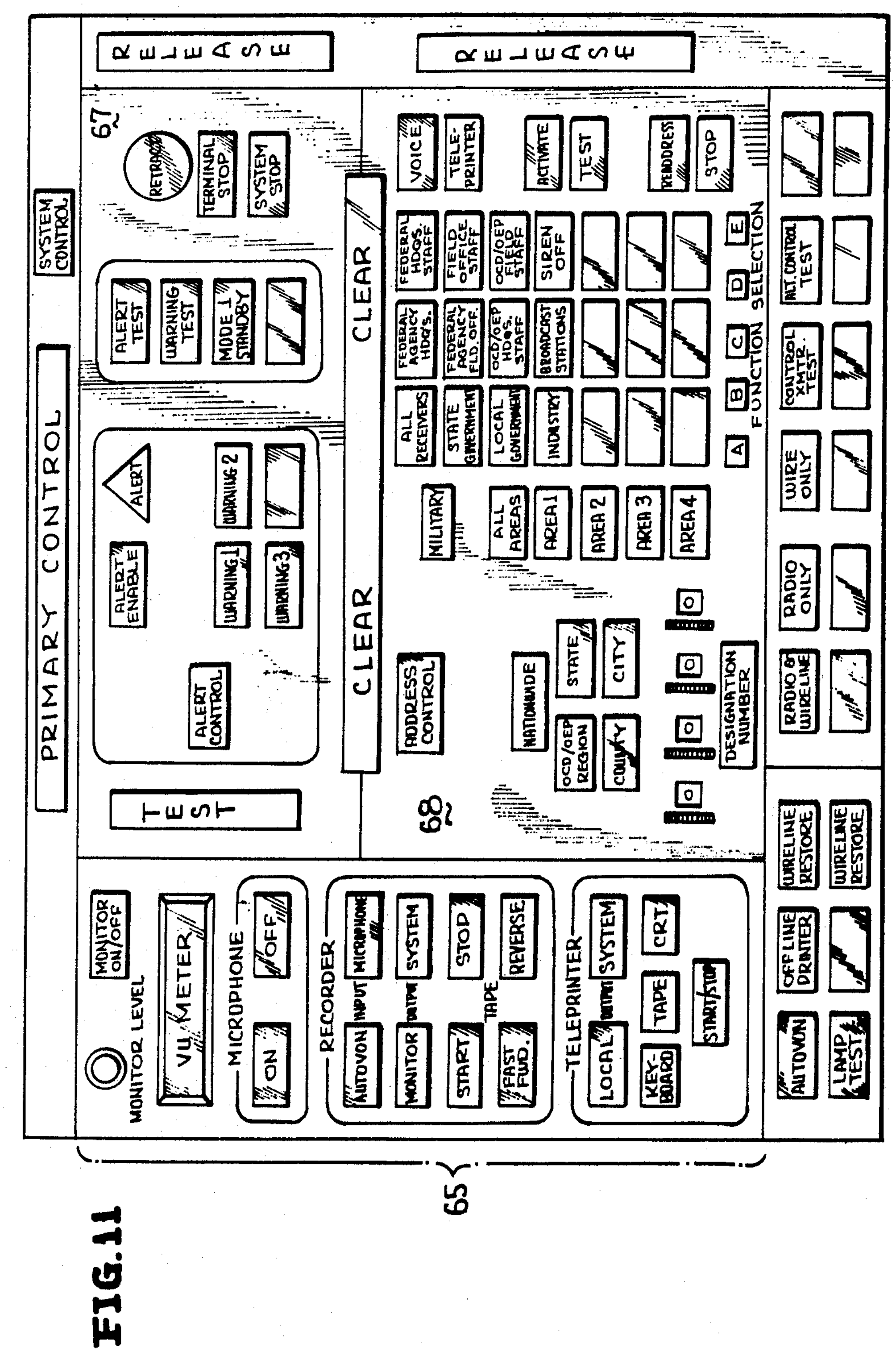
FIG. 11 is a plan view of the system controller panel at each warning center.

To tie in the various operator-initiated control signals with the operation of the circuits in FIGS. 6 and 10, reference is now made to FIG. 11 of the accompanying drawings wherein the control panel of the system controller 10 is illustrated. The voice/TTY remote control group 65 of FIG. 10 is illustrated in a vertically arranged section on the left hand side of the panel in FIG. 11. These controls are intended to operate the ancillary equipment illustrated in FIG. 10 and have the specific operating characteristics described in the following paragraphs.

The MICROPHONE ON switch and MICROPHONE OFF switch are double pole single throw normally open latching switches with solenoid release and single color indicators which illuminate when the contactor is in the closed position. As indicated by their designations, the ON switch enables microphone 73 of FIG. 10 to permit "live" speech to be applied to the voice switching matrix 74 for either recordation in voice recorder 72 or distribution via the NWC command bridge, depending upon other controls to be described below. The OFF switch merely counteracts the ON switch.

A RECORDER section of group 65 includes the following switches: AUTOVON; MICROPHONE; MONITOR; SYSTEM; START; STOP; FAST FWD; and REVERSE. The AUTOVON, MICROPHONE, START, STOP, MONITOR and SYSTEM switches are of the same type as the MICROPHONE ON and OFF switches; the REVERSE and FAST FWD switches are double pole double throw latching type, with single color indicators which illuminate when the contactor is in the active position. The AUTOVON switch controls voice switching matrix 74 of FIG. 10 to permit the AUTOVON wireline signal to be applied to voice recorder 72, and counteracts the MICROPHONE switch in the recorder section. The MICROPHONE switch switches the audio signal from microphone 73 of FIG. 10 to voice recorder 72 by means of voice switching matrix 74, and counteracts the AUTOVON switch. The START switch directly controls the drive mechanism of voice recorder 72 as does the STOP switch. These switches counteract one another when actuated. The REVERSE and FAST FWD switches also control the drive at voice recorder 72 as indicated.

The MONITOR switch acts upon voice switching matrix 74 to permit the output signal from voice recorder 72 to be applied to the speaker and headphone devices 79 via switch 80 as illustrated in FIG. 10. The SYSTEM switch operates on voice switching matrix 74 to apply the voice recorder output signal to the speech amplifier and filters 43 which in turn applies a signal to the wireline network through the NWC command bridge.

Another section of the voice/TTY remote control group 65 is designated TELEPRINTER in FIG. 11. This section includes the following switches: LOCAL; SYSTEM; KEYBOARD; TAPE; CRT; and START/STOP. All except the START/STOP switches are the same type as the MICROPHONE switches. The START/STOP switch is of the same type as the REVERSE and FAST FWD switch in the recorder section.

The LOCAL switch in the TELEPRINTER section controls TTY switch matrix 78 to apply the output signal from the automatic send-receive TTY transmitter to an internal local loop to receive copy with the LOCAL PRINTER of the TTY equipment 76. This switch is a counter action to the SYSTEM switch which applies the output signal from the transmitter section of TTY equipment 76 to the wireline network via matrix 78, and AFSK generator 41. The KEYBOARD switch enables the keyboard transmitter of TTY equipment 76 as the TELEPRINTER output and is a counteraction to the TAPE and CRT switches. The TAPE switch enables the tape distributor transmitter as the TELEPRINTER output and counteracts both the KEYBOARD and CRT switches. The CRT switch enables the CRT unit to permit edited copy to be transmitter as the TELEPRINTER output; this switch counteracts both the KEYBOARD and tape contactors. The START/STOP switch provides ON/OFF control for the selected TTY output signal or the CRT transmitter.

Another section of the voice/TTY remote control group 65 is the monitor section located above and a microphone section of group 65. A MONITOR/OFF switch is of the same type as the REVERSE switch in the recorder section and when actuated permits voice signal of remote origin to be monitored at the warning center. This remote voice signal is generally of the type to be distributed through the system in MODE II operation. A potentiometer designated MONITOR LEVEL controls the audio level of the local program monitor in addition to the remote program monitor. Both local and remote programs are rendered audible through the speaker or headphone assembly 79 of FIG. 10. A meter designated VU meter constitutes a volume units meter for monitoring the system controller output level for the program transmitted over the wireline network under the control of the system controller.

The operation of switches and controls in groups 67, 68, and 69 described below involves the generation of various command words at command word generator 71 of FIG. 10. Table VII is provided as a reference list of command words utilized in the system. The numbers assigned to command words in Table VII are referred to for shorthand purposes in the flow charts describing logic operation at the transmitter.

non-latching, with a two color indicator. The first color lights when the actuator is depressed; upon completion of transmission of a command word selected by the switch, the first color extinguishes and the second color illuminates. The second color remains illuminated until a counter-action command word is transmitted. For present purposes the first color may be considered white and the second color green. The ALERT ENABLE switch is a single pole single throw normally open non-latching switch with a single color indicator, preferably white, which illuminates when the actuator is held in a depressed condition. The SYSTEM STOP switch is a single pole single throw normally open non-latching switch with a single color, preferably white, indicator. The color illuminates when the actuator is depressed and remains illuminated until the resulting command word, as designated by the switch, is transmitted.

The TEST switch selects a command word to be generated at command word generator 71 which initiates a "MODE I TEST" command word. The ALERT CONTROL switch selects a "preempt" command word which counteracts all other switches in group 67 except the TEST, ALERT ENABLE, and SYSTEM STOP switches. The "preempt" command word is preceded by the "MODE I TEST" word in a command message. "Preempt" is also a counter-action word for various switches in groups 68 and 69 to be described below.

TABLE VII

COMMAND VOCABULARY

| Command No. | Command Word(s) | Command No. | Command Word(s) |
|---|---|---|---|
| 1 | Preempt | 29 | One |
| 2 | Alert | 30 | Two |
| 3 | Warning 1 | 31 | Three |
| 4 | Warning 2 | 32 | Four |
| 5 | Warning 3 | 33 | Five |
| 6 | Mode I Test | 34 | Six |
| 7 | Mode I Standby | 35 | Seven |
| 8 | Alert Test | 36 | Eight |
| 9 | Retract | 37 | Nine |
| 10 | Mode I Stop | 38 | Seize |
| 11 | All Transmitters | 39 | No-seize |
| 12 | All Receivers | 40 | Voice Only |
| 13 | Federal Agency Headquarters | 41 | TTY Only |
| 14 | Federal Field Offices | 42 | Both Voice and TTY |
| 15 | Federal Headquarters Staff | 43 | Re-address |
| 16 | Federal Field Staff | 44 | Siren-off |
| 17 | OCD/OEP Headquarters Staff | 45 | Mode II Stop |
| 18 | OCD/OEP Field Staff | 46 | Radio and Wireline |
| 19 | Industry | 47 | Radio Only |
| 20 | B/C Stations | 48 | Wireline Only |
| 21 | State Governments | 49 | Control Transmitter Test |
| 22 | Local Governments | 50 | Alternate Control Transmitter Test |
| 23 | Military | | |
| 24 | OCE/OEP Region | 51 | Function A |
| 25 | State | 52 | Function B |
| 26 | County | 53 | Function C |
| 27 | City | 54 | Function D |
| 28 | Zero | 55 | Function E |
| | | 56 | Warning Test |

The MODE I command control group 67 resides in the upper central portion of the panel in FIG. 11. This group includes the following switches: TEST; ALERT CONTROL; ALERT ENABLE; ALERT; WARNING 1; WARNING 2; WARNING 3; ALERT TEST; WARNING TEST; MODE I STANDBY; RETRACT; TERMINAL STOP; and SYSTEM STOP. All except the ALERT ENABLE and SYSTEM STOP switches are of the single pole single throw type, normally open, When actuated, the ALERT CONTROL switch provides an electrical enabling signal for the ALERT ENABLE, WARNING 1, WARNING 2 and WARNING 3 switches. In addition the ALERT CONTROL switch, when actuated, clears the command word generator 71 in FIG. 10.

The ALERT ENABLE switch provides an electrical and mechanical enable for the ALERT switch. The ALERT switch selects the command work "ALERT"

for generation at command word generator 71. Likewise, the WARNING 1, WARNING 2, and WARNING 3 switches select the command words "WARNING 1", "WARNING 2", and "WARNING 3", respectively.

The ALERT TEST switch selects the command word "preempt" followed by "ALERT TEST". The WARNING test switch selects command words "preempt" followed by "WARNING TEST". The MODE I STANDBY switch selects the command words "all transmitters" followed by "MODE I STANDBY".

The RETRACT switch selects the command word "retract" which is a counter-action command word for the ALERT CONTROL, ALERT, WARNING 1, WARNING 2, and WARNING 3 switches. The RETRACT switch is provided with capability of clearing the command word generator 71. The TERMINAL STOP switch selects the command word "readdress" which is a counter-action command word for the ALERT CONTROL, ALERT, WARNING 1, WARNING 2, WARNING 3, ALERT TEST and WARNING TEST switches. The SYSTEM STOP switch selects the command word "MODE I STOP" which is a counter-action command for the TEST, ALERT CONTROL, ALERT, WARNING 1, TERMINAL STOP, RETRACT, WARNING 2, WARNING 3, ALERT TEST, WARNING TEST and MODE I STANDBY switches.

The various command words generated in response to the switch actuation described above are discussed in somewhat greater detail subsequently in relation to overall system operation.

The MODE II command control group 68 is located generally in the center of the control panel illustrated in FIG. 11. Group 68 may be considered subdivided into a plurality of sections wherein the ADDRESS CONTROL switch stands alone in one section, and the additional sections include an address section, a designation section, a military section, a recipient section, a function selection section, an operational mode section, an instruction section, and a termination section. The ADDRESS CONTROL switch is preferably a single pole single throw normally open non-latching switch with single color indicator which illuminates when the actuator is depressed. The ADDRESS CONTROL switch provides an electrical enabling signal for all contactors associated with the address section, the instruction section, and the termination section for MODE II operation. This switch automatically releases upon transmission of each complete MODE II command message. In addition the ADDRESS CONTROL switch is interlocked so that it cannot be actuated unless all switches associated with MODE I operation are in their quiescent or non-actuated state.

The address section of group 68 includes the following switches: NATIONWIDE; OCD/OEP REGION; STATE; COUNTY; CITY; and MILITARY. All six of these switches are of the same type as the TEST switch in group 67. The NATIONWIDE switch selects the command word "all transmitters". In addition it provides an electrical enable signal for all switches in the recipient section of group 68. The OCD/OEP REGION switch selects the command words "OCD/OEP region" and provides an electrical enable signal for the Federal Agency Field Office and the broadcast stations switches to be described below. In addition the OCD/OEP REGION switch provides an enable for the units thumb wheel selector in the designation section to be described below. The STATE switch selects the command word "state" and provides an electrical enable for the LOCAL GOVERNMENT and ALL RECEIVERS switches to be described below as well as providing an enable for the units and tens thumb wheel selectors of the designation section to be described below. The COUNTY switch selects the command word "county" and provides an enable for all four thumb wheel selectors in the designation section. The CITY switch selects the command word "city" and provides an enable for the units, tens and hundreds thumb wheel selectors in the designation section. In addition the CITY switch provides an enable for the five function selection actuators in the function selection actuators in the function selection to be described below. The MILITARY switch selects the command word "military" and provides an enable for the five area designators in the military section to be described below.

The designation section includes a thumb wheel selector group and a DESIGNATION NUMBER switch. The thumb wheel selectors are four in number representing the units, tens, hundreds, and thousandths places in a four digit decimal number. Each thumb wheel provides for selection of digits 0 through 9 and selects the command words corresponding to the selected digits upon actuation of the designation number switch. The designation number switch initiates formation of the command word selected by the enabled thumb wheel selectors, and effects storage of that word in the command storage unit 75.

The military section of the MODE II command control group 68 includes five area designator switches of the same type as the TEST switch in group 67. These switches are as follows: ALL AREAS; AREA 1; AREA 2; AREA 3; and AREA 4. Each AREA designation switch is enabled by the actuation of the MILITARY switch in the address section of group 68. Each AREA DESIGNATION switch, when actuated, provides an electrical enabling signal for the VOICE and TELEPRINTER switches in the operational mode section of group 68, and provides a lock-out or inhibit for the remaining switches within the military section such that a second switch cannot be actuated until the first has been returned to its quiescent state. The ALL AREAS switch selects the command work "zero". The AREA 1 through AREA 4 switches select the command words "one" through "four", respectively.

The RECIPIENT section of group 68 include switches which are enabled in the manner described above by switches in the address section of group 68. When actuated, the switches in the RECIPIENT section provides a lock-out or inhibit for the other switches within the RECIPIENT section such that a second switch cannot be actuated until the first has been returned to its quiescent state. The switches in this section include: ALL RECEIVERS; FEDERAL AGENCY HEADQUARTERS; STATE GOVERNMENTS; FEDERAL AGENCY FIELD OFFICES; BROADCAST STATIONS; and LOCAL GOVERNMENTS. When actuated these main switches each select a command word corresponding to the switch nomenclature. When actuated the named switches provide an enabling signal for the VOICE and TELEPRINTER switches in the operational mode section to be described below. Additional switches in the RECIPIENT section include the following: FEDERAL HEADQUARTERS STAFF; FIELD OFFICE STAFF; OCD- /OEP HEADQUARTERS STAFF; OCD/OEP FIELD STAFF; and INDUSTRY. These last named switches each select command words corresponding to the nomenclature of the actuated switch and when actuated provide an enabling signal for the VOICE switch in the operational mode section of group 68. One additional switch in the RECIPIENT section is the SIREN OFF switch which selects the command word "siren off", and when actuated provides an enabling signal for the TELEPRINTER contractor in the operational mode section of group 68. All of the switches in the RECIPIENT SECTION of group 68 are of the same type as the TEST switch in group 67.

The function control section of group 68 include five switches designated A, B, C, D and E and each when actuated selects the command words "function A", "function B", "function C", "function D", and "function E", respectively. The function selection switches are enabled by the actuation of the CITY switch in the address section and upon actuation of one of the five switches provide a lock-out or inhibit for the remaining four until the ACTIVE switch is returned to its quiescent state.

The operational mode section of group 68 includes the switches VOICE and TELEPRINTER. Each is of the same type as the TEST switch in group 67 and is enabled as described above in reference to the military section and recipient section of group 68. Actuation of the VOICE switch alone results in the selection of the command word "voice only". Likewise actuation of the TELEPRINTER switch along results in the selection of the command word "TTY only". Actuation of both contactors, whether simultaneously or independently, results in the selection of the command word "both voice and TTY".

The instruction section of group 68 include the ACTIVATE switch and TEST switch, both of the same type as the TEST switch in group 67. The ACTIVATE switch selects the command word "seize"; actuation of the TEST switch selects the command word "no seize".

The termination section of group 68 includes the switches READDRESS and STOP. The READDRESS switch which is of the same type as the TEST switch in group 67 selects the command word "readdress" which counteracts command words for all addresses in MODE II operation. The STOP switch selects the command word "MODE II stop" which counteracts command words associated with MODE II operation. The READDRESS switch is of the same type as the TEST switch in group 67; the STOP switch represented of the same type as the SYSTEM STOP switch in group 67.

The switches in the system control group 69 are arranged in two horizontally extending rows along the bottom of the control panel of FIG. 11. These switches are nine in number and are as follows: RADIO AND WIRELINE; RADIO ONLY; WIRE ONLY; CONTROL TRANSMITTER TEST; ALTERNATE CONTROL TEST; WIRELINE RESTORE; AUTOVON; OFF LINE PRINTER; and LAMP TEST. The RADIO AND WIRELINE ONLY, RADIO ONLY, and WIRE ONLY switches are of the same type as the TEST switch in group 67 and select the command word represented by the switch designation. Each of these three switches acts as a counter-action to the other two. The CONTROL TRANSMITTER TEST switch selects the command word "control transmitter test" and is of the same type as the TEST switch in group 67. The ALTERNATE CONTROL TEST switch selects the command word "alternate control transmitter test" and is also of the same type as the TEST switch in group 67.

The WIRELINE RESTORE switches permit restoration of the functions of two failed wirelines in accordance with the principles described above in relation to FIGS. 4, 6 and 8. These switches are of the same general type as the START/STOP switch in the monitor section of group 68. The AUTOVON switch provides switching of the system controller output signal from the dedicated wireline system only to both the DEDICATED WIRELINE and AUTOVON systems. This function will be described in greater detail subsequently, the switch being of the same type as the WIRELINE RESTORE switch. The OFF LINE PRINTER switch permits the current word in the command storage unit 65 of FIG. 10 to be printed out at the TTY equipment 76 of FIG. 10. The LAMP TEST switch illuminates all control panel lamps for test purposes.

The message transmit control group 66 of FIG. 10 includes two release switches located along the right hand edge of the panel of FIG. 11 and two clear switches located between groups 67 and 68 on the control panel. The RELEASE switches, which are of the same type as the SYSTEM STOP switch in Group 67, provide for release of stored command messages in the command storage unit 75 of FIG. 10. Upon release these command messages actuate AFSK generator 41 in FIG. 10 as described above. The RELEASE switches remain illustrated until the entire command message has been transmitted from the NWC command bridge. The CLEAR switches when depressed initiate clearing of stored command words in command storage unit 75 and the return to quiescent state of the switches which effected generation of the command word thusly cleared. The CLEAR switches are of the same general type as the ALERT ENABLE switch in group 67.

The NWC select control group 70 of FIG. 10 includes a SYSTEM CONTROL switch and a primary control indicator, both located along the top of the system controller panel in FIG. 11. The SYSTEM CONTROL switch is of the same general type as the REVERSE switch in group 65 and when actuated provides the signal applied to input terminal *p* of logic unit II as described in relation to FIG. 6. The primary control indicator has a white translucent cover with red lamping. When lighted, a visible indication reads "primary control". The indicator is capable of operating in either a flickering or steady luminence mode and is actuated in fact when the local NWC is in control of the system.

Referring now to FIG. 12 of the accompanying drawings, equipment at the control transmitter station CX1 is illustrated, it being understood that similar equipment is present at control station CX2. A branch of the leased wireline network terminates at terminal modem 81 which includes a spoof tone generator 82, an AFSK generator 83, an AFSK receiver 84, and an AFSK receiver 85. The back-up AUTOVON line to the control station CX1 terminates in an identical terminal modem 86 which includes identical generator and receiver circuits to those in modem 81.

Spoof tone generator 82 is capable of generating any one of twelve spoof tones depending upon the logic signals received from a section of the TOMS subsystem 46 located at the control station. This logic is described in greater detail subsequently. Likewise AFSK generator 83 is capable of generating AFSK tones TX-5 and TX-6 in response to signals from TOMS unit 46 to indicate the status of various parameters at the control transmitter.

AFSK receiver 84 receives AFSK tones TX-3 and TX-4 from the active NWC and converts these tones to a standard bi-level binary signal. Likewise AFSK receiver 85 receives the TX-1 and TX-2 command tones from the active NWC and converts these to a standard bi-level binary signal.

The control signals for generators 82 and 83 are received from a line selector unit 90; likewise, the detected output signals from AFSK receivers 84 and 85 are applied to the line selector unit 90. It is the function of the line selector unit to select either the leased wireline signal or the AUTOVON signal depending upon logic operations performed within the line selector. The line selector includes signal transmission gates 91 through 98 inclusive, and a tone detector 99. Gates 91 through 94 control signal passage for the leased line modem 81; gates 95 through 98 control signal passage for the AUTOVON modem 86. More specifically, control signals for the spoof tone generator 82 and AFSK generator 83 in modem 81 are passed from TOMS unit 50 through gate 91 and 92 respectively. The output signals from AFSK receivers 84 and 85 at modem 81 are passed through gates 93 and 94 respectively. Likewise the output signals from AFSK receivers 84 and 85 at modem 86 are passed by gates 95 and 96 respectively; the control signals from TOMS unit 46 to spoof tone generator 82 and AFSK generator 83 are applied through gates 98 and 97, respectively. The output terminals of gates 94 and 95 are tied together as are the output terminals from gates 96 and 93. The input terminals for gates 91 and 98 are tied together as are the input terminals for gates 92 and 97.

Gating signals for transmission gates 91 through 98 are derived from a tone detector and logic circuit 99. The latter receives input signals from the two AFSK receivers 85 in modems 81 and 86. Depending upon the detection of command tones TX-1 and TX-2 in circuit 99, either gates 91 to 94 are rendered operable to transmit their signals or gates 95 to 98 are rendered operable to transmit their signals. The logic for determining this transmission is as follows: Gates 91 through 94 are rendered transmissive and gates 95 through 98 are inhibited in the absence of both command tones TX-1 and TX-2 from in the AUTOVON line. Whenever these tones are present on the AUTOVON network, gates 91 through 94 are inhibited and gates 95 through 98 are rendered transmissive As a practical matter the presence of command tones TX-1, TX-2 on the AUTOVON network is possible only as a result of a conscious selection, by the NWC operator, of the AUTOVON network for signal transmission. This conscious selection is effected by actuating the AUTOVON switch at the control panel of FIG. 11. When the AUTOVON switch is actuated the command tones are transmitted on both the wireline and AUTOVON networks; however, as described above, the logic in circuit 99 selects the AUTOVON line whenever command tones TX-1, TX-2 are present on that line.

The received AFSK command tones TX-3, TX-4 represent inquiries which relate to testing of the transmitter and, upon detection, are applied directly to TOMS unit 46 from the active one of transmission gates 93 and 96. The AFSK command tones TX-1, TX-2 upon detection are passed by either of gates 94 and 95 and are applied to a command recognition unit 101 at the control transmitter control unit 16. The command recognition unit 101 decodes command words which ultimately originated at the active NWC. Upon decoding the command words command recognition unit 101 applies an appropriate signal to a logic unit 102 which is designed to accept control subsystem commands and initiate all appropriate responses. These responses are described in detail below in reference to FIGS. 13*a* and 13*b*. Logic unit 102 is also controlled by a local control unit 103 which simulates command for purposes of testing the operability of logic unit 102.

Output signals for logic unit 102 are applied to either of TOMS unit 46, a system selection programmer 104, the control transmitter 17, or message processor 105, depending upon the nature of the received command. Operation of TOMS unit 46 is described in detail subsequently as part of the status and monitoring subsystem. The system selection programmer constitutes the actual control of all components at the control transmitter facility and is described in detail subsequently in relation to FIGS. 14*a*, 14*b* and 14*c*. The message processor 105 responds to various output signals from logic unit 102 by generating error-correcting code words which frequency-modulate the transmitter carrier to provide frequency shift keyed (FSK) information transmission from transmitter 17. For present purposes it is considered that 19 different code words are generated at message processor 105 in response to the output signals from logic unit 102 as described below in relation to FIGS. 13*a*, 13*b* and 13*c*.

Figure 13A:
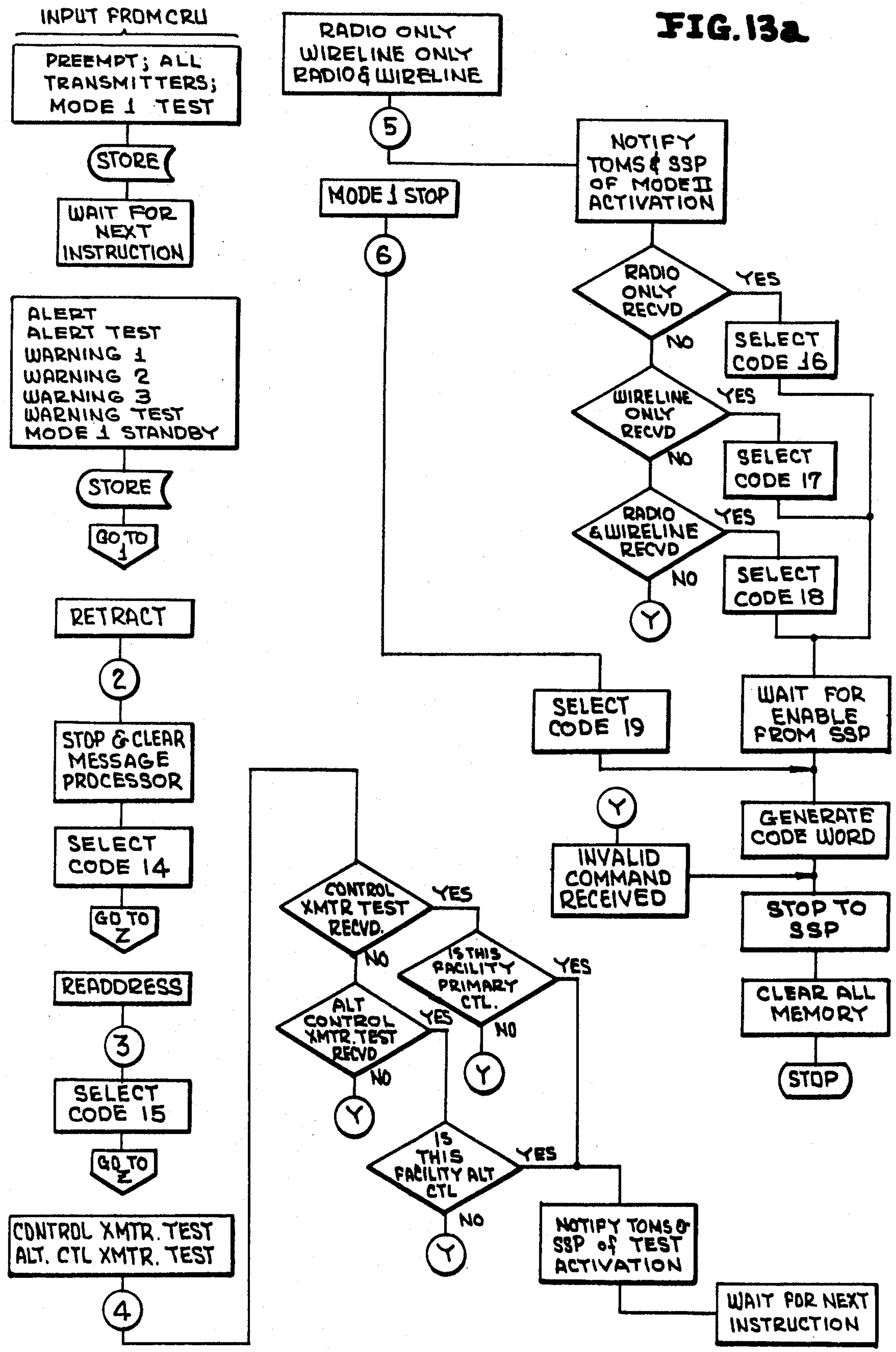
FIGS. 13*a* and *b* comprise a flow chart describing the operation of the controller unit at each control transmitter station.

Referring specifically to FIGS. 13*a*, *b* and *c* of the accompanying drawings, there is illustrated a flow chart which describes the operation of logic unit 102 in response to reception of various commands of the type listed in table VII. Specifically, upon reception of either a "preempt", "all transmitters", or "MODE I test" command, the logic unit stores that command and awaits the next instruction. This operation is illustrated in flow chart form in the upper left hand corner of FIG. 13*a*. Still referring to FIG. 13*a*, reception of the following commands cause the command to be stored and processing to proceed as described in branch No. 1 of the flow chart illustrated in FIG. 13*b*: "alert"; "alert test"; "warning 1"; "warning 2"; "warning test"; "warning test" and "MODE I standby". Upon reception of the "retract" command, operation proceeds according to flow chart branch No. 2 in FIG. 13*a*. Upon reception of the readdress command operation proceeds according to branch No. 3 in FIG. 13*a*. Upon reception of either the "control transmitter test" or "alternate control transmitter test" commands operation proceeds according to branch No. 4 in the flow chart of FIG. 13*a*. Upon reception of the "radio only", "wireline only", or "radio and wireline" commands operation proceeds according to branch No. 5 of the flow chart of FIG. 13*a*. Upon reception of the MODE I stop command operation proceeds according to flow chart branch No. 6 of FIG. 13*a*.

Figure 13B:
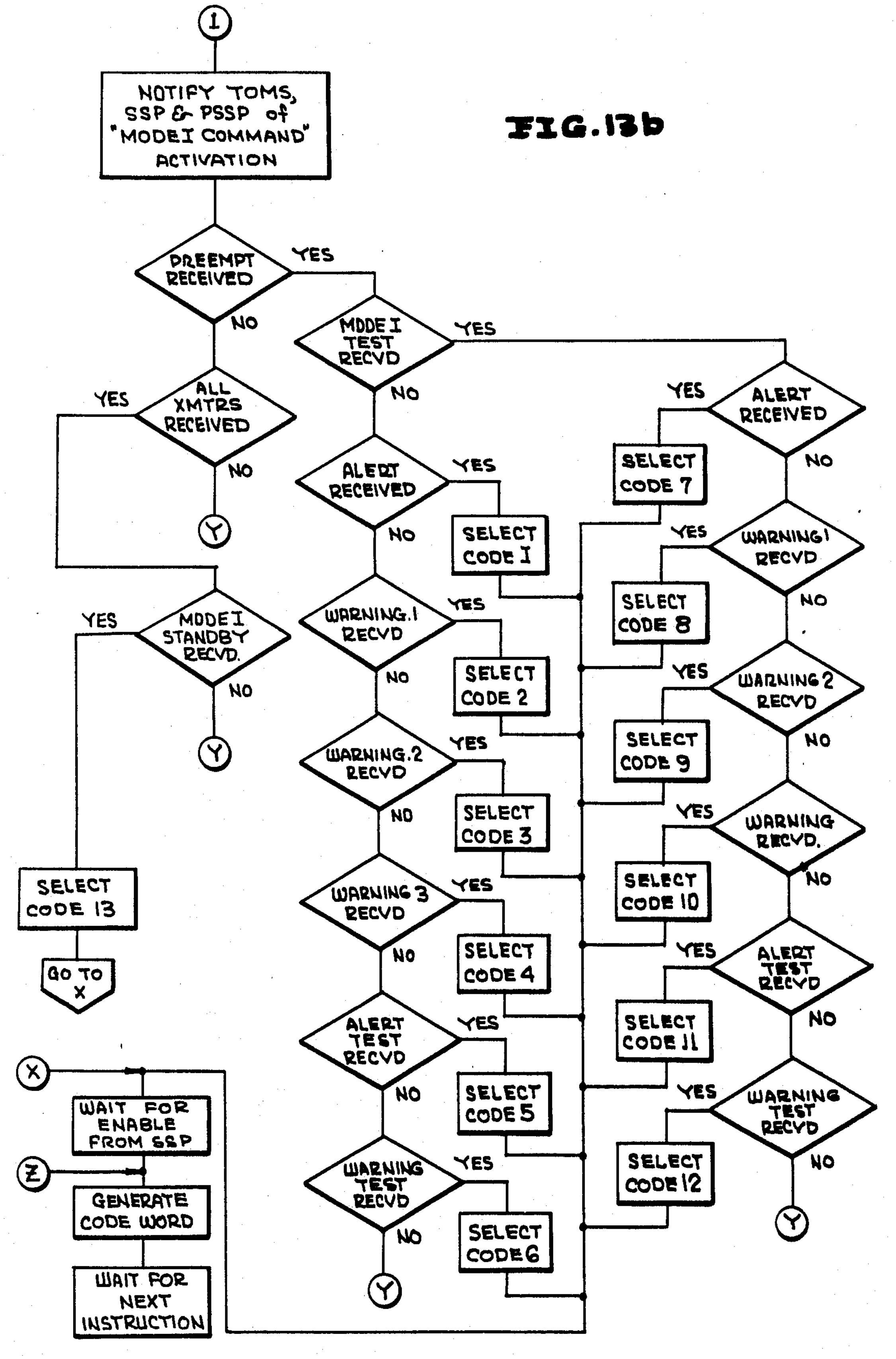

Referring to branch No. 1 of the flow chart in FIG. 13*b*, upon reception of any of the designated commands, the TOMS unit is notified that MODE I is in effect. The first decision then made is a determination as to whether or not the "preempt" has been received. If not, the determination is made as to whether or not the "all transmitters received" command has been received. If not, the process branches to branch Y in FIG. 13*a* wherein it is determined that an invalid command has been received and a stop signal is sent to the system selection programmer 104. The memory containing the received instructions is then cleared and the process stops. If on the other hand the "all transmitters received" instruction has been received, the inquiry is made as to whether or not the MODE I standby instruction has been received. If not, branch Y is once again effected to stop operation; if it has been received code 13 at message processor 105 is selected and the process jumps to branch X in FIG. 13*b*. At this point the system waits for an enable signal from the system selection programmer, which signal is generated in accordance with the description accompanying FIG. 14. Upon receipt of the enable signal the selected code 13 is generated and the frequency of transmitter 17 is shifted accordingly so that the appropriate command is transmitted to the distribution transmitter stations.

Returning to the first decision step in branch No. 1 operation, if the preempt command has been received, determination is made as to whether or not the MODE I test command has been received. Whether it has or not, the system then proceeds to determine whether the following commands, in the sequence specified, have been received: "alert"; "warning 1"; "warning 2"; "warning 3"; "alert test"; "warning test". As inquiry is made concerning reception of these last-mentioned commands, a positive response results in the selection of an appropriate code at message processor 105 after which the system waits for an enable signal from system selection programmer 104. The selected code word is generated once the enable signal is so received and the appropriate message is transmitted by transmitter 17. If none of the six named commands are received the process proceeds to branch Y wherein the system is stopped and the memory of received instructions is cleared.

Process branch No. 2 in FIG. 13*a*, which is initiated in response to a received "RETRACT" command, results in the stopping of the process and clearing of message procesor 105. In addition code 14 is selected at message processor 105 and this code is generated and applied to transmitter 17 for transmission. The distribution stations respond to reception of the retract code by terminating operation that had been initiated by the previously received code.

Branch No. 3 of FIG. 13*a* is effected in response to reception of the "readdress" command word and results in the selection of code 15 at message processor 105. This code is immediately generated and transmitted by transmitter 17. Reception of the "readdress" code at the distribution transmitters terminates current operations and primes the transmitters for impending reception of a new, differently addressed code.

Branch No. 4 of the flow chart in FIG. 13*a* is initiated in the test mode for control transmitters CX1 or CX2. The first step is a determination as to whether the received command is a control transmitter test command or alternate control transmitter test command. If a "control transmitter test" command is received the determination is made as to whether or not the receiving facility is in fact the primary control facility. In other words, is the control transmitter station which receives the "control transmitter test" command the active control transmitter station?If not, operation at this facility proceeds according to branch Y of FIG. 13*c* whereby the system selection programmer stops and the received instruction memory is cleared. If the receiving facility is the primary control transmitter facility a notification is sent to the TOMS unit 46 and to the system selection programmer 104 of the activation of a test mode for the facility. The system then waits for the next instruction. If the "alternate control transmitter test" command is received the inquiry is made as to whether the receiving facility is the alternate control transmitter station. If not, operation proceeds according to branch Y; if so, TOMS unit 46 and the system selection programmer 104 are notified of a test mode for the facility and the system waits for the next instruction.

Branch No. 5 of the flow chart of FIG. 13*c* is effected during a MODE II operation. Consequently TOMS unit 46 and the system selection programmer are notified of a MODE II activation. A determination is then made as to whether the "radio only", "wireline only", or "radio and wireline" command is received and the appropriate code is selected at message processor 105 for each command. If none of these commands are received, operation stops according to the procedure in branch Y. If one of the appropriate codes is selected, the system proceeds to wait for an enable signal from the system selection programmer 104, after which the selected code is generated and applied from message processor 105 to the transmitter for distribution.

A branch No. 6 operation, effected in response to reception of a MODE I stop command, selects the appropriate code, in this case code 19, at message processor 105. Code 19 is then generated and applied from message processor 105 to the transmitter to terminate MODE I operation.

As mentioned above, system selection programmer 104 is responsible for the actual control of all components at the control transmitter facility. Depending upon the command as interpreted by logic unit 102, system selection programmer 104 effects operation at each of the TOMS unit 46, transmitter 17, and message processor 105. Control input signals are applied from logic unit 102 to the system selection programmer 104 in response to reception of each of the following commands at command recognition unit 101: "seize"; "no seize"; "MODE I"; "MODE II"; and "stop". A control signal is also received by the system selection programmer from TOMS unit 46 in response to reception by TOMS unit 46 of a TOE command; this command is generated as part of the status and monitoring subsystem which is described in detail subsequently. Additional input signals are applied to the system selection programmer as a function of various operating parameters of control transmitter 17. These latter signals are described in greater detail with reference to FIGS. 14*a*, *b* and *c*. In addition the system selection programmer 104 provides an enable command to message processor 105 under conditions described in relation to FIGS. 14*a*, *b* and *c*. Various other signals are applied to the TOMS unit and transmitter equipment in the manner described below.

Figure 14A:
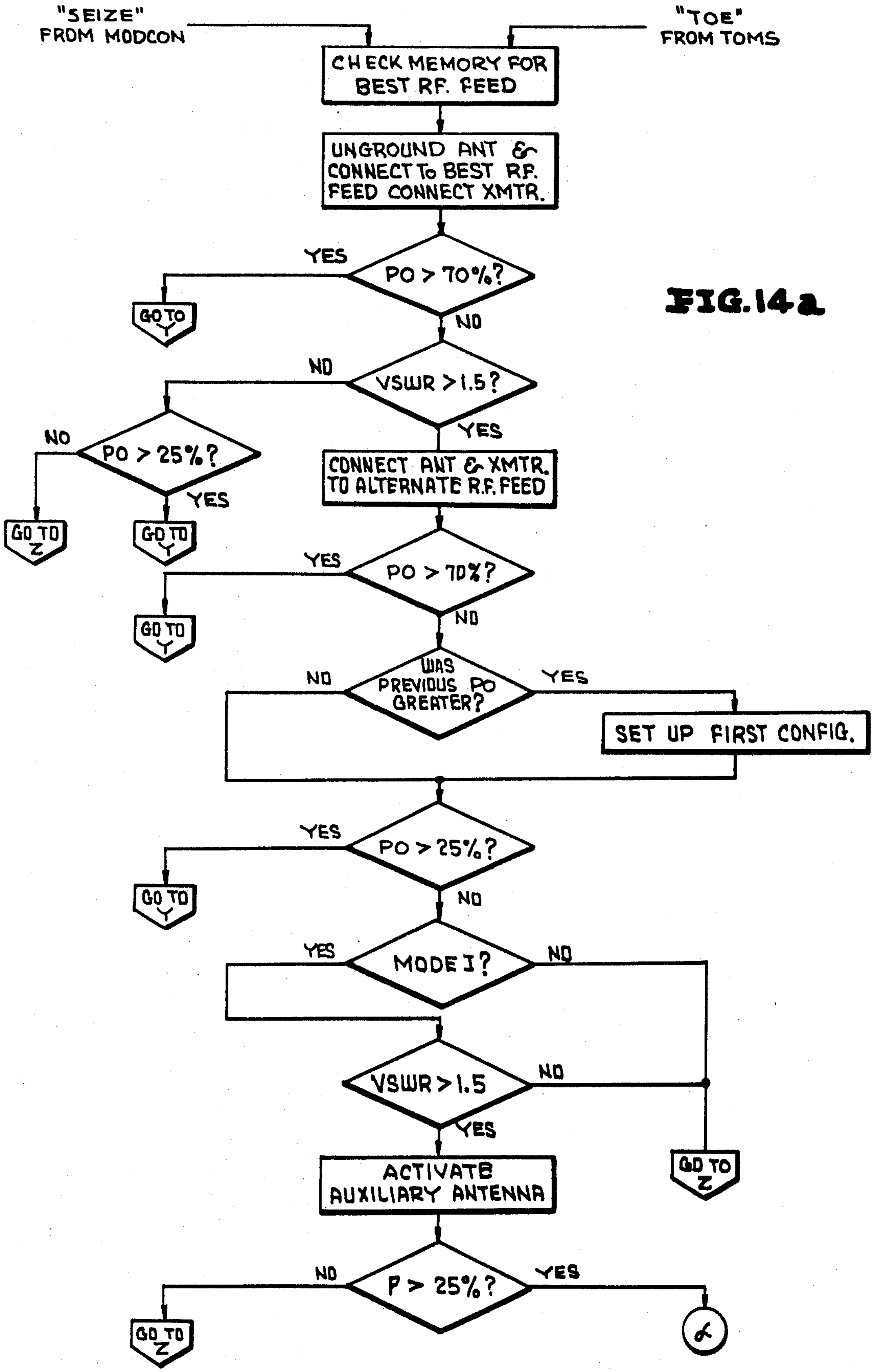
FIGS. 14*a*, *b* and *c* comprise a flow chart describing the operation of the system selection programmer at each control transmitter station.
Figure 14C:
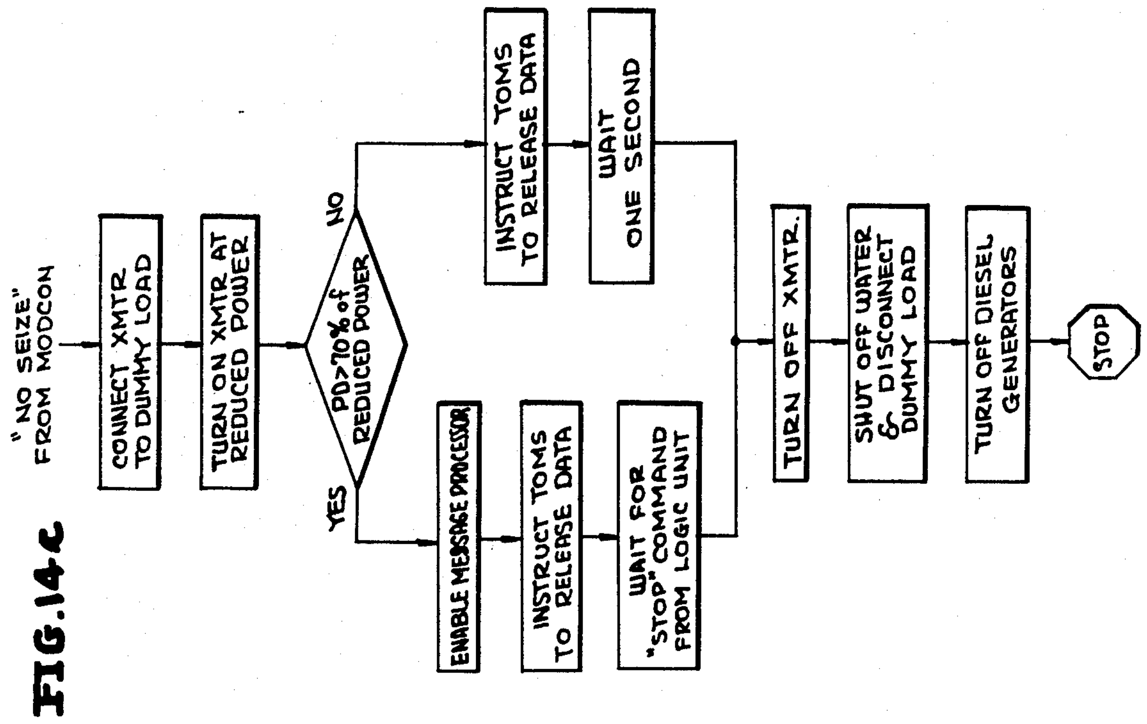
Figure 14B:
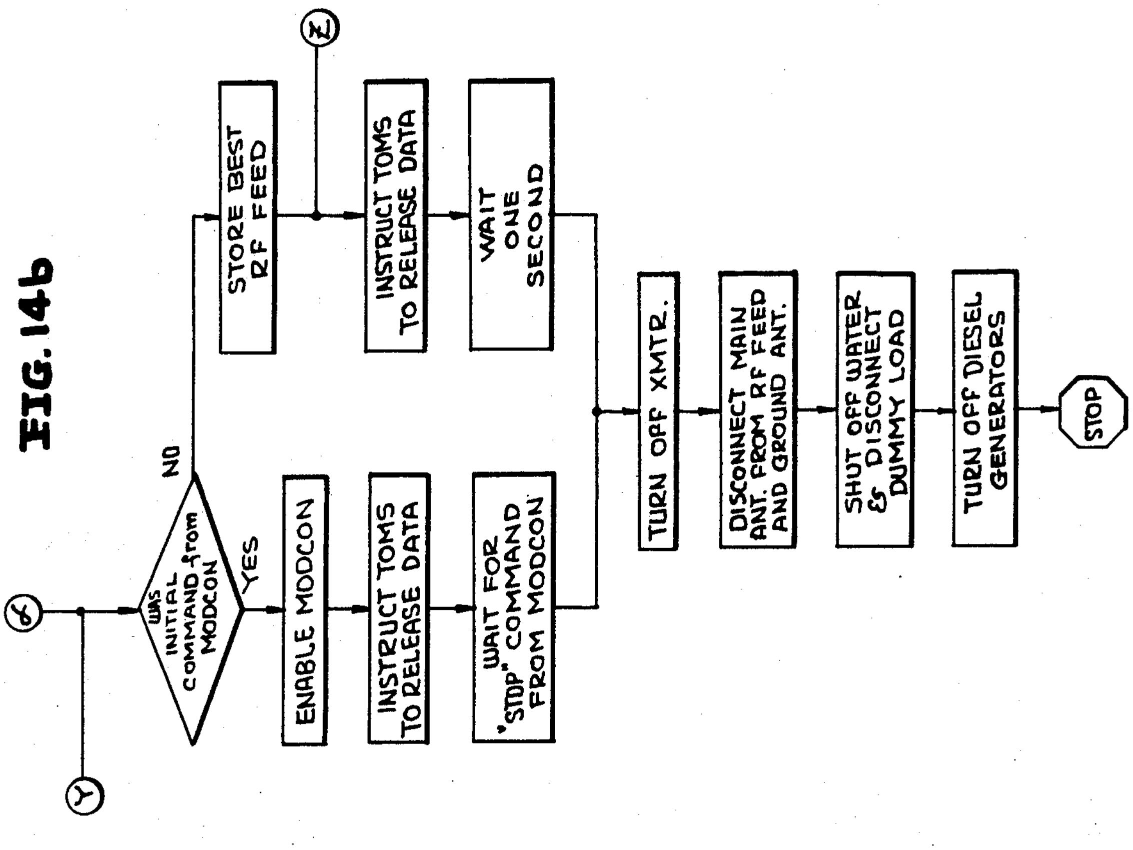

Referring to FIGS. 14*a*, 14*b* and 14*c* of the accompanying drawings, there is illustrated a flow chart describing the operation of the system selection programmer 104. Before going into a detailed description of FIGS. 14*a*, *b* and *c* the following facts concerning the control transmitter and the test equipment associated with the control transmitter should be mentioned. For the purpose of reliability, the control transmitter includes two RF feed lines, one of which is designated primary and the other alternate, and two antennas, one of which serves as an auxiliary antenna. The RF feed lines are automatically switched into and out of the system in accordance with the operating principles described in relation to FIGS. 14*a* through 14*c*; likewise the auxiliary antenna and principal antenna may be so switched. Terminology utilized in the following description includes the term TOE, which stands for transmitter operation evaluation, a periodic regular test to ascertain various critical operating parameters of the transmitter. The term MODCON is a shorthand term to designate controller unit 16 of FIG. 12. The term VSWR relates to the voltage standing wave ratio in the transmitter output line as measured by the TOMS unit 46. The term SSP is a shorthand designation for the system selection programmer unit 104, and the evaluation unit referred to in the description identifies certain measuring equipment in the TOMS unit 46 which measures and monitors or stores certain transmitter parameters.

The following detailed description of the operation of the system selection programmer 104 is provided in outline form as an adjunct to the flow charts illustrated in FIGS. 14*a*, 14*b* and 14*c*.

A. Upon receipt of a TOE command from the TOMS, the SSP performs the following:

A.1 Obtain from memory, the last known best RF feed, as obtained during the last TOE. In the event this information is not in memory, the SSP shall assume use of RF feed number 1.

A.2 Command the RF load selector to unground the antenna and connect it to the best RF feed, and connect the best RF feed to the output of the transmitter.

A.3 Apply voltage to the transmitter.

A.4 Wait three seconds and interrogate the evaluation unit as to the percentage of power present.

A.5 If 70 percent or greater power is present, send a READY to the TOMS as described in A.20.

A.6 If the evaluation unit indicates less than 70 percent power, determine the VSWR as indicated by the transmitter VSWR bridge detector. If the VSWR is less than 1.5:1, proceed with the steps described in A.17. If the VSWR is greater than 1.5:1, then read the output of the acquisition unit of the TOMS to determine the actual power present. This value shall be stored in memory. Remove voltage from the transmitter.

A.7 Command the RF load selector to connect the antenna and the transmitter to the alternate RF feed system.

A.8 Apply voltage to the transmitter.

A.9 Wait three seconds and interrogate the evaluation unit as to the percentage of power present.

A.10 If 70% or greater power is present, send a READY to the TOMS as described in A.21.

A.11 If the evaluation unit indicates less than 70 percent power, read the output of the acquisition unit to determine the actual power present. If this power is greater than obtained in step A.6 proceed as described in A.14. If power obtained in this step is less than that obtained in step A.6, turn off the transmitter and proceed as follows.

A.12 Command the RF load selector to connect the antenna and the transmitter to the RF feed system used in step A.6.

A.13 Apply voltage to the transmitter.

A.14 Wait three seconds and interrogate the evaluation unit to determine of 25 percent or greater power is present.

A.15 If the evaluation unit indicates greater than 25 percent power, proceed with the steps described in A.20.

A.16 If the evaluation unit indicates less than 25 percent power is present, then proceed with the steps described in A.21.

A.17 Interrogate the evaluation unit to determine if 25 percent or greater power is present.

A.18 If the evaluation unit indicates greater than 25 percent power is present, then proceed with the steps described in A.20.

A.19 If the evaluation unit indicates less than 25 percent power, then proceed with the steps described in A.21.

A.20 The READY command to the TOMS shall indicate which RF feed system is in use. This information is simultaneously stored by the SSP and transmitted to the TOMS and becomes the best RF feed in response to A.1. One second later the SSP performs the steps in A.6.

A.21 If the final power is less than 25 percent the command to the TOMS is sent, but the SSP does not store the best RF feed. One second later the SSP performs the steps in A.6.

B. Upon the receipt of a SEIZE command and a MODE I or a MODE II command from the MODCON, the SSP performs the following.

B.1 Perform all steps A.1 through A.15. In each case where the instructions are to send a READY command to the TOMS and the power is greater than 25 percent, also send an ENABLE command to the MODCON and await a STOP command from the MODCON before proceeding with steps in A.6.

B.2 If the evaluation unit, in response to the interrogation in A.14, indicates less than 25 percent power and the command from the MODCON was MODE II, the SSP proceeds with the steps in A.20.

B.3 If the evaluation unit, in response to the interrogation in A.14, indicates less than 25 percent power and the command from the MODCON was MODE I, the SSP determines the VSWR as indicated by the transmitter VSWR detector. If the VSWR is less than 1.5:1, the SSP proceeds as described in A.20. If the VSWR is greater than 1.5:1, the SSP proceeds as follows:

B.4 Remove voltage from the transmitter.

B.5 Command the RF load selector to connect the transmitter to the auxiliary antenna feed system and to activate the auxiliary antenna.

B.6 When the auxiliary antenna has indicated that it is ready to accept power, apply voltage to the transmitter.

B.7 Wait three seconds and interrogate the evaluation unit to determine the percentage of power present at the auxiliary antenna.

B.8 If 25 percent or greater power is present, enable the MODCON and send a READY command to TOMS as described in B.10.

B.9 If the power output is less than 25 percent power, send a READY command to the TOMS; and one second later perform the sequency in D.

B.10 The READY command to the TOMS indicates that the auxiliary antenna is used. This information is retained in memory within the SSP and is the response to A.1.

C. Upon receipt of a NO SEIZE command from the MODCON, the SSP performs the following.

C.1 COmmand the RF load selector to connect the output of the transmitter to the dummy load.

C.2 Apply voltage to the transmitter final amplifier subassemblies so as to operate at reduced power.

C.3 Wait three seconds and interrogate the evaluation unit as to the percentage of power present.

C.4 If 25 percent or greater of the expected power is present, transmit an ENABLE command to the MODCON and a READY command to the TOMS in accordance with C.6

C.5 If less than 25 percent power is present, send a READY command to the TOMS, and one second later perform the sequences in D.

D. Upon receipt of a STOP command from the MODCON, or upon completion of a TOE, the SSP performs the following.

D.1 Remove all power supply voltages from the transmitter driver and final power amplifiers. The exciter subsystem will remain energized.

D.2 Shut down all water flow.

D.3 Command the RF load selector to disconnect the main antenna or dummy load from the RF feed system and to ground the main antenna.

D.4 Command both generators to shut down.

E. If the SSP receives a command from the TOMS or the MODCON, the SSP shall proceed to execute the command, but remains receptive to the MODCON for the possibility of a change in command. If a new command is received, the sequence stops; the SSP removes transmitter voltages and then shall proceed in accordance with steps B, C, or D as appropriate.

The control transmitter itself operates at a frequency of nominally 60 KHz and delivers a nominal output power of 300 KW. The signal frequency is capable of modulation by the output signal from the message processor 105 so as to permit transmission of binary signals in FSK format.

DISTRIBUTION SUBSYSTEM

The distribution subsystem is located primarily at the distribution transmitter locations. A block diagram of the distribution transmitter location is illustrated in FIG. 15 of the accompanying drawings to which reference is now made. The wireline circuit illustrated in FIG. 5 terminates at a modem 81 which is substantially identical to modem 81 of FIG. 12. Likewise a backup AUTOVON line terminates at modem 86 which is substantially identical to modem 86 of FIG. 12. A line selector unit 90, substantially identical to line selector 90 of FIG. 12, selects either of modems 81 or 86 as the operational modem in the same fashion described in relation to FIG. 12. Command signals passed by line selector 90 are applied to a command recognition unit 111 which, in principle, operates in the same manner as the command recognition unit 101 of FIG. 12. The basic difference between command recognition unit 111 and command recognition unit 101 is that unit 111 responds to a larger repertoire of commands than does unit 101. In a detailed description which follows, it is assumed that the command decoding repertoire of recognition unit 111 consists of the 56 command words listed in Table VII. Output signals from the command recognition unit 111 are applied to a source selector unit 112 which determines whether the wireline transmitted signals (leased or AUTOVON) or the radio signals from the control transmitters are to be utilized. In this regard a radio receiver 113 is provided for the signal transmitted by the active control transmitter station and provides detected output signal to source selector 112.

Selector 112 is preferably a simple logic circuit which is controlled by commands originating at the active NWC and received at the distribution transmitter controller 21 via either or both of the wireline and radio control links. Upon receipt of the command "radio only" from either control link the source selector permits only logic signals derived from the radio link to be applied to logic unit 114. On the other hand a receipt of the command "wireline only" from either control link causes the source selector 112 to apply only the signals derived from line selector 90 and command recognition unit 111 to logic unit 114. Upon receipt of a signal indicating that the command "radio and wireline" has been issued via either control link, source selector 112 provides the wireline modem signals for use by logic unit 114 so long as the wireline signals are present. In the absence of the wireline signals, source selector 112 provides the radio link command signals to logic unit 114.

It should be pointed out at this point that the receiver 113 includes decoding circuitry which converts the error correcting FSK coded signals to binary levels suitable for interpretation at source selector 112 and logic unit 114. Such decoding circuitry serves the same basic purposes as the command recognition unit 111 serves for the wireline signals.

Logic unit 114 performs analogous functions for the distribution transmitter to those functions performed by logic unit 102 in FIG. 12 for the control transmitter. Logic unit 114 accepts control subsystem commands in the form of bi-level binary signals and responds by initiating all appropriate action at the distribution station. These responses are described in detail below in relation to FIGS. **16*a*, 16*b*, 16*c* and 16*d*. In addition a local control unit 115 is provided to permit local testing logic unit 114.**

As is the case at the control transmitter illustrated in FIG. 12, logic unit 114 provides output signals which control the local TOMS unit 46 and a system selection programmer 117. In addition logic unit 114 controls a power source selection programmer 116. The power source selection program is responsible for selecting between a primary and a redundant power source whenever the distribution transmitter is commanded to go on the air. The system selection program 117 performs in a manner analogous to the system selection programmer 104 of FIG. 12 and its operation is described in detail subsequently.

The transmitter itself provides a carrier frequency which is capable of being amplitide modulated by audio signals representing voice programs to be distributed and address information which identifies the recipients intended to receive the program. In addition the transmitter carrier is capable of being frequency modulated in FSK format to permit teletype messages to be transmitted to recipient selected by the address appearing as frequency modulation on the transmitter carrier. A technique for selectively addressing recipients of the transmitted audio signal from the distribution transmitter is disclosed in U.S. Pat. application Ser. No. 157,833 by Gautney et al., filed June 29, 1971 and entitled "Receiver Demuting Arrangement Employing Sequential Binary Code." The techniques disclosed in that patent application are assumed to be utilized herein.

The FSK input signal to the transmitter is received from an RTTY program selector unit 121 which in turn is controlled by the logic unit 114. Input signals to the RTTY program selector include: the AFSK command tones TX-1, 2 received by line selector 90 from the selected modem 81 or 86, the output signal from an RTTY taped message unit 122, and the output signal from an RTTY address selection generator 123. These three input signals are binary in nature and AFSK in format. Depending upon the output signal from logic unit 114, the RTTY program selector 121 can select any of these signals for application to the FSK input terminal of the distribution transmitter.

The RTTY taped message unit 122 is a memory for pretaped teletypewriter messages which, upon selection by a signal from logic unit 114, are individually activated. The RTTY address selection generator 123 provides AFSK format signals representing the addresses of message recipients as selected by output signals from logic unit 114.

Audio input signals which amplitude modulate the distribution transmitter carrier frequency are derived from four different sources. One source is the audio or voice signal received from the wireline system and applied to a mixer circuit 124 from line selector 90. Mixer circuit 124 also receives the output signal from a voice taped program unit 125 and is controlled by an output signal from logic unit 114 which determines which of the two programs (i.e. live, audio or taped voice) are to be passed by the mixer. The mixer output signal is applied to an audio amplifier 126 and in turn to a level controller 127 and peak controller 128 before application to the audio signal input terminal of the distribution transmitter. The other two input signals for that terminal come from a function tone generator 129 and a code selection generator 131. Function tone generator 129 responds to predetermined output signals from logic unit 114 to generate selected tones which are utilized at the recipient location to activate devices ancillary to the terminal receivers. Code selection generator 131 also responds to output signals from logic unit 114 to supply the necessary tones, timing, and sequencing to permit selective addressing of terminal receivers in the manner described in the aforementioned Gautney at al patent application. The output signals from both the function tone generator 129 and code selection generator 131 are applied to tone amplifier 132 which in turn applies the amplified signal to the audio signal input terminal of the distribution transmitter. Appropriate monitoring circuits are provided for all modulation signals applied to the distribution transmitter.

Figure 16A:
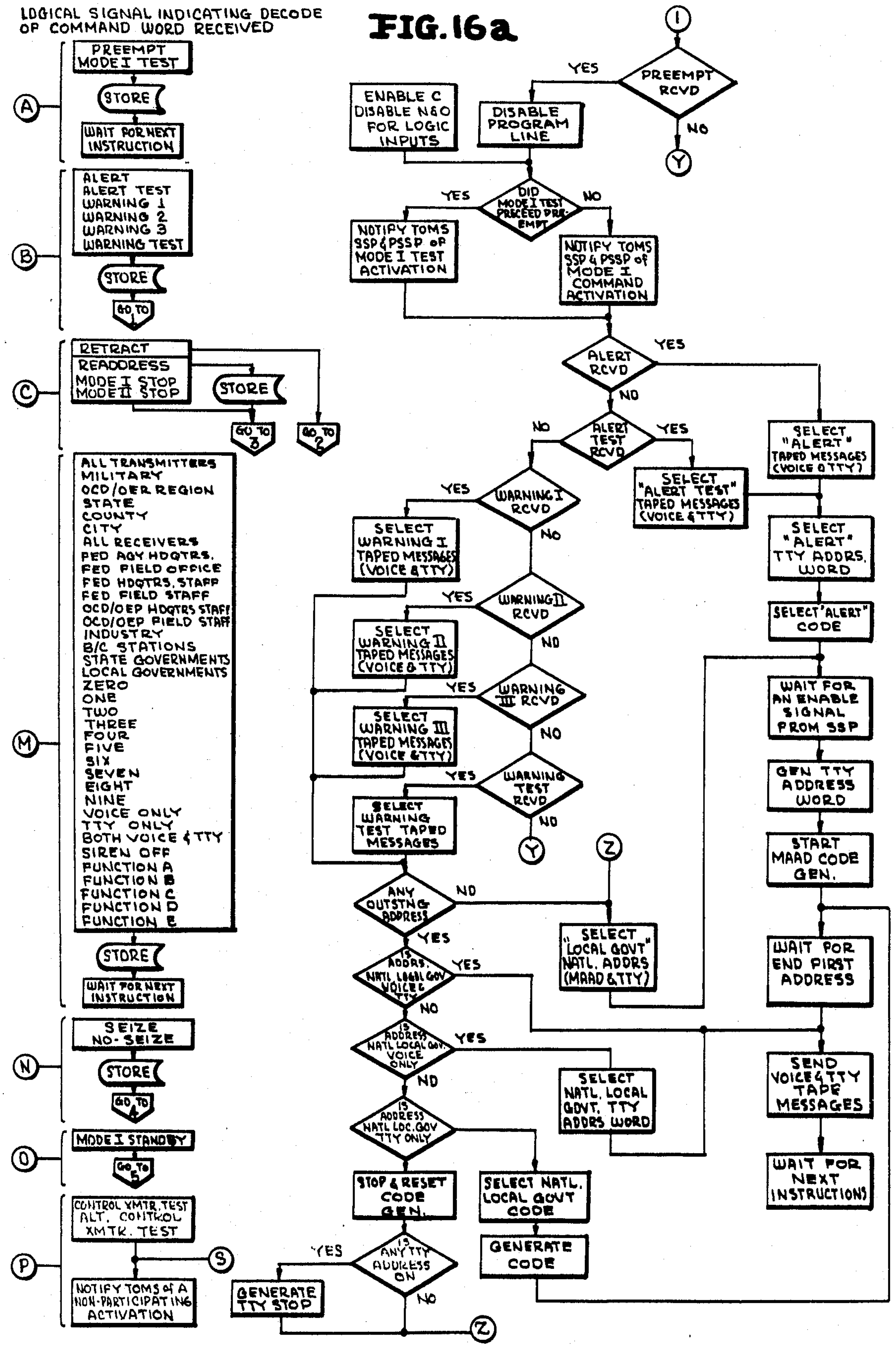
FIGS. 16*a*, *b*, *c* and *d* comprise a flow chart describing the operation of the controller unit at each distribution transmitter.
Figure 16B:
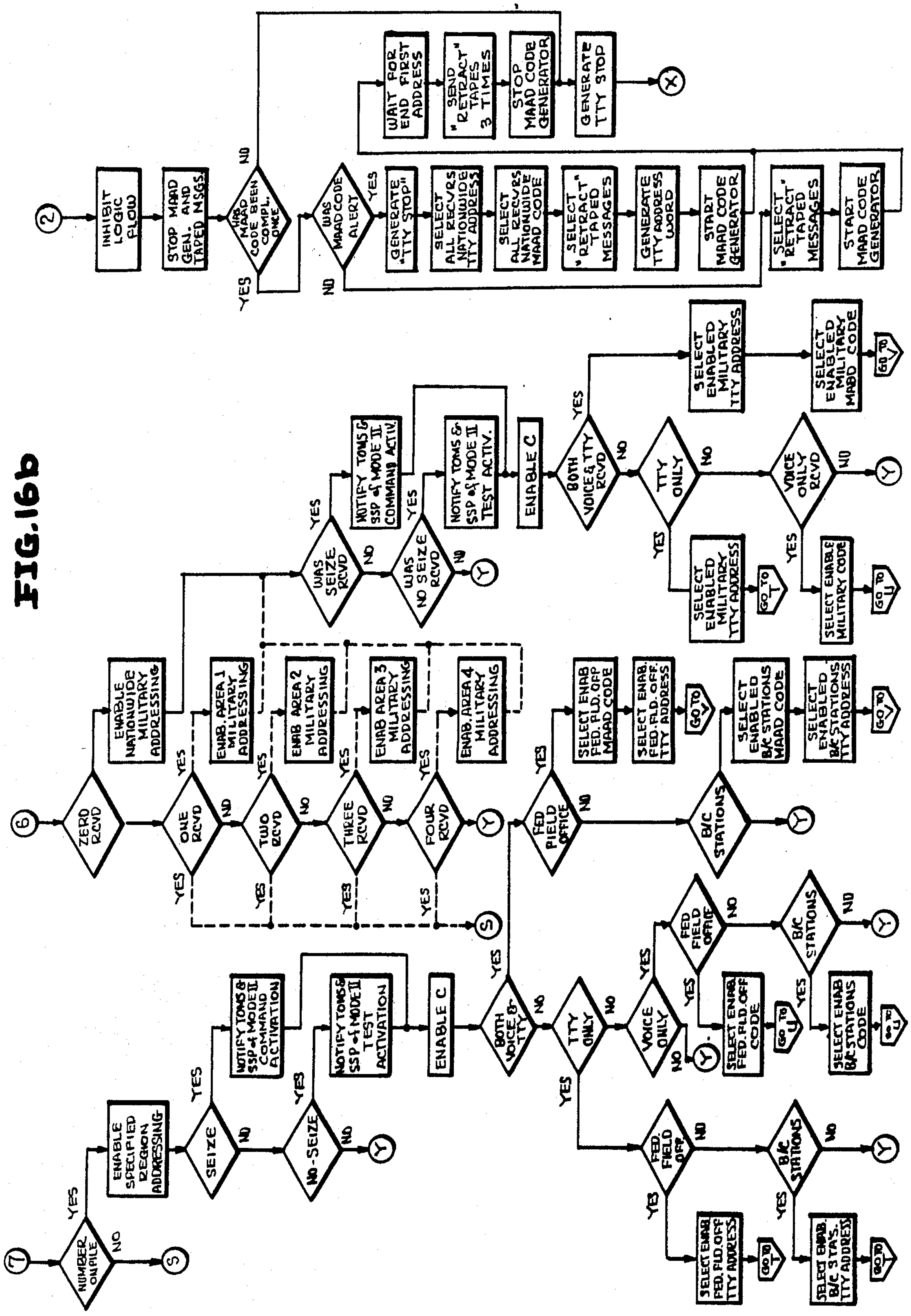
Figure 16C:
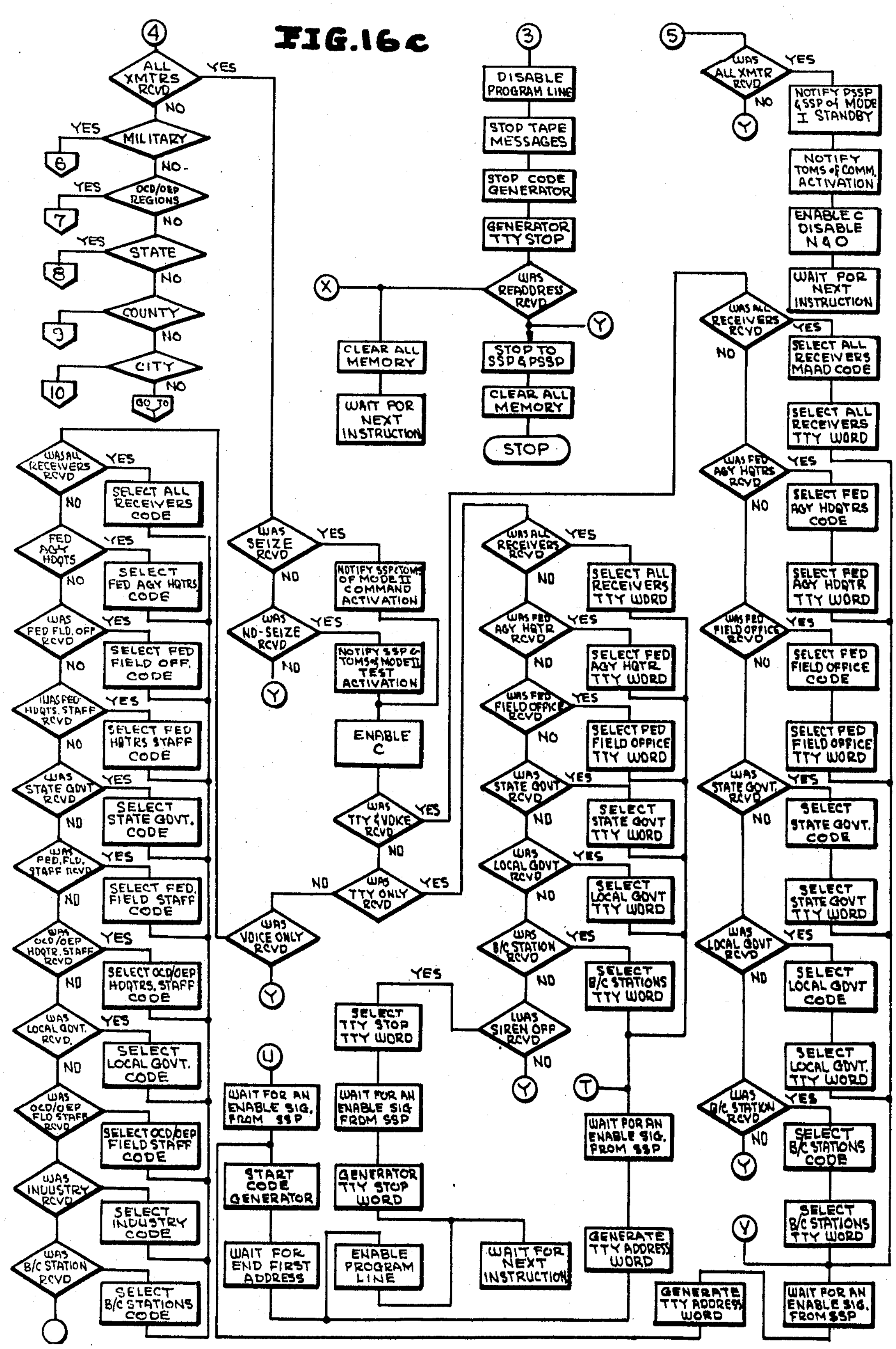
Figure 16D:
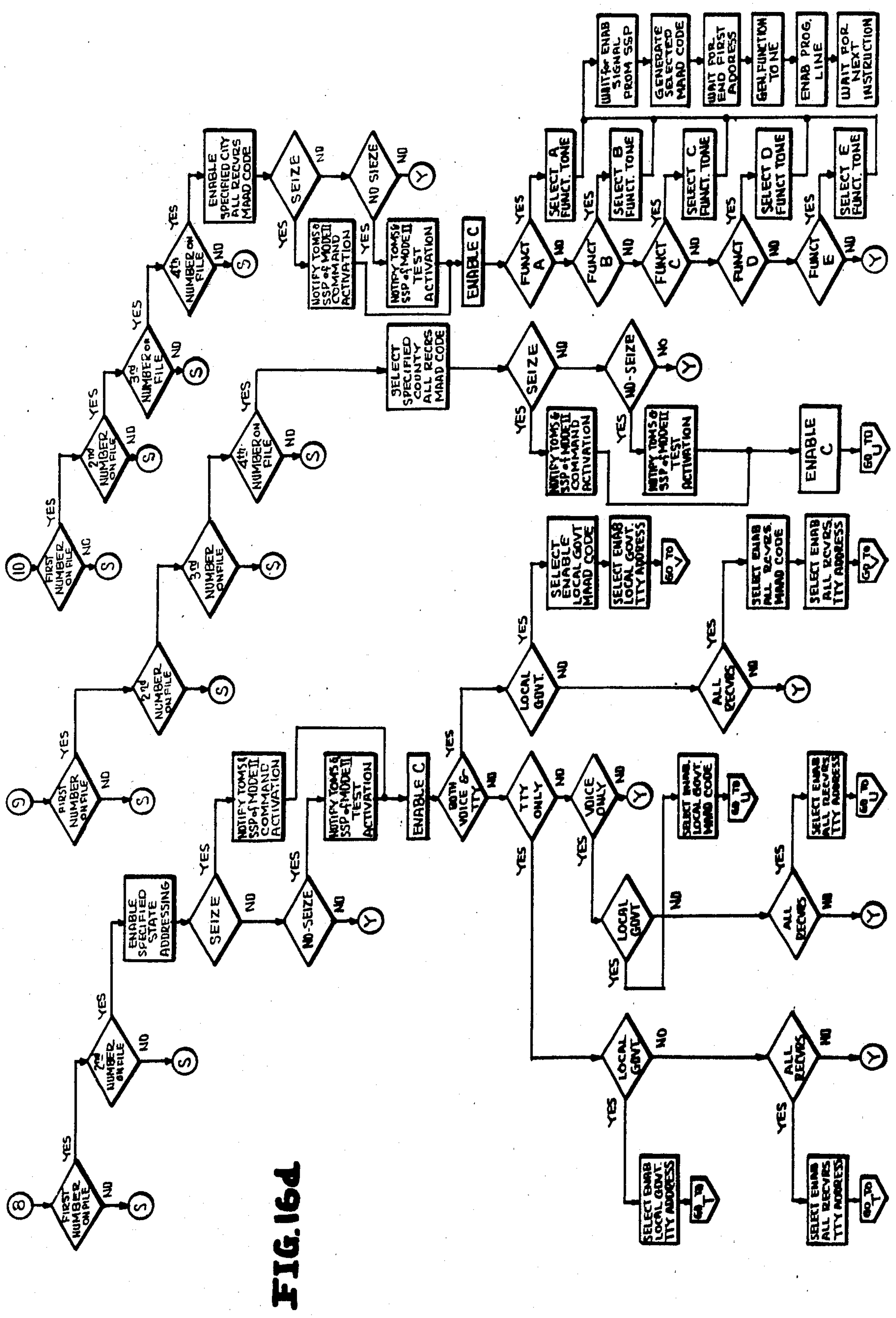

The operation of the circuitry of FIG. 15, and particularly logic unit 114 in response to commands received at the distribution station is illustrated by means of the flow charts in FIGS. 16*a, b, c* and *d.* These flow charts are quite extensive and detailed in presentation and are self-explanatory as to the operation of the circuit of FIG. 15. Standard flow chart format is utilized wherein diamond shaped boxes represent decision boxes in which the logic circuitry is required to make the determination indicated within the box. Rectangular boxes represent functions performed by the logic circuit. In view of the completeness of the flow charts it is unnecessary to provide further detailed description of the operation of the circuit of FIG. 15. Each command transmitted to the distribution station from the active NWC is described in the flow charts in terms of the response initiated by logic unit 114. In situations where a message is to be transmitted by the distribution transmitter an enable signal is required from system selection programmer 117 as was the case in the operation of the control transmitter logic illustrated in FIG. 12. In those instances where an illogical combination of commands are received, or where the system is otherwise commanded to terminate at the present series of operating steps, the flow chart jumps to branch Y illustrated in FIG. 16*c.*

Figure 17B:
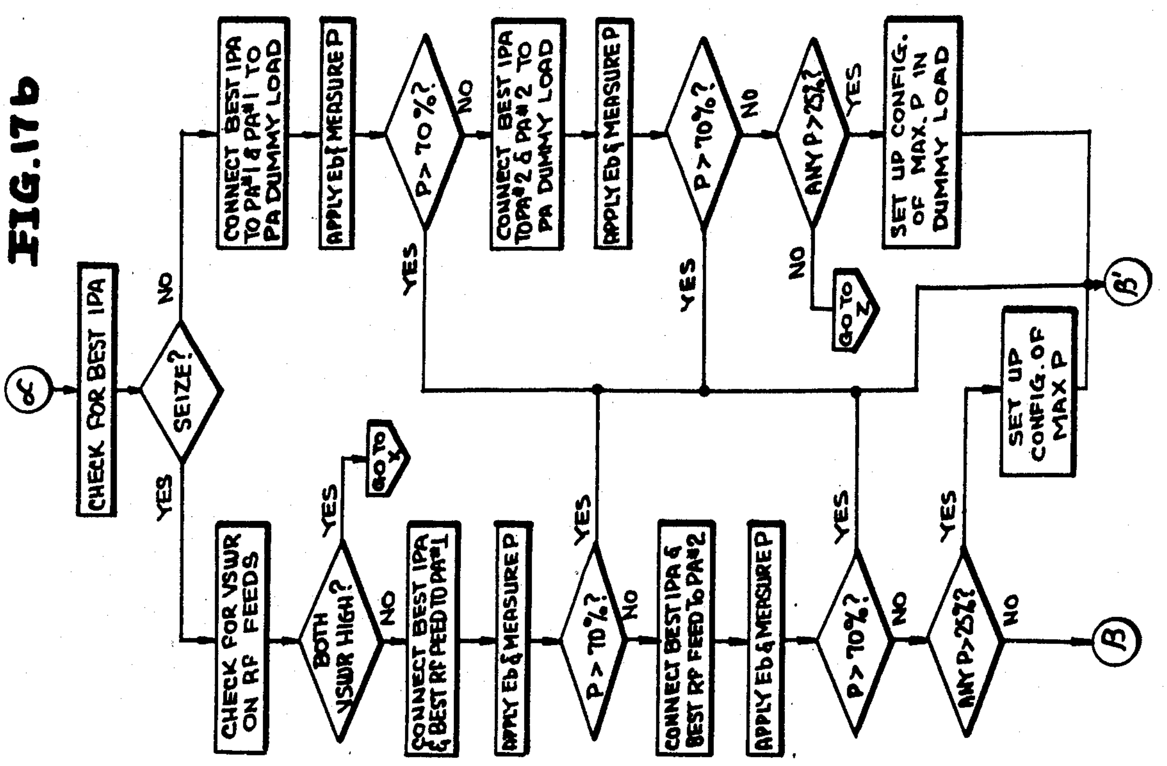
FIGS. 17*a*, *b* and *c* comprise a flow chart describing the operation of the system selection programmer at each distribution transmitter station.
Figure 17A:
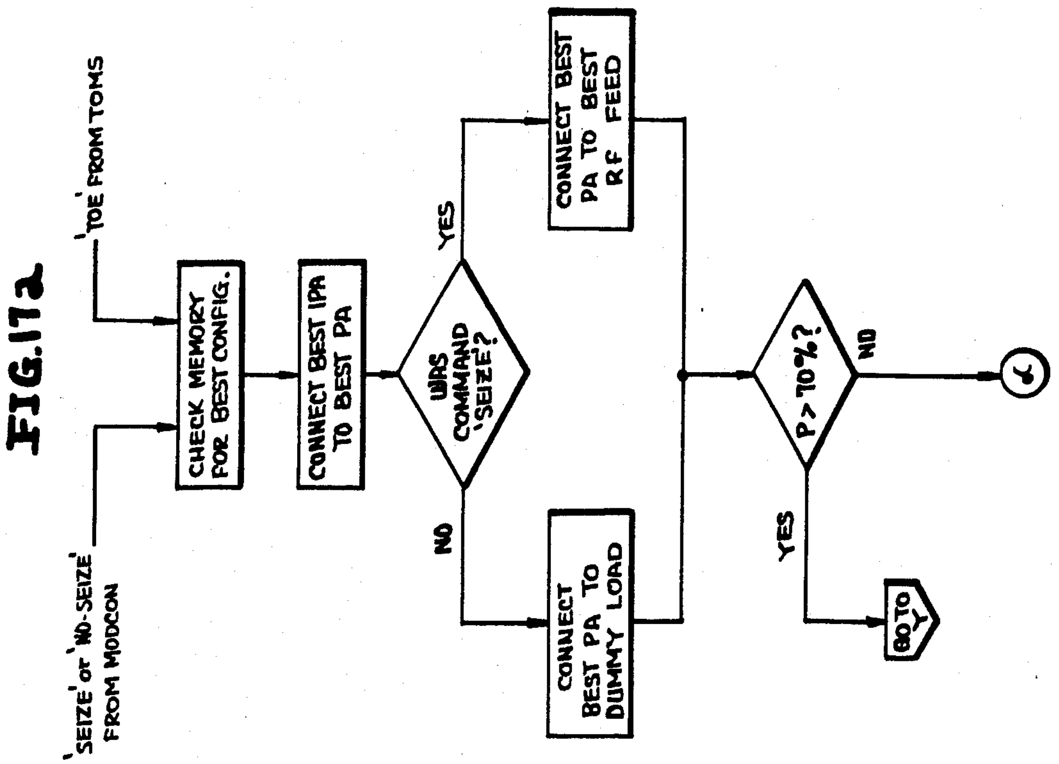
Figure 17C:
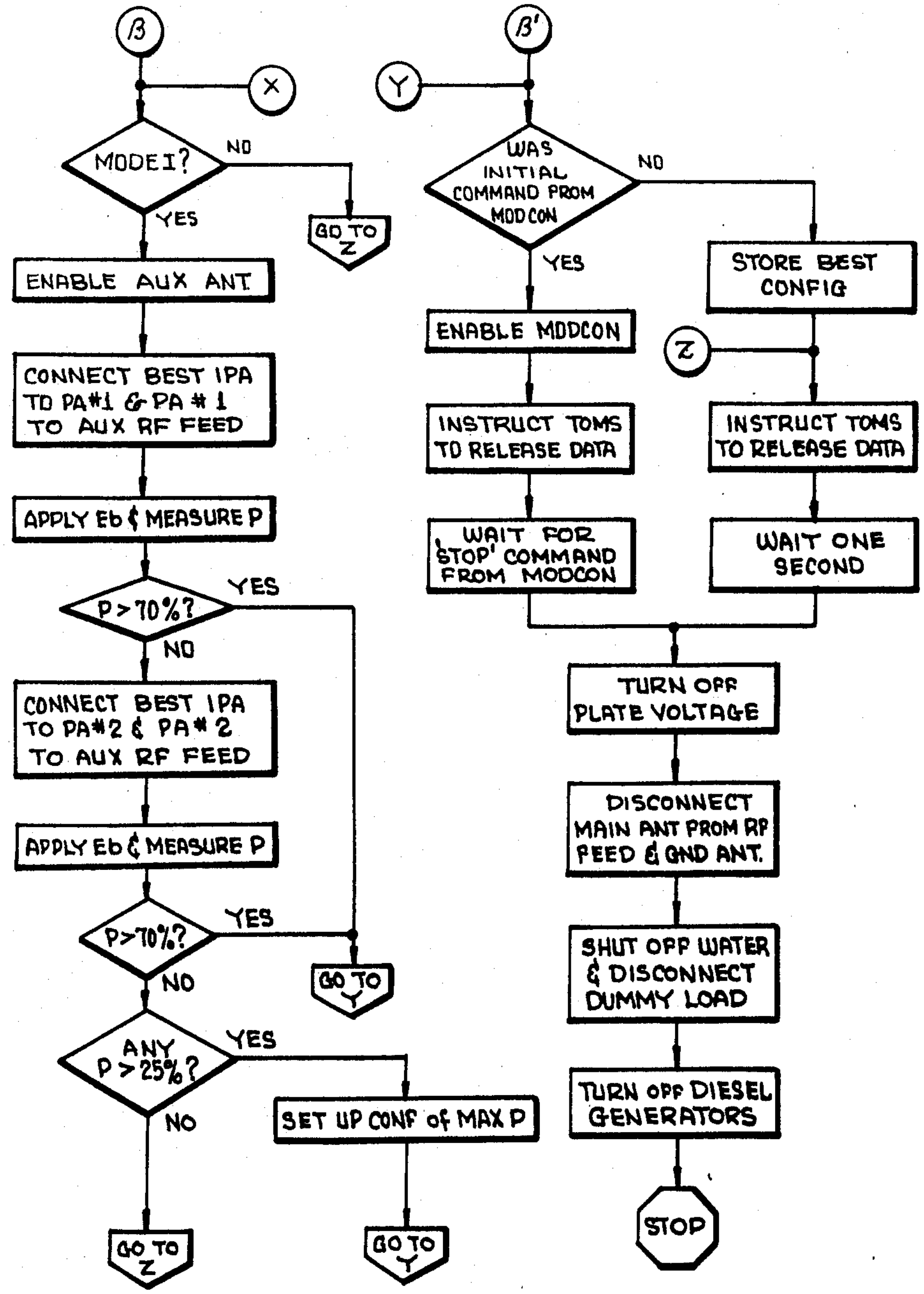

System selection programmer 117, like the system selection programmer 104 of FIG. 12, is capable of automatic operation on command from either the TOMS unit 46 of logic unit 114. It constitutes the actual controller of the components at the distribution transmitting facility. Through interface with the evaluation unit and acquisition unit of TOMS 46, the system selection programmer 117 confirms system status and, upon receiving an indication of transmitter malfunction, attempts corrective action. The system selection programmer provides an enable signal to logic unit 114 upon determination that certain critical operating parameters of the transmitter are within an acceptable range of values. The flow charts of FIGS. 17*a* and *b* completely describe the operation of system selection programmer 117. As is obvious from viewing these figures the operation of system selection programmer 117 is quite similar to the operation of system selection programmmer 104 of FIG. 12. In view of the clarity and detail of the flow charts in FIGS. 17*a* and *b,* additional detailed description of unit 117 is not required.

TERMINAL SUBSYSTEM

Referring once again to FIG. 3 of the accompanying drawings, the siren receivers 24 are individual receivers dispersed throughout the various distribution regions. These receivers have no audio output; rather, upon reception of a signal bearing the proper address code these receivers effect a contact closure which activates a siren. Each receiver includes an address selector circuit which is capable of decoding signals from regional distribution station in order to discriminate between the various address codes. The address code is preferably of the type described in the aforementioned Gautney et al. patent application wherein a transmitted carrier is selectively modulated or not in each of plural successive time frames throughout a multi-frame coding interval, each interval being bracketed by start and stop frames in which the carrier must be modulated. The said Gautney et al. patent application also describes circuitry at the receiver capable of decoding demuting-address codes of this type.

Institutional receivers 25 depicted in FIG. 3 are utilized at government institutional facilities for the reception of the regional distribution transmitter signal. The audio output of the receiver is normally muted until the proper demuting address is detected on the distribution transmitter signal. Upon detection of the proper address the audio circuits within the receiver become operative and remain operative until the address signal ceases to be present. The receiver is intended for continuous operation.

The public receivers 26 illustrated in FIG. 3 may be separate units purchased by citizens or may be installed in all radio and television sets sold in the country. The receiver is intended for continuous unattended operation and responds to appropriate demuting address codes appearing as amplitude modulation on the distribution transmitter signal in the region in which the receiver is located.

The TTY receivers 27 of FIG. 3 may be separate units of alternately may be combined with receivers of the same type as public receivers 26, in which case the receiver would also have audio capability. For TTY purposes the receivers contain the necessary circuitry to receive FSK data appearing in the regional distribution transmitter signal and also contains the necessary circuitry to convert the FSK format into binary levels suitable for actuating TTY equipment. An RTTY addressing module, included as part of the TTY receiver, enables the teleprinter associated with the TTY receiver upon detection of a proper address code. This address code is transmitted by the distribution transmitter in FSK format and is detected by the receiver before interpretation by the addressing module.

STATUS AND MONITORING SUBSYSTEM

The functions of the status and monitoring subsystem are as follows:

Monitoring critical parameters of the distribution and control transmitting stations;

Telemetry of the monitored parameters to the regional maintenance centers M1 and M12 (reference FIG. 1);

The display of status summaries from the transmitter operational monitoring subsystem (TOMS); and Display of status information concerning wireline system availability For purposes of this description and consistency with the foregoing descriptions of other subsystems, the status and monitoring subsystem is identified by its major element, namely the TOMS unit 46. As illustrated in FIG. 3, portions of the TOMS unit are located at each control transmitter station, and at each distribution transmitter station.

One aspect of TOMS operation is designated herein as the Transmitter Operational Examination (TOE). In this aspect of its operation TOMS is responsible for periodically providing the national warning centers with an evaluation of the operational condition of each transmitter facility in the system. To do this, TOMS automatically and periodically initiates and controls diagnostic examinations of the transmitters and facilities. These examinations consist of measuring certain significant parameters and configuring the transmitter components in order to obtain maximum output power from each transmitter. Values of transmitter and facility parameters are printed out at that transmitter station and at its maintenance station. Measurement of output power yields a "GO" decision regarding the state of readiness of the transmitter and facility. The result of this decision is transmitted to and displayed at all three NWC's. The TOE function is performed automatically at regular intervals and is interrupted by activation polling (described below) should such occur during a TOE operation.

Another TOMS mode is designated Communication Activation Polling (CAP). In this mode TOMS effects an interrogation and polling process which occurs upon each activation of the overall system for message transmission. CAP operation therefore permits verification of transmitter operation and message selection each time a message is to be transmitted. Another TOMS mode is designated Test Activation Polling (TAP). The TAP mode is similar to the CAP mode but is intended to occur only during tests in which the transmitter is connected to a dummy load, or for other test sequences not intended for message transmission. During the CAP and TAP modes TOMS reports the activation status of the system to the NWC's. Certain significant parameters of MODE I and MODE II operations are monitored and transmitted to the NWC's where the data are displayed. Both CAP and TAP interrupts and takes precedence over TOE operation should the latter be in effect when CAP or TAP modes are initiated.

Still another TOMS operation mode is designated Spoof Activation Dectection (SAD). In this mode TOMS is responsible for detecting and reporting unauthorized activation (spoofing) of any control or distribution transmitter. All transmitter activations are carrier-detected. In the CAP and TAP functions the spoof detector deactivation command indicates to TOMS at the transmitting station that an unauthorized detection will soon occur. A carrier detection which occurs without this indication is considered a spoof. The transmitting station thus distinguishes between authorized and unauthorized carrier detections. The transmitting station then transmits to the NWC's a tone which is coded to identify the station. The tone is decoded at the NWC's and a spoof indicator for that station is illuminated on a status display panel.

Another TOMS mode is designated Miscellaneous Anomaly Dectection (MAD). In this mode TOMS is responsible for detecting certain anomalies that may occur at the transmitting stations. Indication of such detection immediately triggers audible alarms and a print out at the transmitting station and its associated maintenance station. The anomalies to be reported include: FAILURE OF THE AFSK TRANSMITTER OR RECEIVER MODEMS; UNAUTHORIZED ENTRY INTO THE TRANSMITTER FACILITY; and FIRE.

The TOMS unit employs four basic types of messages. A Command message is transmitted by the NWC to a transmitting station (control or distribution) in order to intiate action at that station. A Command Confirm message is transmitted by a transmitting station to the NWC in order to verify receipt of a command at that station. This command is used in the TOE function only. A Report message is transmitted by a transmitting station to the NWC in order to provide information regarding the TOMS functions being monitored. A Report Confirm message is transmitted by the NWC to a transmitting station in order to verify receipt of a Report; this is used in a TOE function only. The other TOMS messages are utilized in the TOE, CAP, TAP and SAD functions; in the MAD function the data is telemetered only to the maintenance station for the transmitter.

Figure 18:
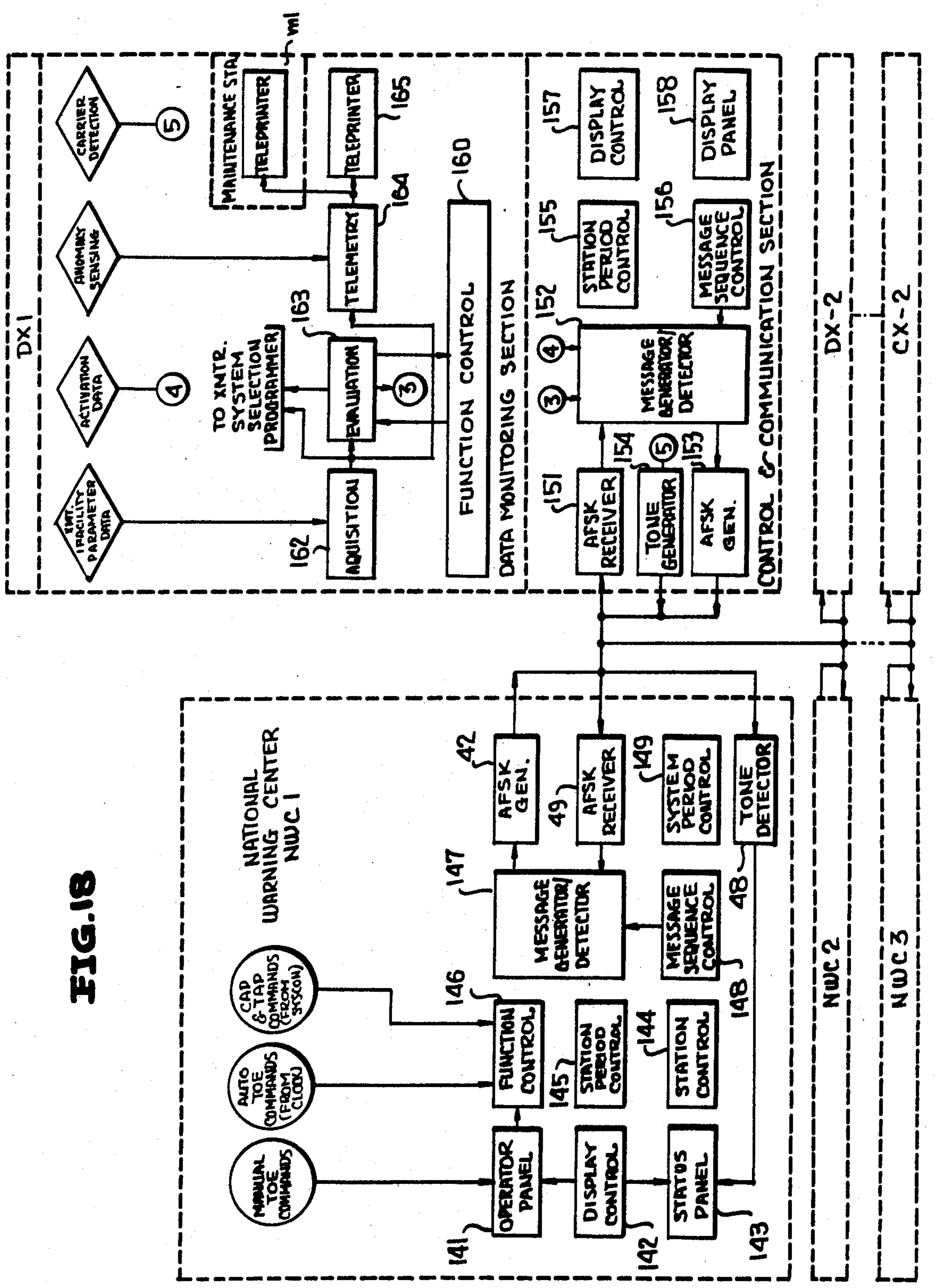
FIG. 18 is a functional block diagram of the status and monitoring subsystem.

The major components of the TOMS unit and the interrelationships of these components are illustrated in FIG. 18 to which specific reference is now made. For purposes of FIG. 18, a convention is utilized wherein rectangles indicate hardware components, circles indicate initiation commands and diamonds indicate monitored data. As indicated the TOMS components are located at the NWC's and the transmitting station.

TOMS equipment located at the national warning centers includes an operator panel 141 consisting of indicators for monitoring the significant events during TOE operation. In addition panel 141 provides means for manually intervening in a TOE operation, displays salient information, and retains a visual record of the GO or NO-GO decision from each transmitter station. A display control section 142 provides control of the indicators on control panel 141. A status panel 143 displays information provided during the CAP, TAP and SAD functions, and for a continuous fault sensing procedure.

A station control section 144 located at each national warning center keeps track of which station is currently being examined in the TOE, CAP and TAP functions. Station control 144 thus supervises the proper addressing of the messages to be transmitted and assist in determining whether or not incoming messages have been transmitted by the proper station. A station period controller 145 controls the time intervals within the time period devoted to each station in the TOE, CAP and TAP functions. This control generates the necessary signals to sequentially direct the operations required to examine each transmitter station. A function control section 146 is respossible for distinguishing between four of the TOMS functions, namely: TOE; CAP; TAP; and SAD. The function control unit 146 controls the proper encoding and decoding or messages with respect to these functions. During TOE it also supervises the method of selecting the next station to be examined by either automatic or manually actuable means.

Also at each national warning center is a message generator detector 147 which generates messages transmitted to the various transmitting stations and detects messages received from those transmitting stations. A message sequence control unit 148 controls the transmission and reception timing of messages between the NWC and transmitting stations. A system period control unit 149 controls the long duration system functions during a TOE operation. It initiates TOE function at the proper time and terminates the TOE function when all stations have been sequenced.

Also located at the national warning center and operating as a part of the TOMS functions are the AFSK generator 42, the AFSK receiver 49 and the spoof tone detector 48 described above in relation to FIG. 6. AFSK generator 42 converts digital pulses in the message generated by message generator detector 147 to AFSK audio tones at the frequencies TX-3 and TX-4. AFSK receiver 49 converts received AFSK audio tones at frequencies TX-5 and TX-6 to digital pulses capable of being processed by the message generator detector 147. Spoof tone detector 48 detects the presence of one or more spoof tone frequencies and provides an appropriate indication at status panel 143 to indicate that the transmitter associated with the received spoof frequency has in fact been spoofed.

The TOMS equipment at each transmitter station is located in two sections, namely: a control and communications section and a data monitoring section. The control and communications section includes an AFSK receiver 151 which converts received AFSK tones at frequencies TX-3 and TX-4 to digital pulses capable of being processed by a message generator detector 152. An AFSK generator 153 converts messages received from message detector 152 in digital pulse format to AFSK format using tones TX-5 and TX-6. A tone generator 154 responds to the detection of the presence of the transmitter carrier to provide a spoof tone which identifies that transmitting station as having been activated. The control and communications section of the TOMS equipment at each transmitter station additionally includes a station period control 155, a message sequence control 156, a display control 157 and a display panel 158 which corresponds in type and function to units 145, 148, 142, and 143, respectively, at the national warning center.

The data monitoring section of the TOMS unit at each transmitter station includes a function control unit 161 which controls the proper encoding and decoding of messages with respect to the functions performed by TOMS. In addition the function control unit 161 serves as an interface for transmitting timing and control signals from the control and communications section to the data monitoring section, and for transmitting examination results, activation data, and carrier activation indication from the data monitoring section to the control and communications section. The data monitoring section additionally includes an aquisition unit 162 which consists of transmitter parameter sensors, signal condition amplifiers, a multiplexer, and an analog to digital converter. From analog values provided by the sensors, the aquisition unit provides binary numerical values of the transmitter parameters being measured. These binary values are then applied to other units as follows: The transmitter power output parameter is applied to the TOMS evaluation unit 163; the remaining transmitter parameters are applied to the TOMS telemetry unit 164.

Evaluation unit 163 consists of memory and classification logic circuits. The unit classifies power output as a percentage of rated transmitted power in three categories: greater than 69 percent; between 25 percent and 69 percent; and less than 25 percent. The classification information is provided to the system selection programmer for the transmitter (i.e., unit 117 in FIG. 15, unit 104 in FIG. 12). Telemetry unit 164 receives binary signals representing measured transmitter parameters from the aquisition unit 162 and arranges the information in a form suitable for transmission to the teleprinter at the maintenance station associated with the transmitter. Telemetry unit 164 transmits the data thus arranged to the teleprinter at the maintenance station and local teleprinter 165 at the transmitter facility.

Before going into a detailed description of TOE function operation, a broader and more philosophical presentation is required. There are two basic operational options available to the operator at the national warning center with regard to TOE. In an automatic option TOE operations are automatically performed with each transmitting station being commanded in a predetermined serial order to effect the measurements required. This is done periodically on a continuous around the clock basis. Data obtained from these examinations are printed out at the transmitting station, telemetered to the maintenance station associated with the transmitter facility, and forwarded to the three NWC's where the data are displayed. All of these events occur without manual control.

During a manual option of the TOE function provision is made for manual intervention and override of the automatic option. In this mode the operator may alter the predetermined sequence in which the tranmitter stations are monitored. In addition the operator may manually command any transmitting station to perform diagnostic self examination during the idle time between automatic TOE operation cycles.

In the following detailed description of TOE function operation, reference is made to FIG. 18 and to FIG. 19 which represents a flow chart illustrating the various processes and steps performed during a TOE function. With regard to FIG. 19, a rectangle indicates a message to be transmitted, a square indicates the time period or operation designated in the square, and a diamond indicates a decision which is made by the logic circuitry in the TOMS system. In addition reference is made to FIGS. 20*a*, 20*b*, 20*c* and 20*d* which are timing diagrams illustrating the time period utilized to transmit and receive messages during the TOE function. For purposes of facilitating an understanding of the TOE operation the detailed description which follows is presented in outline form.

I. Automatic Operation.

I.A. The active period begins at specific times predetermined by a real-time clock located at the NWC in the function control unit 146. At the start of the active period, all transmitting stations and the NWC's are in a standby status. The active period begins when a command message is transmitted from the NWC to control transmitter CX-1. This message commands the station to begin diagnostic self-examination.

I.A.1. The initiation and control of the TOE, CAP, TAP and SAD functions may be performed by either NWC1, NWC2 or NWC3. In the description which follows, the term "NWC" or "active NWC" is meant to signify that NWC which is actually exercising the control. For purposes of this discussion, this is assumed to be NWC1.

I.B. The transmitting station receives the command message and inspects it for address and content validity.

I.B.1. If the command message is found to be invalid, it is ignored and the station goes back to standby status.

I.B.1.a. When the command message is transmitted, a command wait period is initiated by a timer at the NWC. If the command wait period elapses without receipt of a valid command confirm message, the command message is retransmitted to the transmitting station.

I.B.2. If the command message is found to be valid, the station transmits a command confirm message to the NWC. To this message, the station adds information as to whether the transmitter is in a "ready" or an "inactive" condition.

I.B.3. Upon receipt at the NWC, the command confirm message is inspected for validity.

I.B.3.a. If the command confirm message is found to be invalid, the message is ignored, and the command wait period continues. As explained in I.B.1.a, if the command wait period elapses without receipt of a valid command confirm message, the command message is retransmitted.

I.B.3.b. If the command confirm message is found to be valid, the command wait period at the NWC is terminated prior to its elapse time.

I.C. If the station has reported itself "inactive", the NWC steps to the next station and transmits a command message to it, starting the above sequence again.

I.D. If the station has reported itself "ready", the command confirm wait period at the transmitting station elapses and the examination period begins. The command confirm wait period is exactly analogous to the command wait period at the NWC.

I.E. The following events occur during the examination period:

I.E.1. TOMS sends a "start TOE" command to the system selection programmer (SSP).

I.E.2. The SSP has the ability to interconnect the intermediate power amplifiers (IPA), the power amplifiers (PA), and the RF feed system to form different configurations of these components. One of the major purposes of the TOE is to select the optimum configuration which yields the highest power output possible.

I.E.3. The optimum component configuration, as selected during each TOE, is retained in memory by the SSP. When a TOE begins, the first configuration used in energizing the transmitter is the one recorded as optimum from the preceding TOE.

I.E.4. In response to a "3 TOE" command, the SSP energizes the transmitter, utilizing the memorized optimum configuration. When the transmitter is at full power, the SSP sends an "interrogate" command to TOMS. This instructs TOMS to measure the power output.

I.E.5. The output power sensors are applied to the multiplexer, the output of which is applied to the analog-to-digital converter. The interrogate command causes the analog value of the output power for the configuration being used to be digitized. The digital value of the output power is applied to the evaluation unit for calssification and the result of the classification is made available to the SSP.

I.E.6. An output power value of 70 percent or greater is considered adequate and no further component configuring is done. In this case, the SSP sends a "ready" signal to TOMS. The "ready" signal contains a coded indication of the configuration that achieved 70 percent power. This information is memorized by TOMS.

I.E.7. If the output power is between 25 percent and 69 percent, the SSP records the value to a precision of 1 percent of maximum. The SSP then begins a programmed sequence in which the intermediate power amplifiers, the power amplifiers, and the RF feed system are interchanged to form different configurations. If any of the configurations results in the power output reaching 70 percent or greater, the programmed sequence stops, and the SSP sends a "ready" signal to TOMS. As previously stated, this signal is encoded to indicate the configuration that reached 70 percent power, and the configuration is memorized by both the SSP and TOMS.

I.E.8. An "interrogate" signal is send to TOMS with each new configuration of transmitter components. This signal indicates that the transmitter is at full power and that the output is to be measured.

I.E.9. If none of the programmed configurations succeed in achieving a power output of 70 percent, but at least one reaches 25 percent, the SSP memorizes the configuration that yielded the highest power output and sends a "ready" signal, encoded to indicate that configuration, to TOMS. As before, this configuration is stored by TOMS. If none of the configurations achieves a power output of 25 percent or better, the "ready" signal is encoded to reflect this fact and is sent to TOMS by the SSP.

I.E.10. When the "ready" signal is sent, this indicates that the configuring of components and the measuring of power output is completed. After the signal is sent, there is a 100 millisecond delay interval. During this interval, the parameters of the power amplifier and the intermediate power amplifier which yielded the highest power output, as well as other parameters, are measured. Following the delay interval, the transmitter is shut down. The foregoing sequence of events permits the parameters to be measured with the highest power output available at the time.

I.E.11. The transmitter parameters are monitored in the following manner:

I.E.11.a. Each parameter is sequentially enabled at the multiplexer, permitting unique and unambiguous sampling.

I.E.11.b. Each parameter is converted from analog form to digital form; i.e., to seven binary digits.

I.E.11.C. The telemetry unit performs the following functions:

I.E.11.c.1. Encodes all data into a form suitable for teletype transmission.

I.E.11.c.2. Arranges all data to conform to proper printout format.

I.E.11.c.3. Transmits the data to the teleprinters at the maintenance station and the transmitting station.

I.E.11.d. The following are included in the printout at the maintenance station and the transmitter station:

I.E.11.d.1. Month, day, and year.

I.E.11.d.2. Time of day.

I.E.11.d.3. Configuration number of transmitter components used in the measurements.

I.E.11.d.4. Percentage of power output.

I.E.11.d.5. A mnemonic abbreviation for each parameter.

I.E.11.d.6. The decimal numerical value for each parameter in Table VI to the precision indicated.

I.E.12. The TOMS at the transmitting station transmits a "report" message to the TOMS at the NWC. The data in the content portion of this message is determined by the greatest percentage of power output obtained from the transmitter, in the configuring process, as follows:

I.E.12.2. If any configuration yielded a power output of 70 percent or greater, the transmitter is reported to be in a GO condition. Receipt of the report message at the NWC will cause the GO lamps for that station to light on the operator and status display panels.

I.E.12.b. If none of the configurations yielded a power output of 70 percent but at least one yielded 25 percent power or greater, the transmitter will be reported in a NO-GO condition. Receipt of the report message at the NWC will cause the NO-GO lamps for that station to light on the operator and status display panels.

I.E.12.c. If none of the configurations yielded a power output of at least 25 percent, receipt of the report message at the NWC will cause neither the GO nor the NO-GO lamps on the operator and status display panels to light.

I.E.13. The report message is transmitted to the three NWC's where the GO or NO-GO information is displayed. The NWC transmits a report confirm message to the transmitting station and awaits a possible retransmission of the report message during the report confirm wait period. This is done for the same reasons that applied to the command message. If a second report message is received, the NWC ignores the previous one and transmits a second report confirm. If the report confirm wait period elapses without a retransmission of the report, the report message is considered valid. The NWC then steps to the next station and all of the preceding events, beginning with I.4. are repeated.

I.E.14. When the twelve stations (10 distribution, 2 control) have been sequenced in the preceding fashion, the active period ends and the idle period begins. The active and idle periods comprise the entire TOE period. The active period recommences at the end of the idel period.

I.E.15. The maximum length of the station periods are five minutes. The station under examination must be brought up to power and monitored within this time. Thus, the maximum length of the active period is one hour. The active period may be shorter due to the possibility of stations reporting themselves "inactive" and being passed over. Therefore, the idle period starts asynchronously with respect to a real time clock; namely, when the active period ends.

I.E.16. The TOE period is normally three hours long. This implies that the idel period is normally two hours long. In this case, a TOE begins at 12:00, 3:00, 6:00, and 9:00 a.m. and p.m. Note that the TOE periods must be coordinated among the three NWC's since any of the NWC's may become the active NWC at any time. Transfer of TOE command during the active period is precluded by coordination among the NWC operators. Manual variation of the length of the TOE period is possible, with the following results:

I.E.16.a. A TOE period of 1½ hours: 12:00, 1:30, etc. Idle period of one-half hour.

I.E.16.b. A TOE period of 2 hours: 12:00, 2:00, 4:00, etc. Idle period of 1 hour.

I.E.17. The transmitting stations shall be examined in the following sequence: national transmitting station I, regional transmittion stations 1 through 10, and national transmitting station II. II. Manual operation. The manual options are available during both the active and idle periods.

II.A.1. During the active periods, it is possible to manually alter the predetermined automatic sequence of station examinations. This is accomplished by placing an option control toggle switch in the "manual" position and depressing an initiate pushbutton associated with the station to be examined. The station examination in progress continues until completed, and the station selected by manual means is then examined.

II.A.2. At the completion of the manually initiated station examination, the next station to be examined is the one immediately following in numerical sequence. The sequence continues in the same direction until all twelve stations have been examined. For example, using arabic numerals for simplicity, assume stations one and two have been examined and the station three examination is in progress. If the initiate pushbutton for station eight is manually depressed, station eight will be examined at the completion of the station three examination. When the station eight examination is completed, the automatic sequence resumes, starting with station nine. If no other manual command occurs, the remaining stations are automatically examined in the following order: nine, ten, twelve, four, five, six, and seven. This procedure requires skipping over those stations which have already been examined in the current active period.

II.A.3. The same reasoning applies in the case of more than one manual command in a given active period. For example, continuing with the previous example, assume that station eight is being examined (with one, two, and three already completed). If the initiate pushbutton for station six is manually depressed, the station six examination begins at the completion of the station eight examination. When the station six examination is completed, with no further manual command, the remaining stations are automatically examined in the following order: Seven, nine; ten, eleven, twelve, four, and five.

II.B. Idle period. The means for manually commanding a station in the idle period will be the same as for the active period. The option control toggle switch is placed in the "manual" position and the initiate pushbutton for the given station is depressed. When this is done, the GO or NO-GO lamp associated with the last examination is extinguished. There is no restriction on the number of order of stations that may be manually commanded during the idle period, other than the time limitation imposed by the length of the idle period and the prohibition just prior to a new active period. Only one station need be commanded at a time; i.e., it is not necessary to program a series of stations in advance. The examination results stemming from manual initiation remain until the next active period.

II.C. Manual option prohibit periods. There are two times when the manual option is prohibited.

II.C.1. In the active period after the 11th station has been selected by either automatic or manual means; in this case, the 12th station is determined and no option is available.

II.C.2. Near the end of the idle period for a time period equal in length to one station period; in this case, there would not be enough time to complete the examination without interfering with the initiation of a new active period, which must start at non-varying, predetermined times. III. Time diagram (FIGS. 20*a*–20*d*). This diagram shows the relationship of the major time periods in the transmitter operational examination. In the automatic option, TOMS operate according to the following time sequence:

III.A. TOE time period. This is the period between successive initiations of the active period and is the major functional time period. It consists of one active period and one idle period. When one TOE period ends, another begins.

III.B. Active time period. This is the period in which all of the stations are examined. It consists of as many station periods (see III.D) as there are transmitting stations, assumed here to be 12.

III.C. Idle time period. This is the period between active periods. Only manual initiation of station examination may occur during this period.

III.D. Station time period. This is the time required for the command, command confirm, report, and report confirm messages, and the diagnostic self-examination. All of the station periods are of approximately the same length and consist of the following subdivisions:

III.D.1. Command time period. This period consists of the following four subdivisions:

III.D.1.a. Command transmit. The time required for the command message to be transmitted by the active NWC.

III.D.1.b. Command message receive. The time required for the command message to be received at the transmitting station.

III.D.1.c. Command confirm transmit. The time required for the command confirm message to be transmitted by the transmitting station.

III.D.1.e. Command confirm receive. The time required for the command confirm message to be received at the active NWC.

III.D.2. Command wait and command confirm wait periods. The active NWC awaits the command confirm message from the transmitting station during the command wait period. Receipt of this message terminates the command wait period before it elapses. If this period does elapse, the command message is retransmitted. During the command confirm wait period, the transmitting station awaits a possible retransmission of the command. If a valid command confirm is not received by the active NWC, this retransmission will occur. However, if a valid command confirm is received by the active NWC, a retransmission will not occur and the command confirm wait period will elapse.

III.D.3. Examination period. This period begins at the active NWC when the command wait period is terminated by the receipt of a command confirm message. It begins at the transmitting station when the command confirm wait period ends. The diagnostic examination is performed during this time. The stored value of power output is evaluated, yielding a GO or NO-GO result, which is then stored. The transmitter and facility parameters are measured serially, stored, printed out at the transmitting station, and telemetered to the teleprinter at the maintenance station.

III.D.4. Report period. This period is identical to the command period with respect to its subdivisions. The report message is encoded with the stored GO or NO-GO result and is transmitted by the transmitting station to the NWC. The NWC, in turn, sends a report confirm message back to the transmitting station.

III.D.5. Report wait period. This is the period during which the active NWC awaits a possible retransmission of the report message by the transmitting station. This will occur if a valid report confirm message is not received by the transmitting station. Receipt of a retransmitted report terminates the report confirm wait period at the NWC. The NWC will then ignore the previous report and transmit another report confirm message. The elapsing of the report confirm wait period at the NWC, without a retransmission of the report message, signifies that a valid report confirm message was received by the transmitting station. This marks the end of the station period for that station. The GO or NO-GO results are displayed at all three NWC's. The active NWC then directs this series of events to be commenced for the next station.

Figure 19:
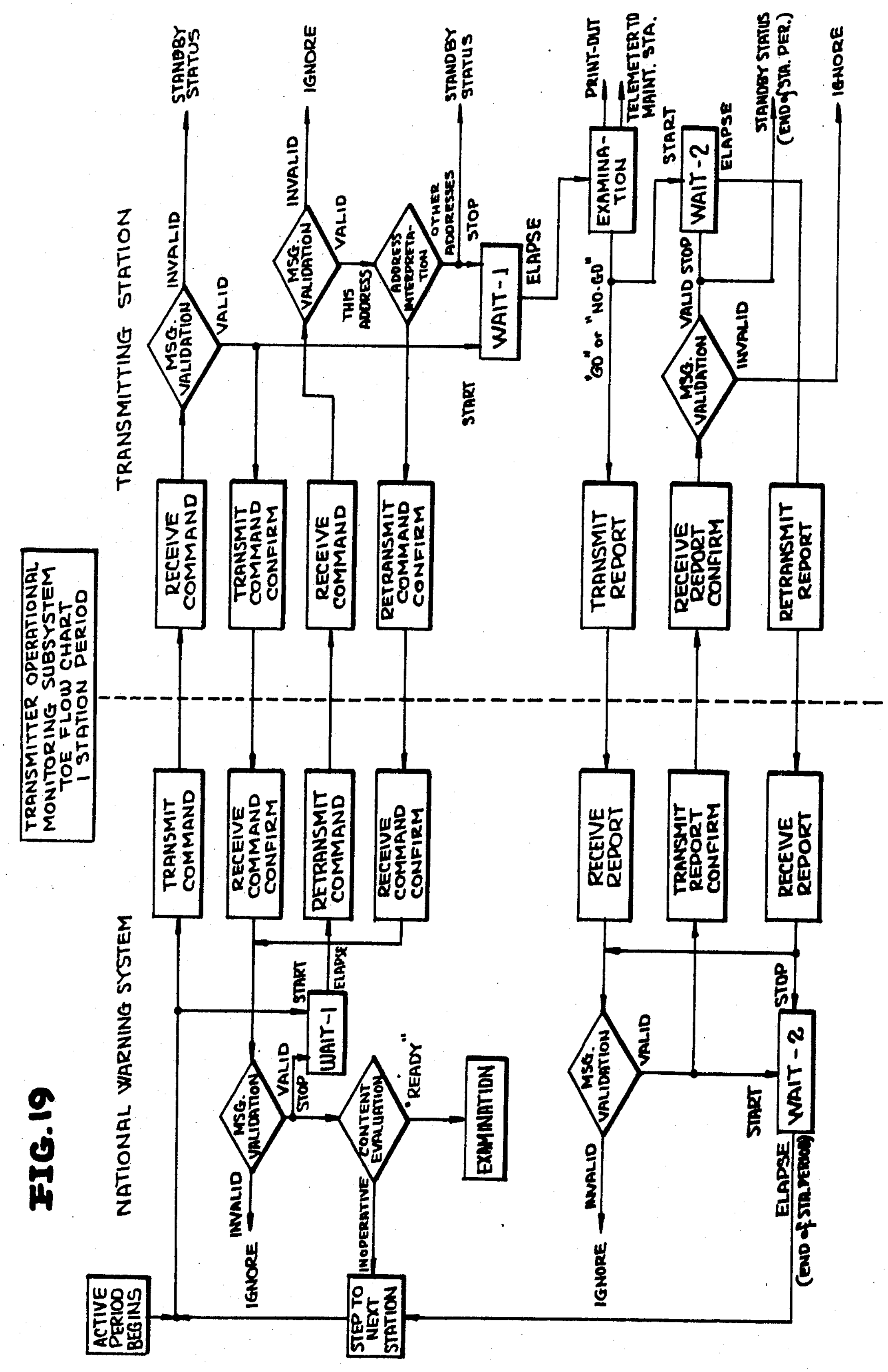
FIG. 19 is a flow chart describing the one aspect of the status and monitoring subsystem operation.
Figures 20A, 20B, 20C, 20D:
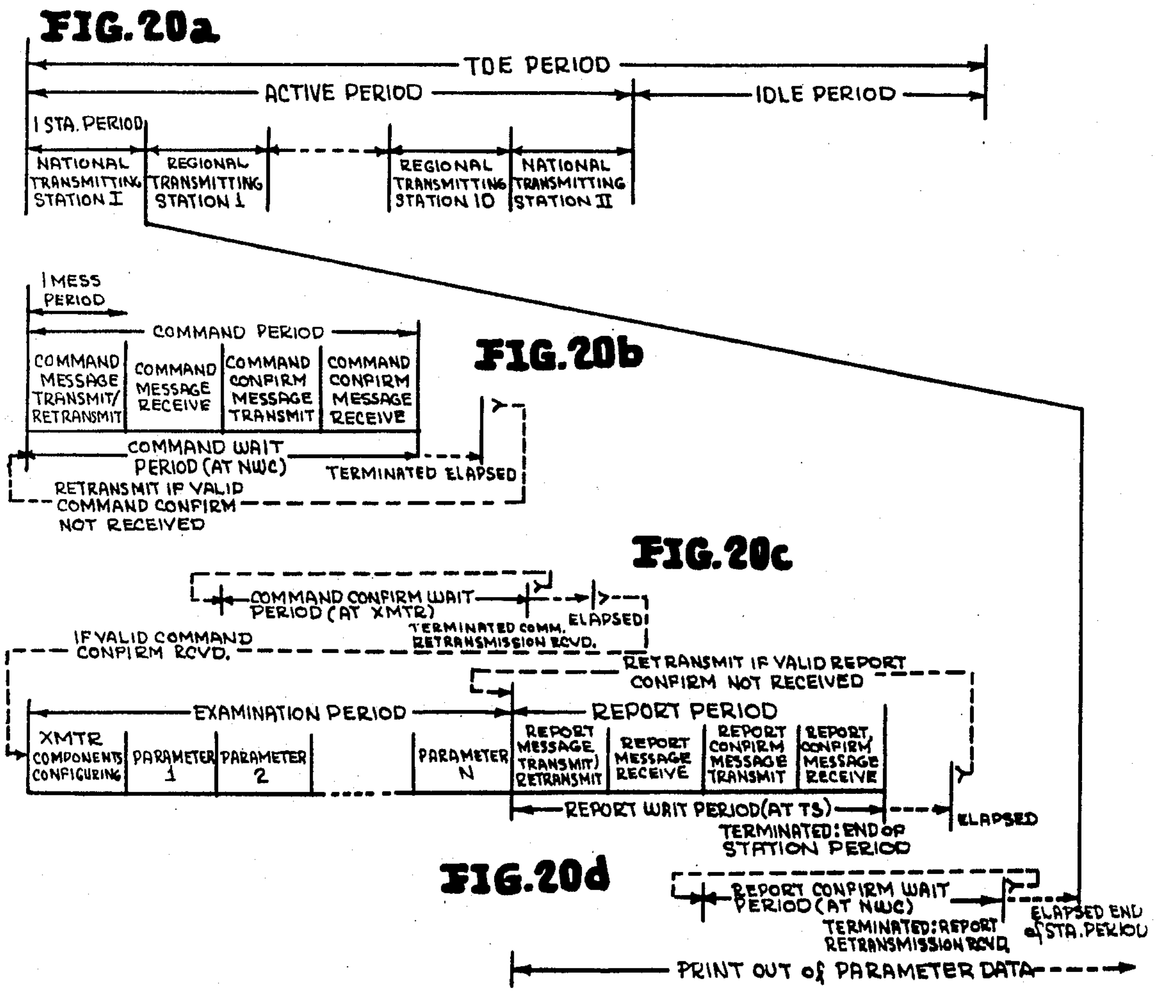
FIGS. 20*a*, *b*, *c* and *d* are timing diagrams illustrating time relationships between various events occurring in the operation outlined in FIG. 19.
Figure 21:
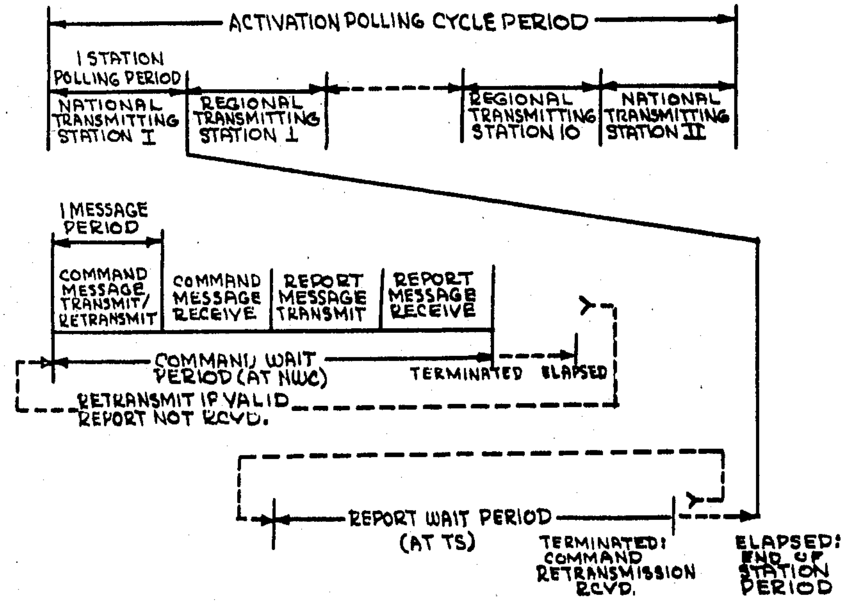
FIG. 21 is a timing diagram for another operational aspect of the status and monitoring subsystem.

The following outline describes the activation polling (CAP, TAP) operations in relation to FIGS. 18, 19 and 21. IV. Activation polling. The TOMS is responsible for reporting to the NWC's on the activation status of each transmitting station in all activations of the DIDS network. This reporting is accomplished by the communication activation polling (CAP) and the test activation (TAP) functions. Activation polling interrupts and takes precedence over any TOE that may be in progress.

IV.A. Spoof detection deactivation cycle. Upon commencement of network activation by the active NWC, the system controller commands TOMS at the same NWC to initiate activation polling. The TOMS then initiates a polling cycle in which each transmitting station is commanded to deactivate its spoof detector. As each transmitting station is commanded, it responds by transmitting a report message. This message affirms that the spoof detector at that station has been deactivated. Upon receipt of a valid report message from a commanded station, the NWC commands the next station, repeating the sequence until all twelve stations have reported spoof detection deactivation. The stations are commanded once each and may be commanded in any order.

IV.B. Activation polling cycle. Completion of the spoof detection deactivation cycle is followed by a series of recurring activation polling cycles. The purpose of this polling is to obtain information concerning the activation status of each transmitting station. The activation polling consists of the NWC sequentially transmitting a command (CAP or TAP) to each transmitting station. This command directs the TOMS at the commanded station to monitor and report on the activation data. The commanded station encodes these data into a report message which is transmitted to the NWC's. There the message is received, inspected for validity, decoded, and interpreted, and the activation data contained in the message is displayed by the status display panel. Upon receipt of a valid report message from a station, the active NWC commands the next station in the sequence. This recurrent polling continues, station after station, cycle after cycle, until the system controller transmits a "stop" command to TOMS. Successive polling of the stations is required because of the possibility that the status of the transmitter will change after it has initially reported. The transmitting stations are polled in the same sequence as that which occurs in the automatic option of the TOE; i.e. control transmitting station CX-1, DX-1 through DX-10, and CX-2.

IV.C. Activation report message.

IV.C.1. Transmitter "on air" and GO. The expressions "on air" and GO mean essentially the same thing: At least 70percent of maximum transmitter power ou put has been obtained. The expression "on air" is used whenever the transmitter generates energy into the antenna; GO is used whenever the transmitter generates energy into the dummy load. The latter case occurs only during the daily MODE I test activation polling.

IV.C.2. Transmitter "degraded" and NO-GO. The expressions "degraded" and NO-GO means essentially the same thing; Less than 70 percent of maximum transmitter power output has been obtained. The former is used whenever the transmitter generates energy into the dummy load. The latter case occurs only during the daily MODE I test activation polling.

IV.C.3. Activation report data. The first several activation polling cycles will probably occur while the transmitters are coming up to power. Under these circumstances, the stations will report themselves either "degraded" or NO-GO, as appropriate. If and when a transmitter reaches 70 percent of full power, the next report message from that station shall reflect that fact. Once it has achieved 70 percent should the output power of a transmitter fall below that value for any reason, this condition shall be indicated in the next report message. Thus, activation polling shall constitute a frequent, periodic monitoring of transmitter output power.

IV.C.4. Activation report validation. An activation polling report message is considered valid if the reported activation data, as well as the address and bit structure, are correct. Inspection of the activation data is possible in this case because it originates at the active NWC and is made available to TOMS there. Validation of activation data then consists of comparing the transmitted data to the received data. In the TOE, only the address and bit structure are inspected for validation because the "inactive/ready" and GO/NO-GO data originate at the transmitting station and are not known to the NWC. In other words, the activation polling report serves to verify, whereas the TOE report serves to inform.

IV.D. Command and report wait periods.

I.V.D.1. Transmission of all command messages is followed by a command wait period at the NWC. This period is terminated by the receipt of a valid report message. When this occurs, the next transmitting station is commanded. If the command wait period elapses without receipt of a valid report message, the command is retransmitted to the same station.

IV.D.2. Transmission of all report messages is followed by a report wait period at the transmitting station. This period is terminated by receipt of a retransmitted command message. This signifies that a valid report was not received by the NWC during the command wait period. The transmitting station responds by retransmitting the report message. The elapsing of the report wait period signifies that a valid report was received by the NWC. The sequence of events described in this and the preceding paragraph dictates that the report wait period be longer than the command wait period.

IV.E. Transmitter parameters. During either of the activation polling operations, the data monitoring section is utilized to transmit measured values of the transmitter parameters to the maintenance station, as in the TOE function.

IV.F. The system controller sends a "stop" command to TOMS when the TAP or CAP functions are complete. All activation polling sequences are stopped, and all equipment is placed in the "standby" state. All TAP and CAP displays are reset.

While we have described and illustrated specific embodiments of our invention, it will be clear that variations of the details of construction which are specifically illustrated and described may be restored to without departing from the true spirit and scope of the invention as defined in the appended claims.

We claim:

1. A national warning system comprising:

a plurality of geographically spaced warning centers, each including means for controlling the operation of said system;

control means for at all times restricting system control to no more than one of said warning centers at a time;

a plurality of distribution stations located in respective geographic regions;

radio transmitter means located at each distribution station and cable of broadcasting a signal throughout the geographic region in which said each distribution station is located, command means located at each warning center, and means for actuating said command means only when that warning center is in control of the system, for said command means transmitting command signals initiating broadcast of a signal from selected ones of said radio transmitter means, said radio transmitter means being ultimately controlled by said command means at each warning center in control of said system.

2. The system according to claim 1 including:

a wireline network connecting said warning centers to one another and to said distribution stations;

a control transmitter station connected to said warning centers via said wireline network and including a radio transmitter capable of broadcasting command signals to all said distribution stations upon receipt of a command signal from the command means at the warning center in control of said system; and wherein said command means includes:

means for applying command signals to said wireline network for receipt at said control transmitter station and said distribution stations; and means for designating which, as to the braodcast command signals and wireline-distributed command signals, is to initiate signal broadcast by said radio transmitter means at said distribution stations.

3. The system according to claim 2 wherein said control means includes:

means located at each warning center for generating audio tones having frequencies representing the status of that warning center, a different frequency for each warning center indicating that the warning center is in control of the system, another frequency indicating which status tones are being received at that warning center;

means including said wireline network for transmitting all status tones, when generated, to all warning centers;

means at each warning center for detecting reception of each status tone;

logic means at each warning center responsive to detection of specific combinations of status tones for changing the status tones generated at that warning center when no tone is received from one of the other warning centers, said logic means further including means responsive to a wireline interruption between two other warning centers, as indicated by the detected status tones, for rerouting signal transmission between said two other warning centers via a portion of the wireline network connecting the local warning center to said two other warning centers.

4. The system according to claim 3 further comprising system monitoring means for automatically measuring transmitter parameters at said control transmitter station and said distribution stations, and for providing indications at said warning centers of the operativeness of the distribution station radio transmitter means and the control station radio transmitter.

5. The system according to claim 4 wherein said system monitoring means includes means for automatically initiating measuring of said transmitter parameters at regular time intervals.

6. The system according to claim 5 further comprising:

means at each distribution station for storing pre-taped program signals to be transmitted by said radio transmitter means on command;

and wherein said command means includes means for manually selecting commands to be applied to said distribution stations via said wireline network and said control station radio transmitter and which command said radio transmitter means to transmit respective pre-taped program signals.

7. The system according to claim 6 wherein said command means includes means for including as part of said selected command a designation of the recipients for which a broadcast pre-taped program signal is intended; and wherein each distribution station includes means responsive to said recipient designation for coding the signal broadcast by said radio transmitter means in order that only the intended recipients can receive the broadcast signal.

8. The system according to claim 7 wherein said warning centers include means for transmitting audio frequency signals directly to said distribution station, via said wireline network, for broadcast by said radio transmitter means into said geographic regions; wherein said command means further includes means for designating, by means of a command signal sent to said distribution stations via said wireline network, the recipients for which the audio frequency signals are intended; and wherein each distribution station includes means for broadcasting the received audio frequency signals and for coding each broadcast signal to limit its reception to the designated recipients.

9. The system according to claim 1 wherein said control means includes:

means located at each warning center for generating audio tones having frequencies representing the status of that warning center, a different frequency for each warning center indicating that the warning center is in control of the system, another frequency indicating which status tones are being received at that warning center;

means, including a wireline network interconnecting said warning centers, for transmitting all status tones, when generated, to all warning centers;

means at each warning center for detecting reception of each status tone;

logic means at each warning center responsive to detection of specific combinations of status tones for changing the status tones generated at that warning center when no tone is received from one of the other warning centers, said logic means further including means responsive to a wireline interruption between two other warning centers, as indicated by the detected status tones, for rerouting signal transmission between said two other warning centers via a portion of the wireline network connecting the local warning center to said two other warning centers.

10. The system according to claim 1 further comprising system monitoring means for automatically measuring transmitter parameters at said distribution stations and for providing at said warning centers of the operativeness of the distribution station radio transmitter means.

11. The system according to claim 10 wherein said system monitoring means includes means for automatically initiating measuring of said transmitter parameters at regular time intervals.

12. The system according to claim 1 further comprising:

means at each distribution station for storing pre-taped program signals to be transmitted by said radio transmitter means on command;

and wherein said command means includes means for manually selecting commands and transmitting the selected commands to said distribution stations to command said audio transmitter means to transmit respective pre-taped program signals.

13. The system according to claim 12 wherein said command means includes means for including, as part of said selected commands, a designation of the recipients for which a broadcast pre-taped program signal is intended; and wherein each distribution station includes means responsive to said recipient designation for coding the signal broadcast by said radio transmitter means in order that only the intended recipients can receive the broadcast signal.

14. The system according to claim 1 further including a wireline network connecting said warning centers to said distribution stations and wherein said warning centers include means for transmitting audio frequency signals directly to said distribution station, via said wireline network, for broadcast by said radio transmitter means into said geographic regions; wherein said command means further includes means for designating, by means of a command signal sent to said distribution stations via said wireline network, the recipients for which the audio frequency signals are intended; and wherein each distribution station includes means for broadcasting the received audio frequency signals and for coding each broadcast signal to limit its reception to the designated recipients.

15. The system according to claim 1 further comprising:

a wireline network connecting said warning centers to said distribution stations for transmitting commands between said command means and said distribution station;

a redundant telephone network connecting said warning centers to said distribution stations and serving as back up for said wireline network;

manually actuable means at said warning centers for selectively rendering said redundant telephone network active to transmit said commands; and means at each distribution station for receiving commands received via said wireline network and said redundant telephone network.

16. An information distribution system comprising:

at least one warning center from which control of said system originates;

a plurality of distribution stations located in respective geographic regions, each distribution station including a distribution radio transmitter capable of broadcasting signals on command throughout the geographic region in which that distribution station is located;

a wireline network connecting said warning center to said distribution stations;

a control transmitter station connected to said warning center via said wireline network and including a control radio transmitter capable of broadcasting command signals to all said distribution stations upon receipt of a command signal from said warning center;

wherein said warning center includes command means having:

means for applying command signals to said wireline network for receipt at said control transmitter station and said distribution stations; and means for designating which, as to the broadcast command signals and wireline-distributed command signals, is to initiate signal broadcast by said distribution radio transmitter.

17. The system according to claim 16 further comprising system monitoring means for automatically measuring control and distribution transmitter parameters and for providing indications at said warning center of the operativeness of said transmitters.

18. An information distribution system comprising:

a plurality of geographically spaced distribution stations, each including a distribution radio transmitter throughout a respective geographic region;

means at each distribution station for storing a plurality of pre-taped information programs;

manually actuable means for generating coded command signals to designate which pre-taped program is to be transmitted by which distribution stations and further designating the class of recipients to whom the program is to be transmitted;

control means for transmitting said command signals to each distribution station;

decoding means at each distribution station for decoding said command signals, said decoding means including: first means responsive to a received coded command signal designating the local distribution station for readying the local distribution transmitter for transmission; second means for selecting the pre-taped program designated by said coded command signals; and third means for broadcasting via the readied transmitter a signal container the pre-taped program and a code which limits reception of the pre-taped program to class of recipients designated by the coded command signal.

19. The system according to claim 18 further comprising:

a control radio transmitter capable of broadcasting command signals to all of said distribution stations;

a wireline network connecting said central control means to said control transmitter and said distribution stations; and means located at said central control means for selectively sending command to said distribution station via said control transmitter or said wireline network.

* * * * *